United States Patent [19]
Quach

[11] Patent Number: 5,659,709
[45] Date of Patent: Aug. 19, 1997

[54] WRITE-BACK AND SNOOP WRITE-BACK BUFFER TO PREVENT DEADLOCK AND TO ENHANCE PERFORMANCE IN AN IN-ORDER PROTOCOL MULTIPROCESSING BUS

[75] Inventor: Tuan M. Quach, Fullerton, Calif.

[73] Assignee: AST Research, Inc., Irvine, Calif.

[21] Appl. No.: 317,297

[22] Filed: Oct. 3, 1994

[51] Int. Cl.$^6$ .................................................. G06F 12/08
[52] U.S. Cl. ............................................. 395/473; 395/468
[58] Field of Search .................................. 395/468, 470, 395/473

[56] References Cited

U.S. PATENT DOCUMENTS

| | | | |
|---|---|---|---|
| 5,228,134 | 7/1993 | MacWilliams et al. | 395/465 |
| 5,276,892 | 1/1994 | Olesin et al. | 395/595 |
| 5,479,636 | 12/1995 | Vanka et al. | 395/460 |

OTHER PUBLICATIONS

Memory Controller/PCI Host Bridge Engineering Hardware Specification; Revision: R2–0.1; Published May 27, 1994; Document No. IBM27–82P54; IBM Microelectronics.

*Primary Examiner*—Eddie P. Chan
*Assistant Examiner*—Kevin L. Ellis
*Attorney, Agent, or Firm*—Knobbe, Martens, Olson & Bear, LLP

[57] ABSTRACT

A multiprocessor computer system includes specially designed snoop circuitry to prevent data loss during write-back cycles. A memory controller within a main memory module determines if a data request at a specified address corresponds to a cacheable memory address. If it is determined that the requested data is located at a cacheable memory address, then the memory controller initiates a snoop cycle. When a snoop cycle is initiated, a write-back buffer within the main memory module is first examined to determine if data contained within the write-back buffer is the requested data, so that the data within the write-back buffer has an associated address which is the designated cacheable memory address. If the write-back buffer does not contain the requested data, then the memory controller causes the cache memories associated with the multiple processors within the multiprocessor system to be examined. If any of these cache memories contain data at the specified cacheable address, and the data at this address has been modified by the local processor without being written back to the main memory module, then the data at the specified address is immediately written back to the main memory module. In order to prevent overwriting of data contained within the write-back buffer, the multiprocessor system includes a snoop write-back buffer which serves as a bypass buffer to bypass the write-back buffer without overwriting the data contained within the write-back buffer.

6 Claims, 33 Drawing Sheets

THIS STATE DIAGRAM NEEDS TO BE MODIFIED ACCORDING TO THE LATCH PROTOCOL

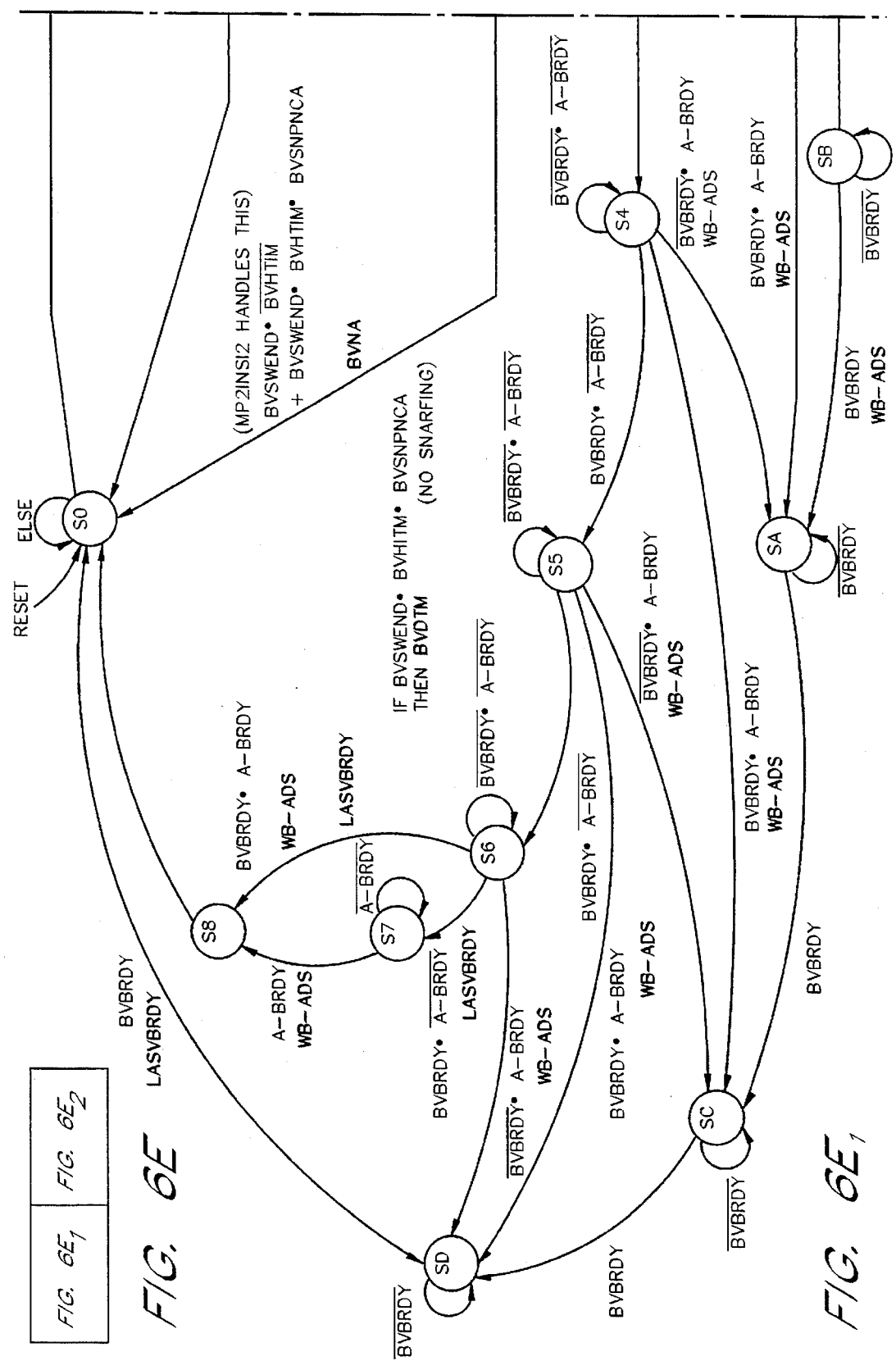

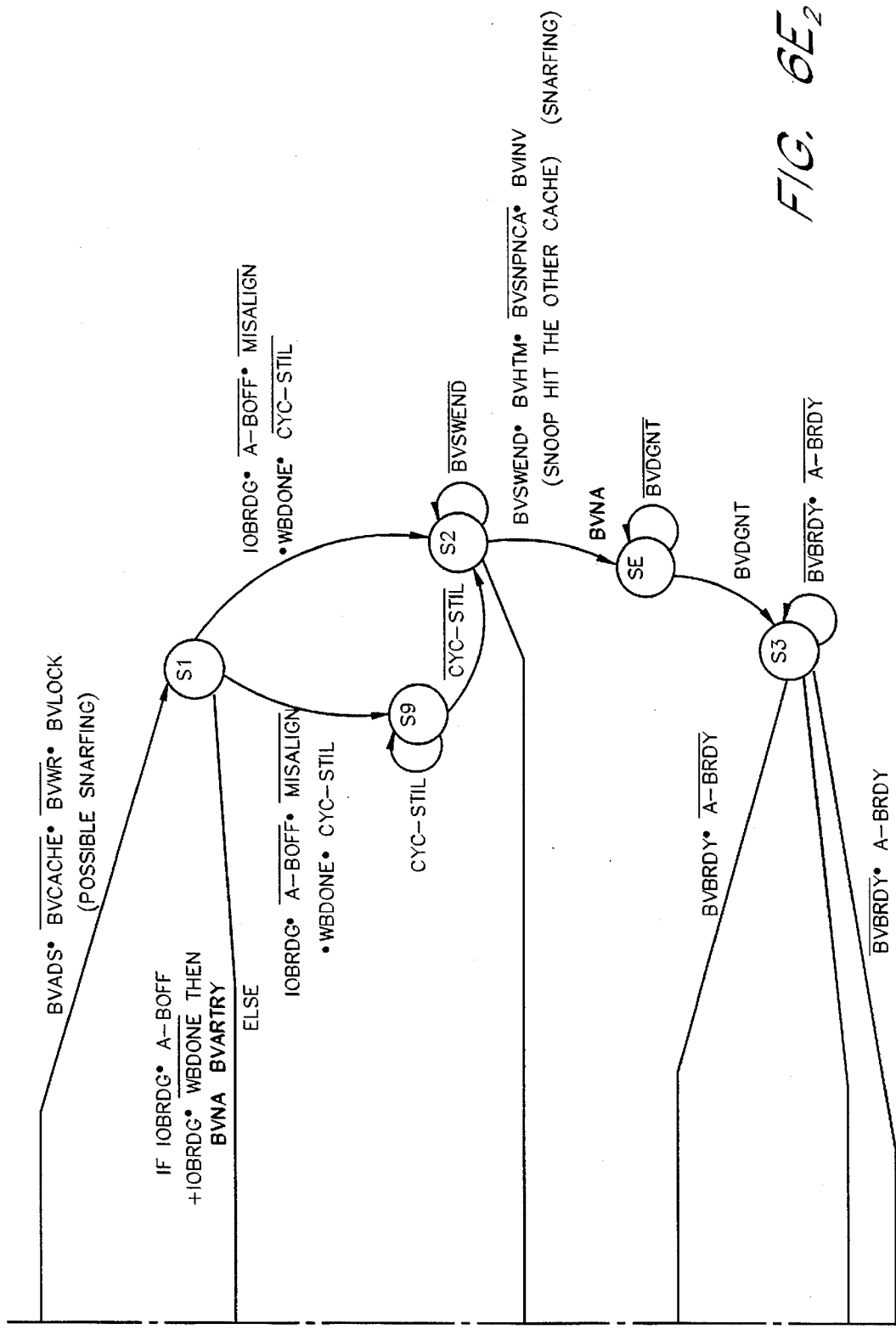
FIG. 6E₂

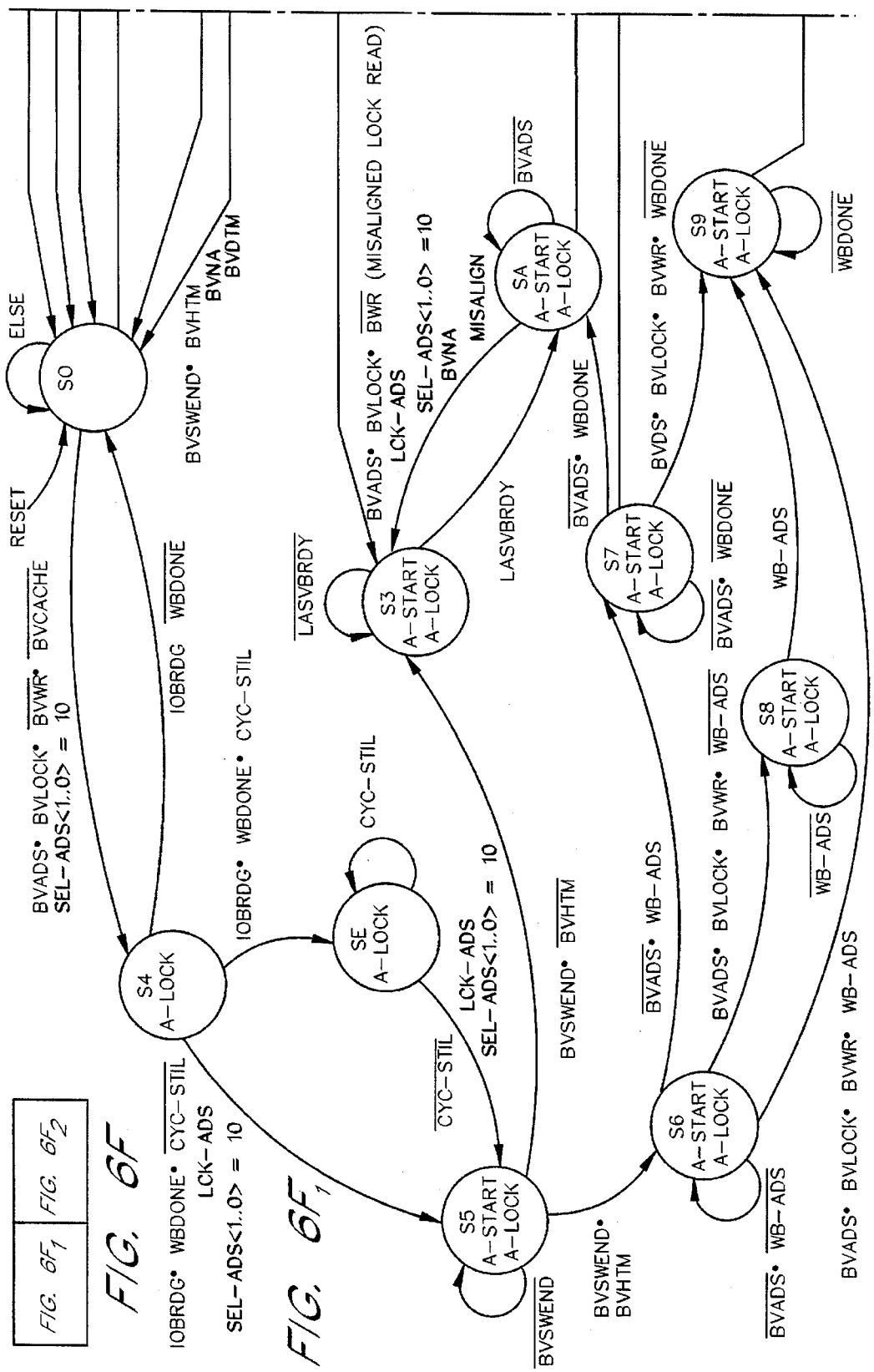

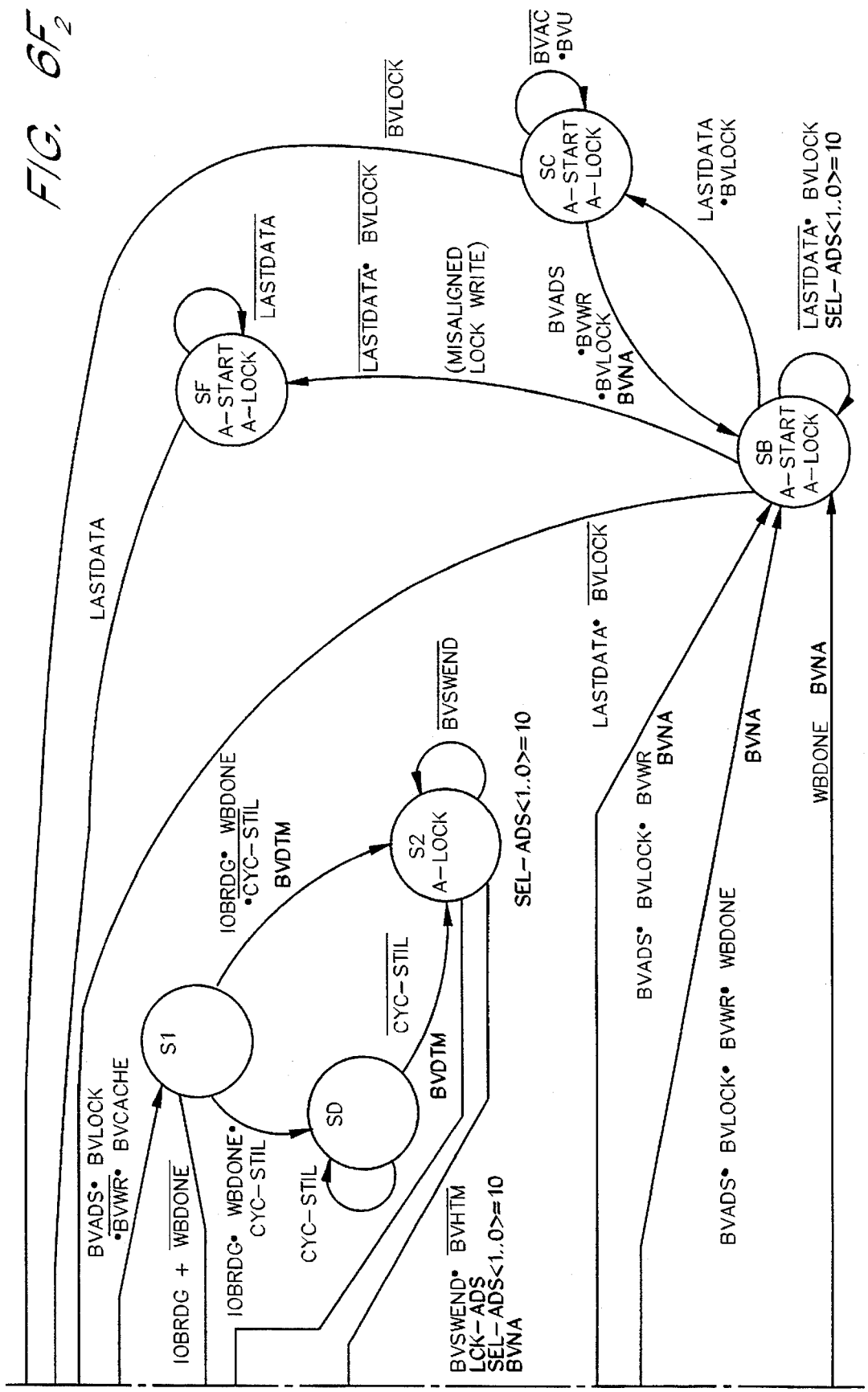
FIG. 6F₂

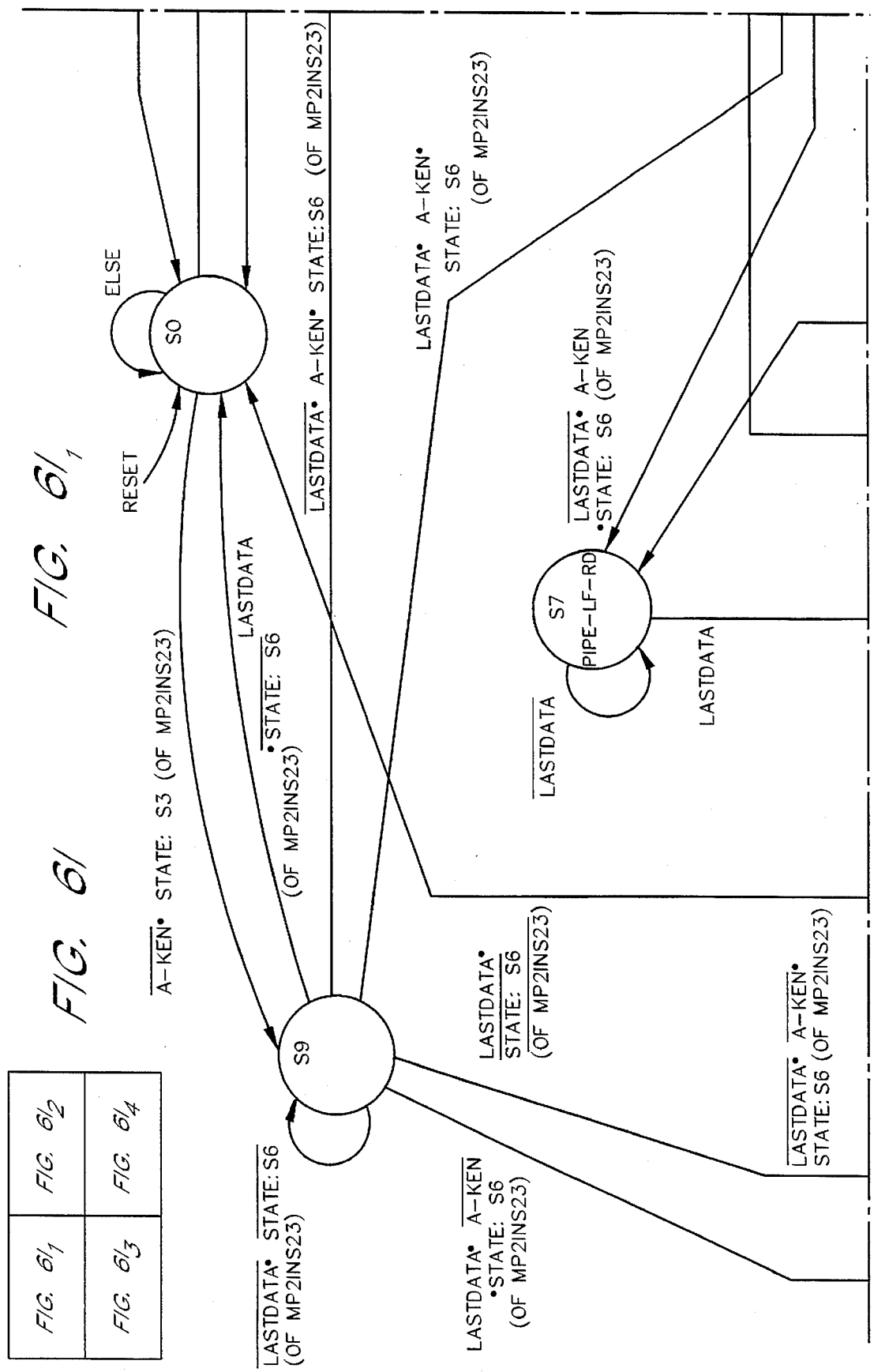

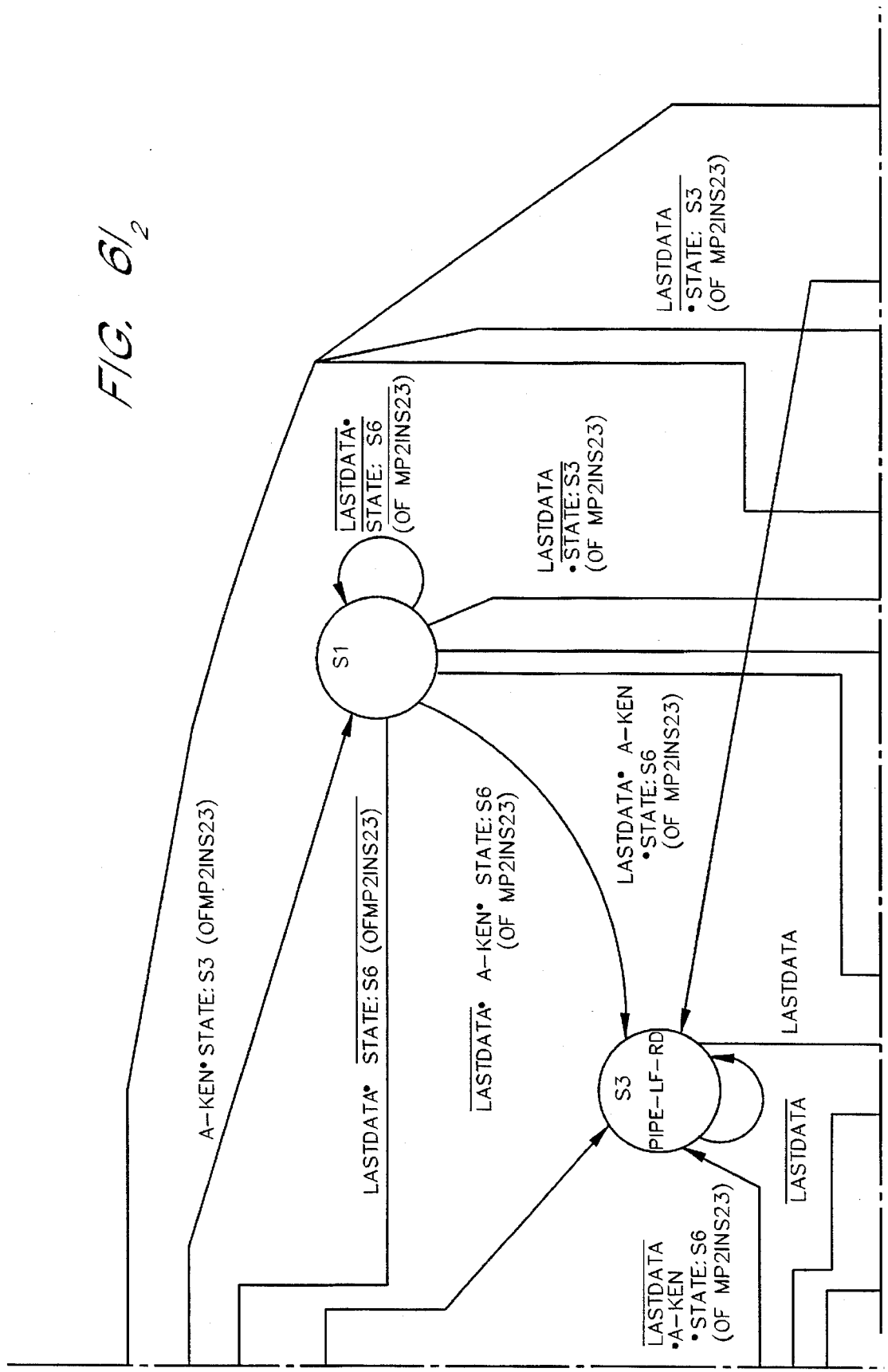
FIG. 6/2

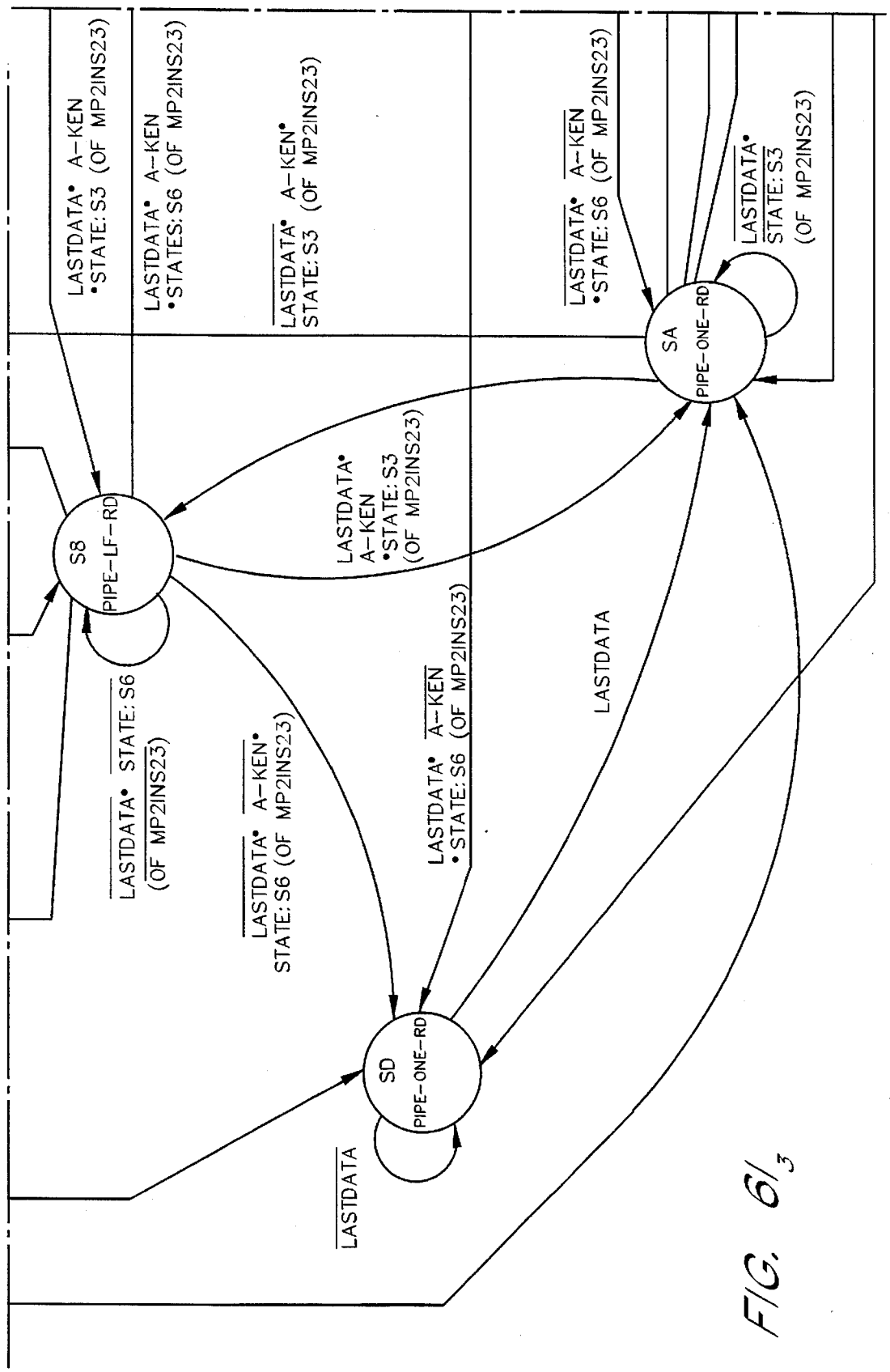
FIG. 6/3

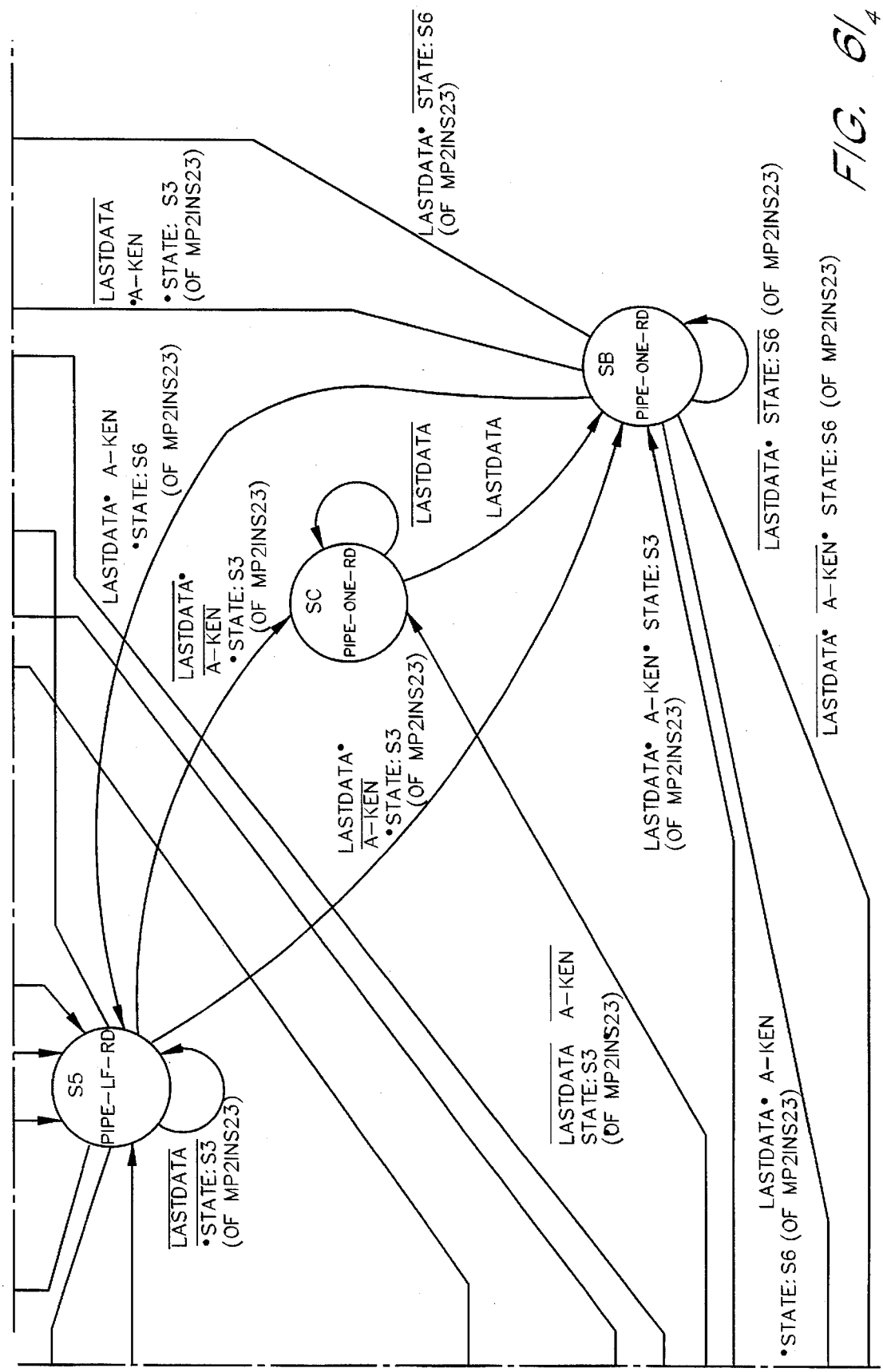
FIG. 6¼

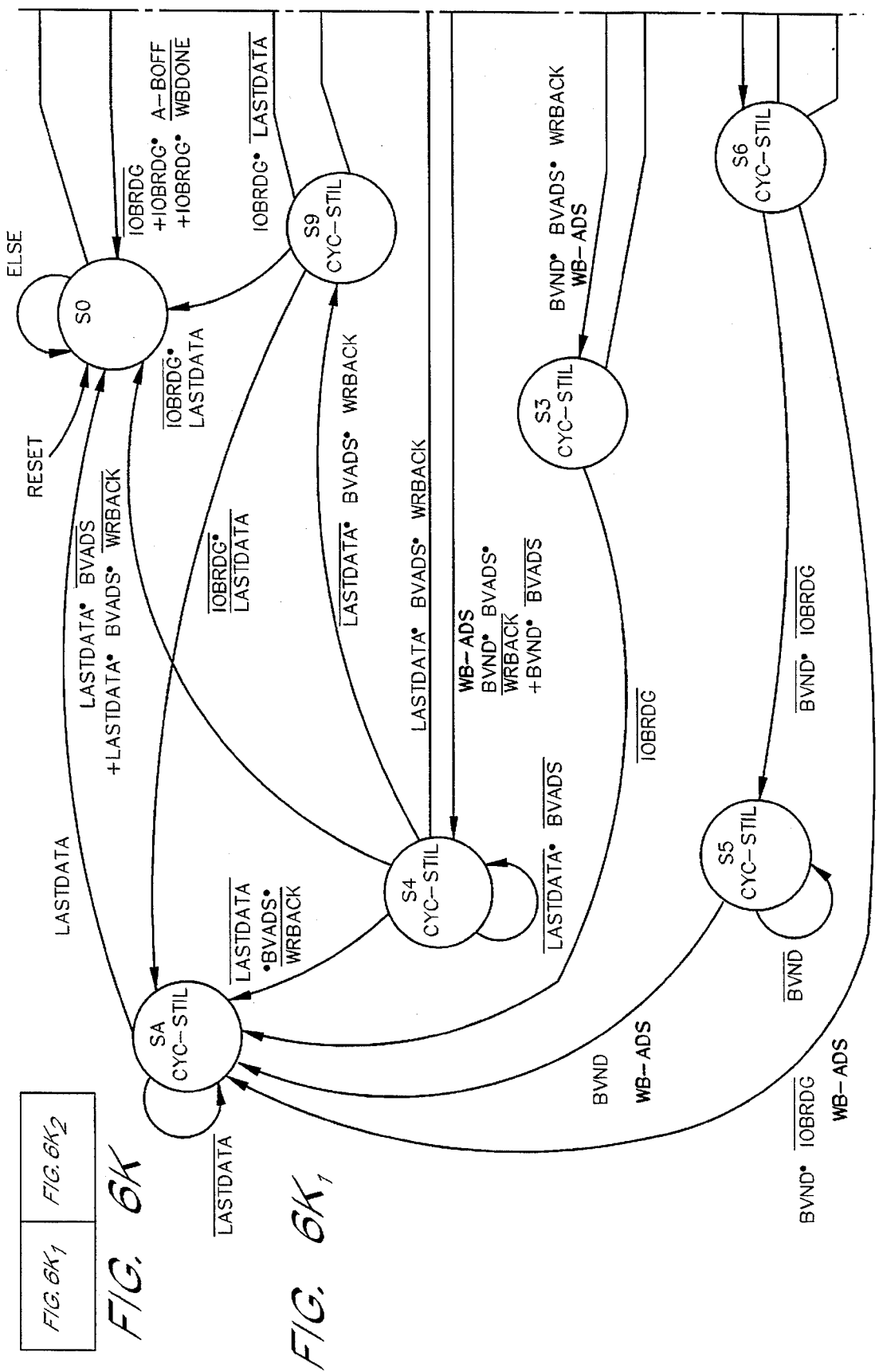
FIG. 6K1

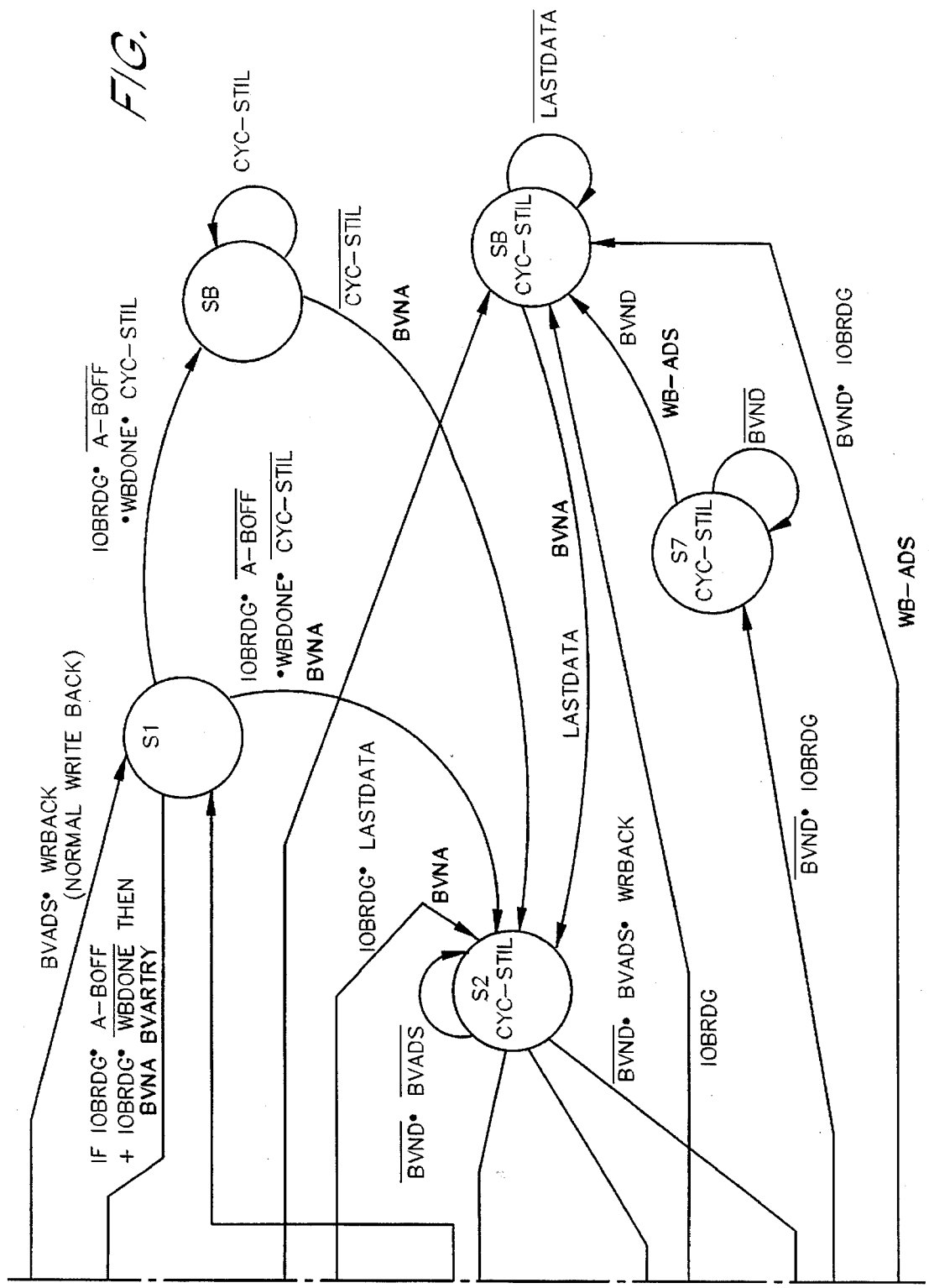
FIG. 6K₂

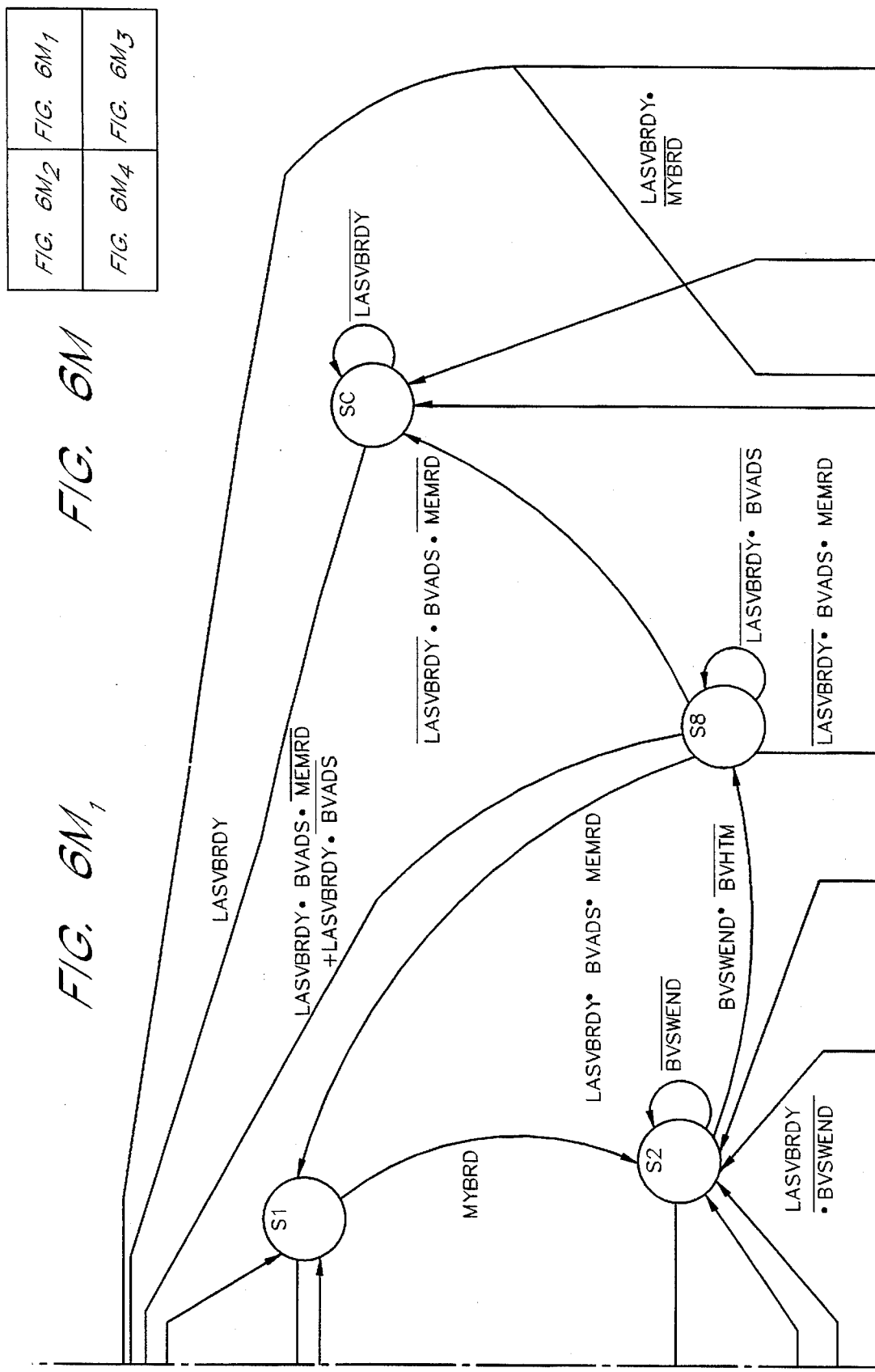

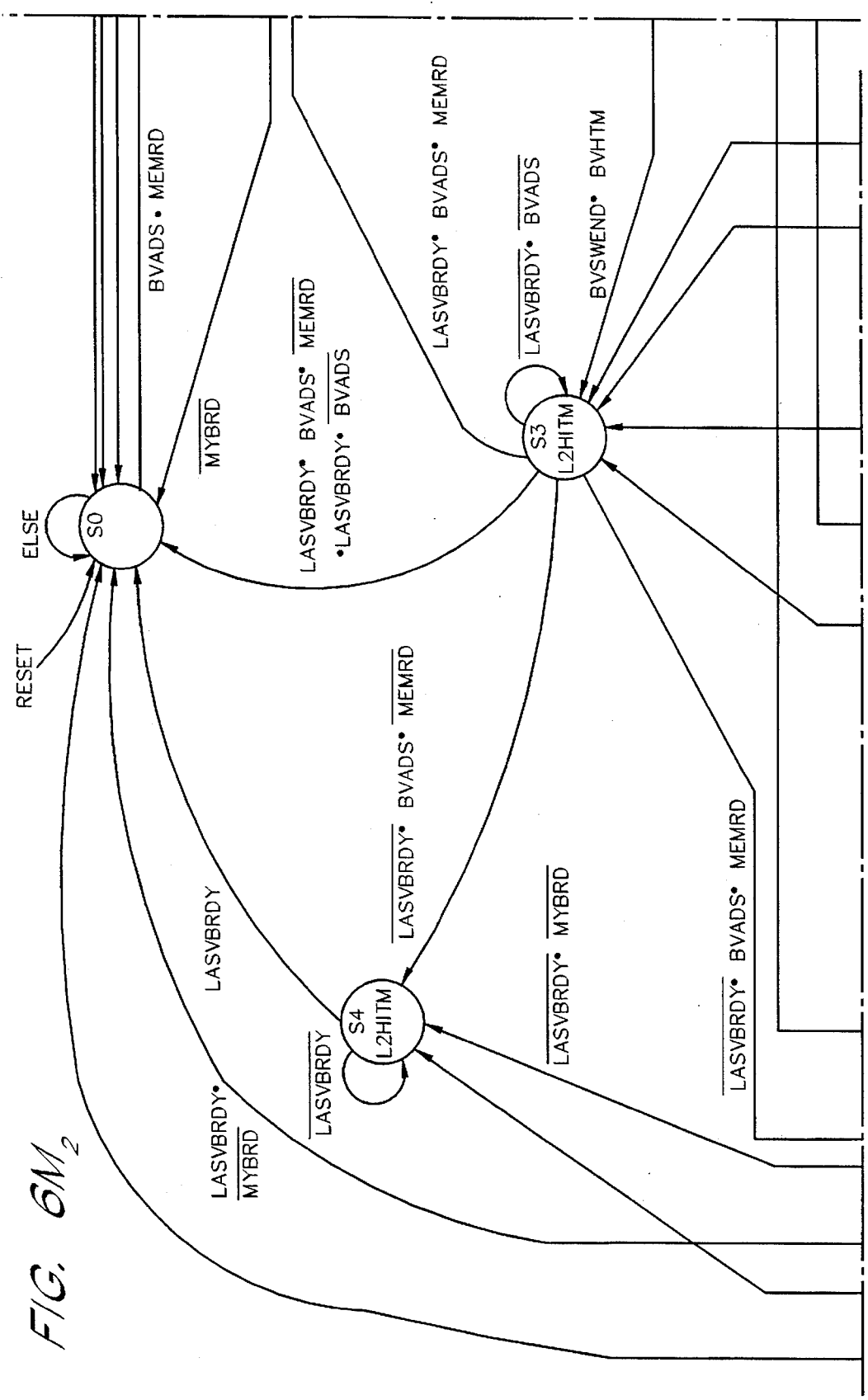
FIG. 6M₂

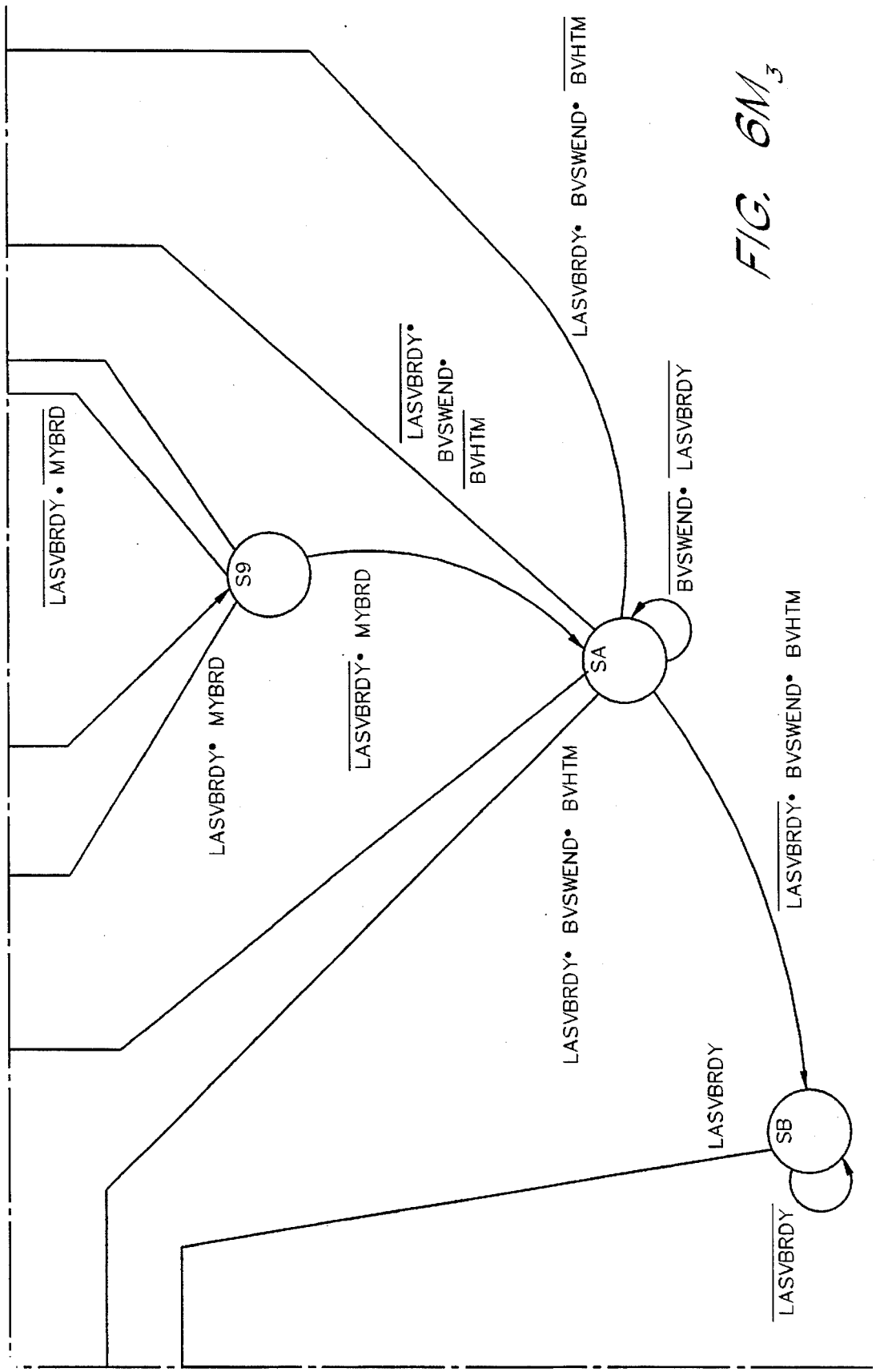
FIG. 6M₃

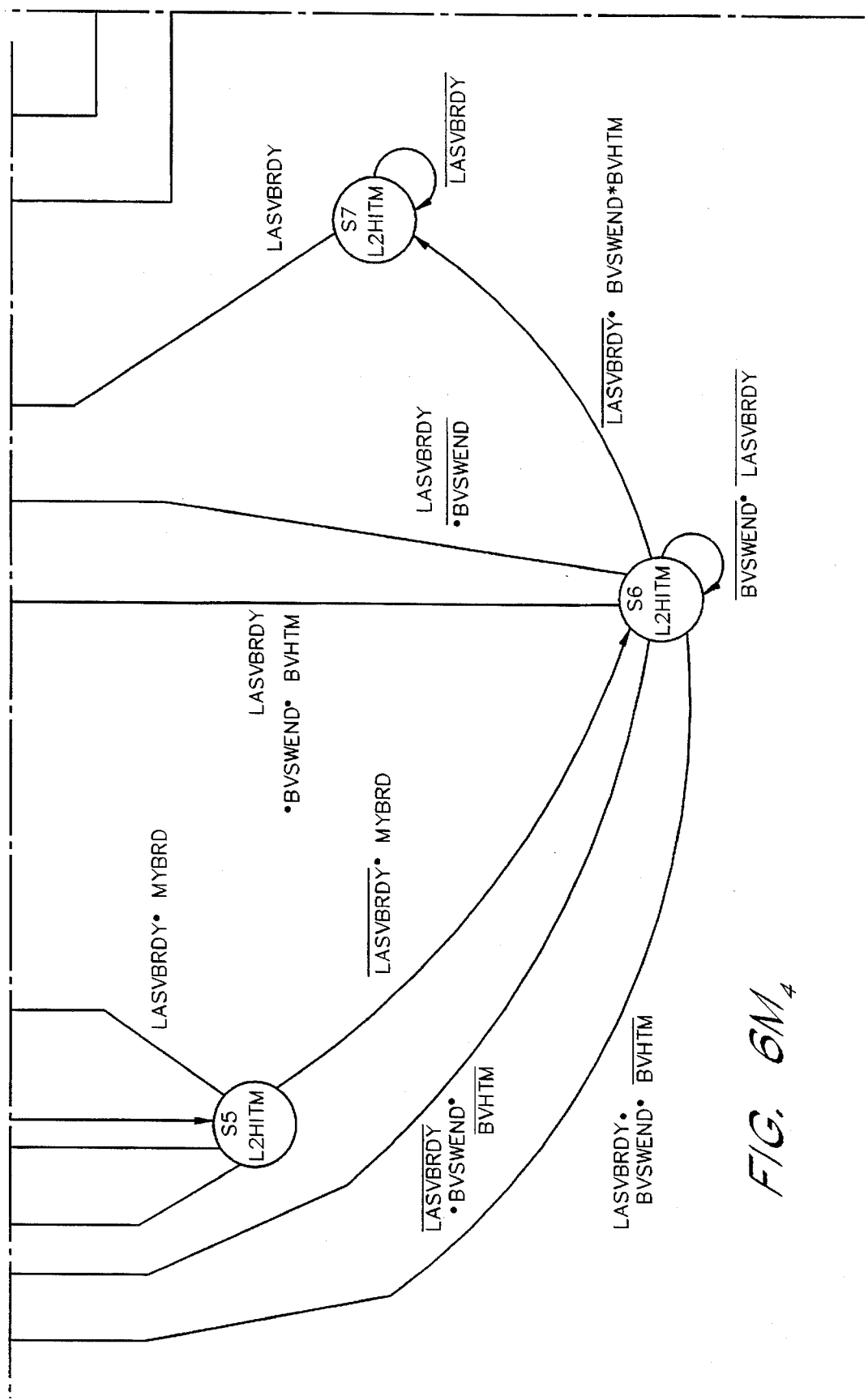
FIG. 6M₄

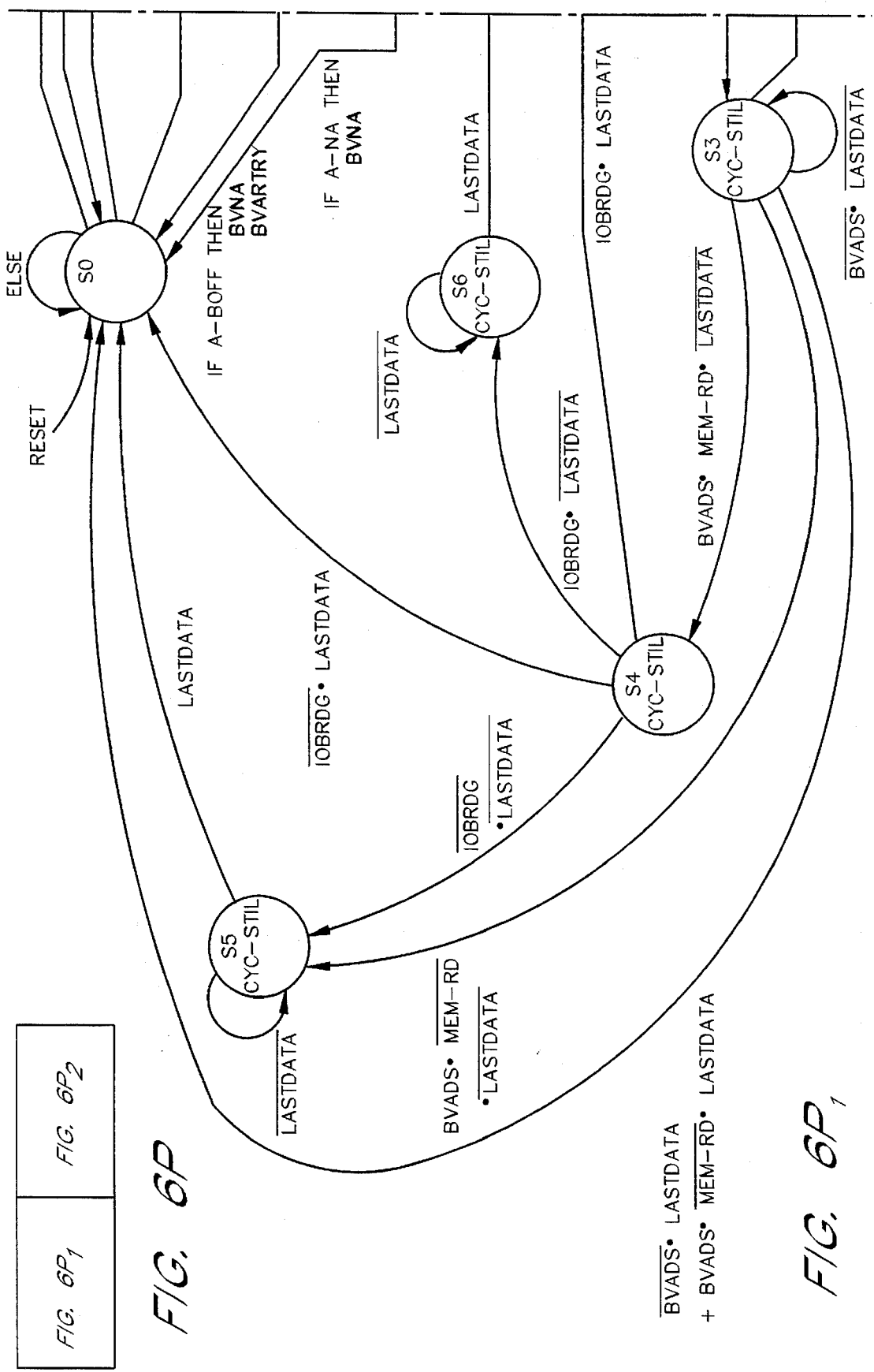

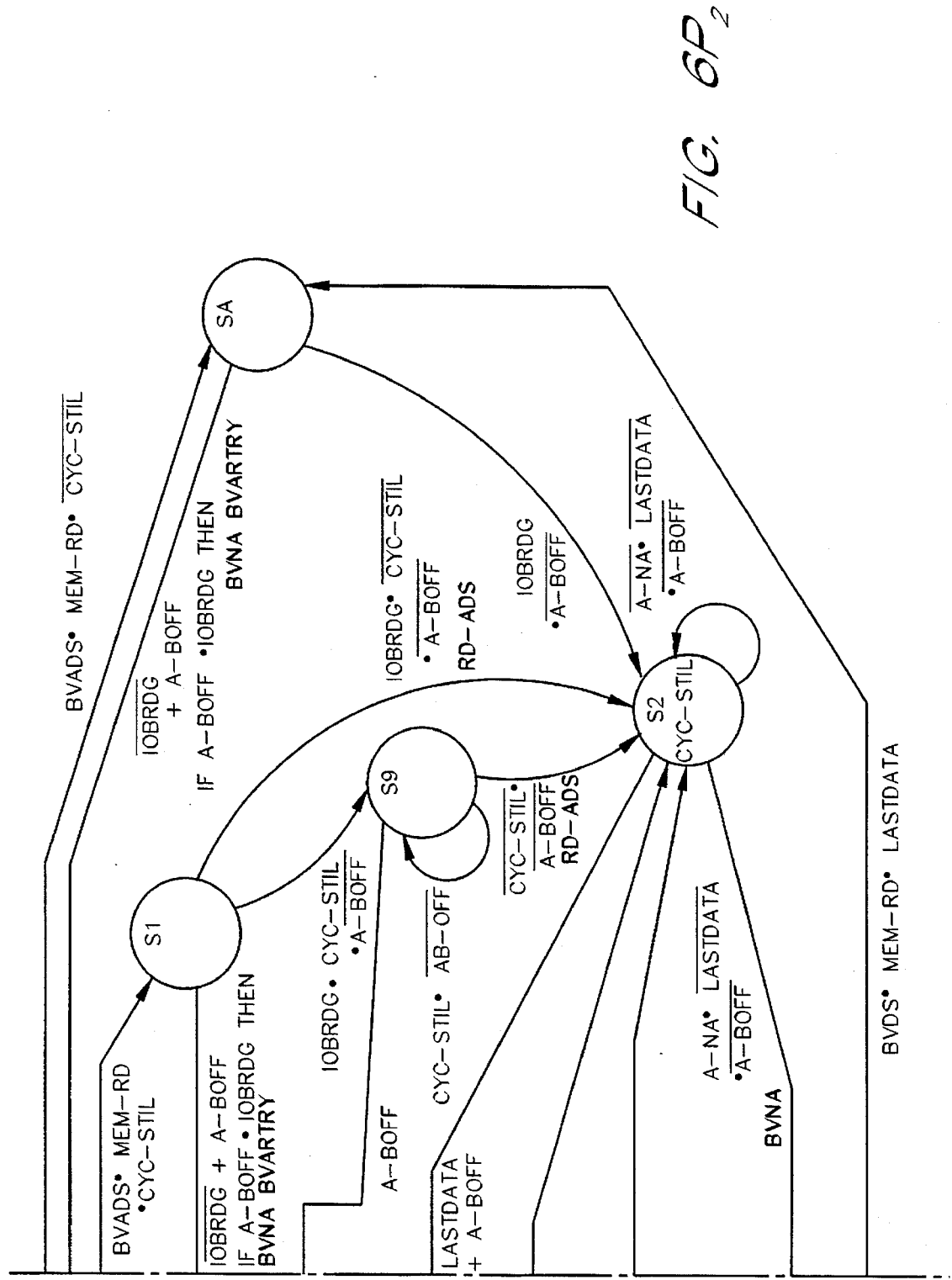
FIG. 6P₂

WRITE-BACK AND SNOOP WRITE-BACK BUFFER TO PREVENT DEADLOCK AND TO ENHANCE PERFORMANCE IN AN IN-ORDER PROTOCOL MULTIPROCESSING BUS

BACKGROUND OF THE INVENTION

1. Field of the Invention

The present invention relates to multiprocessor computer systems using an in-order multiprocessing bus, and in particular, to multiprocessing systems including central processing units (CPUs) with write-back cache memories having snoop capability.

2. Description of the Related Art

Multiprocessor computer systems using in-order protocol multiprocessor buses are well known in the art. In such systems, multiple central processing units (CPUs) communicate with one another and other devices, such as memory units, via a 32-bit or 64-bit communication bus. A first CPU module can issue a read data request onto the bus and, while the first CPU module is waiting for a response from the addressed memory unit, a second CPU module can issue a second read data request before a response is received from the memory unit accessed by the first CPU module. However, the in-order protocol requires that the first CPU module receive a reply from the accessed memory unit before the second CPU module receives a reply from the memory unit which is accessed by the second CPU module. Furthermore, in-order protocol busses are characterized in that a new address cycle is able to begin immediately after the last address cycle is complete.

In such multiprocessor systems, each of the CPU modules typically includes a cache memory. As is well known in the art, a cache memory is a fast memory storage unit which is under the control of the CPU within each of the CPU modules. A cache memory may be either a write-through cache memory or a write-back (sometimes called copy back) cache memory.

A write-through cache memory always immediately writes data changes within memory locations of the cache to corresponding memory locations within the main memory module. Thus, for example, if the central processing unit within the first CPU module writes new data into the cache memory within the first CPU module at a given address, the cache memory will immediately write the same data into the corresponding address in the main memory module via the multiprocessor bus. It should be noted here that the main memory module will typically have a portion of memory which has a mapped one-to-one correspondence to memory locations within the cache memories of each of the CPU modules. The memory locations within the main memory module that can have corresponding cache memory locations are typically called cacheable memory addresses. At any time, a portion of the cacheable memory addresses are mapped into the cache memories. The mapped portions typically change over time as the CPU modules request data from different portions of the main memory. When changes occur, the data in the cache memories are swapped out and replaced with data from the main memory. It is important that the corresponding memory locations within each of the cache memories and the main memory unit contain the same data because when an input/output device wishes to access a memory location, the memory location will typically be accessed within the main memory unit. However, if the main memory unit does not have the same data as the cache memory of a corresponding address, this indicates that the main memory unit has yet to be updated with the most recent data which is present within the address sought by the input/output device. Thus, erroneous data may be retrieved by the input/output device if the main memory unit does not have the same data as the corresponding cache memory address.

Although write-through cache memories guarantee that corresponding memory locations within the cache memories and the main memory module have the same data, the necessity of immediately accessing the multiprocessor bus each time the CPU within a CPU module writes to the cache memory causes a number of interruptions on the multiprocessor bus. These interruptions often create bus inefficiencies which may severely compromise the performance of the overall multiprocessor system.

To overcome the difficulties associated with write-through cache memories, write-back cache memories have been used. Write-back cache memories write data from the cache memory to a corresponding memory location within the main memory unit at a later time when the data is requested by another device (such as an input/output device or another CPU module). Of course, because there is a possibility that an input/output unit will address a memory location within the main memory unit that has not yet been updated by the cache memory, systems which employ write-back cache memories typically include a snoop feature. The snoop feature determines if a cacheable memory location within the main memory unit has the same data written as the corresponding memory location within a cache memory of one of the CPU modules.

Within a typical snoop equipped system, an extra bit is appended to the end of the address field within a cache memory when data at that address has been modified by the local CPU and has not yet been transferred to the corresponding memory location within the main memory unit. This extra bit, commonly referred to as a "dirty" bit, allows a memory controller within the main memory unit to determine if data at a given address has been modified by the local CPU. Thus, if an input/output unit is accessing a memory location within the main memory unit that has a corresponding memory location within the cache, and the cache memory location includes a dirty bit, then the memory controller will cause the cache memory having the modified data at the requested address to immediately write the data to the memory within the main memory unit. In this manner, the input/output device can access the desired memory address and be ensured that the data within the memory address is current.

Typically, multiprocessor systems which are highly concerned with bus efficiency include a write-back buffer within the main memory unit. The write-back buffer is used to quickly latch a sequence of data blocks from the multiprocessor bus. Typically, the memory controller within the main memory unit individually retrieves data from the multiprocessor bus and stores this data within the dynamic random access memory (DRAM) in the main memory unit. However, if the internal buffer within the memory controller already contains data, this process is generally quite time consuming. By providing a write-back buffer within the main memory module which is capable of quickly latching data from the multiprocessor bus, the CPU modules on the multiprocessor bus do not have to wait for the memory controller.

As is well known in the art, memory transactions for cacheable memory addresses in the INTEL® Pentium P5 microprocessor provide four blocks of 64-bit data on the multiprocessor bus in consecutive clock cycles. These transfers are referred to as bursts, and are sometimes referred to as INTEL bursts. By sending data in this burst fashion, a high bus efficiency is achieved. However, some memory controllers, such as may typically be implemented within the main memory unit, would not be sufficiently fast to latch each of the sequentially output data blocks and transfer these into the DRAM. Further, even the faster memory controllers would be unable to quickly latch data from the system bus if the internal buffer of the memory controller is full. Thus, if a CPU module outputting data had to wait for a ready signal from the main memory unit each time a new data block was output to the memory unit, then a transfer of four blocks of memory might require a time delay of several clock cycles between each data block.

By providing a write-back buffer, the main memory unit can simply assert a memory ready signal for four consecutive clock cycles so that each of the four data blocks are immediately latched into the write-back buffer. The write-back buffer then writes the latched data to the memory controller within the main memory module at a rate sufficiently slow to ensure that a complete data transmission is made from the write-back buffer to the DRAM via the memory controller.

In multiprocessor systems including write-back buffers, snoop circuitry typically includes a way to first determine whether there is data within a write-back buffer having the address specified by the input/output device. If it is determined that there is no data within the write-back buffer at the same address as the data requested by the input/output device, then the memory control within the main memory unit snoops the cache memories within each of the CPU modules. If it is determined that one of the cache memories within the CPU modules has new data at the memory address accessed by the input/output unit, then this data must be written immediately to the DRAM within the main memory unit.

If the write-back buffer already includes data at some different address than that accessed by the input/output unit, then the data from the cache memory simply overwrites the data within the write-back buffer. Thus, the data in the write-back buffer is lost during the write-back sequence of the snooped cache address. This phenomena is commonly referred to as deadlock and may compromise the performance of the multiprocessor system.

SUMMARY OF THE INVENTION

One aspect of the present invention is a computer system which includes a memory subsystem which receives addresses and which stores data in storage locations indexed by the addresses. A first access device provides addresses to the memory subsystem and transfers data to and from the memory subsystem. The first access device includes a cache memory subsystem which temporarily stores data transferred from the first access device to the memory subsystem. The cache memory subsystem provides indicators when the cache memory subsystem has data stored therein which has not been transferred to the memory subsystem. A second access device provides addresses to the memory subsystem and transfers data to and from the memory subsystem. The second access device obtains access to the memory subsystem on a time-shared basis with the first access device. A first write buffer receives data from the first access device and stores data from the first access device until the data can be transferred to the memory subsystem. A second write buffer is also provided. A memory controller is responsive to addresses from the second access device to control access of the second access device to the memory subsystem. The memory controller compares an address received from the second access device and determines whether the address received from the second access device corresponds to an address for which data is stored in the cache awaiting transfer to the memory subsystem. The memory controller causes the data stored in the cache to be transferred to the memory subsystem via the second write buffer to thereby make the data stored in the cache accessible to the second access device.

A second aspect of the present invention is a method of controlling access to a memory subsystem by first and second independent devices having access to same memory locations. The first device includes a cache that temporarily stores modified data to be transferred to a storage location in the memory subsystem corresponding to a first address. The memory subsystem includes a first write buffer that stores data transferred to the memory subsystem from the first device when the memory subsystem is unable to store the data in the storage location. The method comprises the steps of providing a second address from the second device and comparing the second address with the first address. When the second address is identical to the first address, the method transfers the modified data from the cache to the memory subsystem via a second write buffer before providing data from the memory subsystem to the second device. The second write buffer bypasses the first write buffer such that any data in the first write buffer is unchanged by the transferring step.

A third aspect of the present invention is a memory subsystem accessible by a computer system having at least first and second access devices wherein at least the first access device includes a cache system which temporarily stores data to be transferred from the first access device to a range of addresses in the memory subsystem. The memory subsystem comprises a memory array comprising a plurality of data storage locations. Each data storage location is addressable by a respective address. A first write buffer receives address and data information from the first access device and stores the address and data information until the data information can be stored in the memory array at an address corresponding to the address information. A memory controller is responsive to an address from the second access device. The memory controller compares the address from the second access device with the range of addresses to determine whether the address is within the range of addresses. The memory controller further determines whether the cache system has modified data stored therein to be stored at a location in the memory array corresponding to the address from the second access device. The memory controller transfers the modified data to the memory array via logic that bypasses the first write buffer.

A fourth aspect of the present invention is a method for preventing deadlock in a computer system having multiple devices which access a memory subsystem. The multiple devices include at least a first device having a cache memory which stores modified data to be transferred to a predetermined location in the memory. The memory subsystem can receive information to be stored from the first device and temporarily delay storing the information. A second device can access predetermined location in the memory before the modified data is transferred to the predetermined location from the cache memory. The method comprises the steps of detecting that the second device is accessing the predetermined location in the memory subsystem; detecting that the cache memory has modified data that has not been transferred to the predetermined location in the memory subsystem; and transferring the modified data from the cache memory to the predetermined location in the memory subsystem prior to transferring the information temporarily delayed information.

A fifth aspect of the present invention is a memory controller which controls access to a memory subsystem from first and second data transfer devices. The first data transfer device includes a cache memory for storing data therein. The memory controller comprises a first write buffer which receives a first set of data and a first address from the first data transfer device and which holds the first set of data and the first address until the first set of data can be stored in the memory subsystem at a storage location selected by the first address. An interface circuit receives a second address from the second data transfer device. The interface circuit includes a comparator that compares the second address to the first address. The interface circuit transfers the first set of data from the first write buffer to the second data transfer device when the first address and the second address are identical. The interface circuit further includes a cache snoop circuit which is activated when the first address and the second address are different. The cache snoop circuit compares the second address to addresses of data cached within the cache to determine whether the second address corresponds to a snooped address of modified data stored within the cache. The cache snoop circuit initiates a snoop write-back cycle when the second address corresponds to a snooped address of modified data. A snoop write-back bypass circuit provides a selectably enabled address and data path from the cache to the plurality of memory locations. The snoop write-back bypass circuit is activated when the cache snoop circuit initiates the snoop write-back cycle to transfer the modified data to a memory location in the memory subsystem selected by the second address. The modified data is transferred to the memory subsystem prior to the transfer of the first set of data.

A sixth aspect of the present invention is a memory subsystem which provides access to a plurality of addressable memory locations by first and second access devices. The first access device includes a cache. The cache stores modified data to be transferred to a first addressable location in the memory subsystem. The memory subsystem comprises a write buffer connected to receive a first set of data from the first access device. The write buffer holds the first set of data until the data can be stored in a second addressable location in the memory subsystem. A write buffer bypass circuit is connected to transfer a second set of data directly from the cache in the first access device to the memory independently of the write buffer. A memory interface circuit receives an access request from the second access device. The memory interface circuit determines whether the access request is directed to the first addressable location. The memory interface activates the buffer bypass circuit to transfer the modified data directly from the cache to the first addressable location before the first set of data is transferred from the write buffer to the second addressable location.

DETAILED DESCRIPTION OF THE INVENTION

Figure 1:
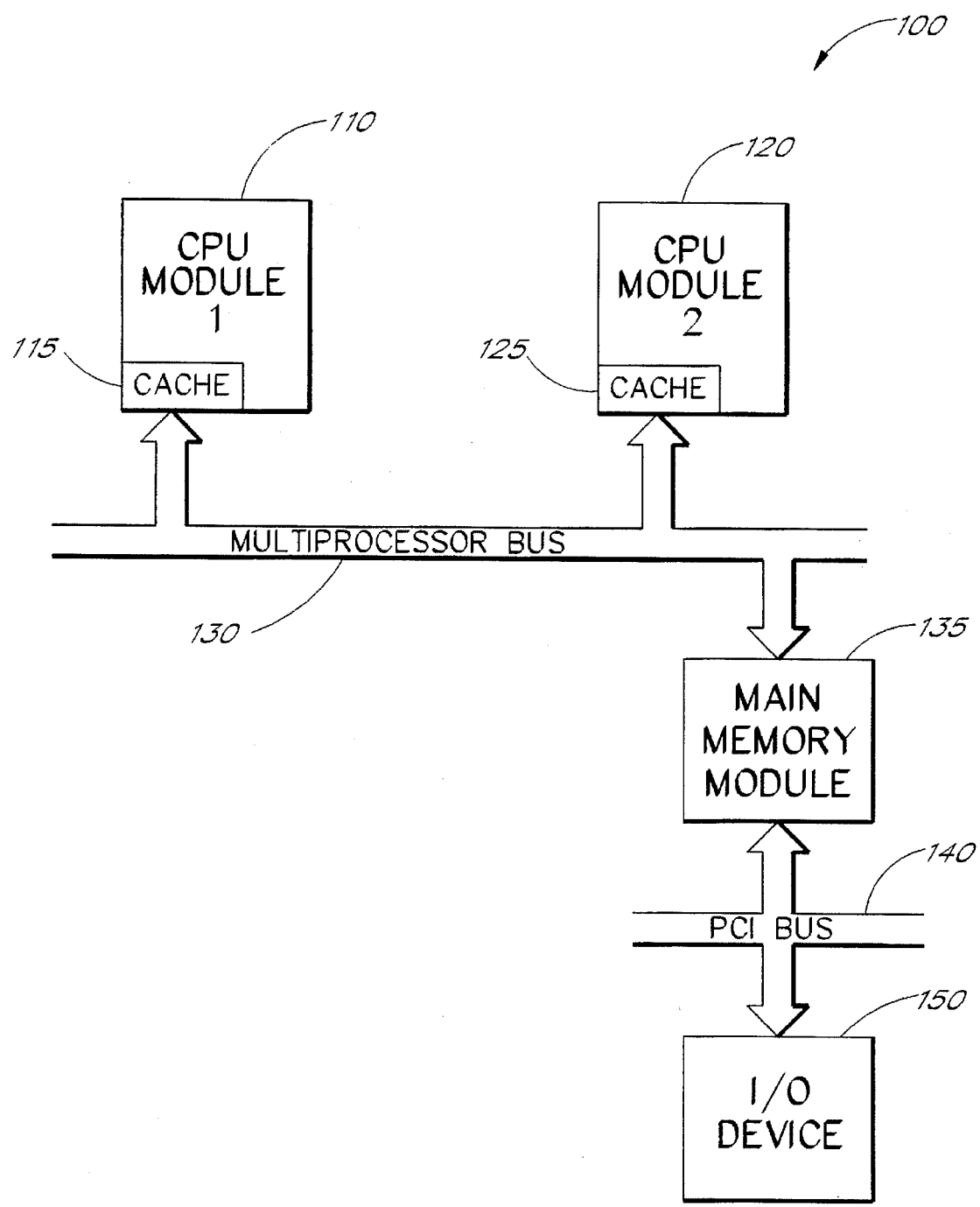
FIG. 1 is a schematic block diagram showing the main structural elements of a multiprocessor computer system.

FIG. 1 depicts a multiprocessor computing system 100. The computing system 100 includes a CPU module 110 which includes a cache memory 115 and a CPU module 120 which includes a cache memory 125. As is well understood in the art, each CPU module 110, 120, includes conventional circuitry such as a central processing unit, a bus controller, a bus interface, and other conventional circuitry which are not shown here. The CPU modules 110, 120 communicate with one anther via a multiprocessor bus 130. As is well known in the art, the multiprocessor bus may include a central arbitrator (not shown) which receives requests for possession of the multiprocessor bus 130 and grants possession of the multiprocessor bus 130 to selected requesting devices. The multiprocessor bus 130 also acts as a communication link between each of the CPU modules 110, 120 and a main memory module 135. As will be described in greater detail below, the main memory module 135 includes DRAM as well as control and interface circuitry (not shown in FIG. 1). The main memory module 135 communicates with an input/output (I/O) device 150 via a local PCI bus 140. The I/O device 150 may, for example, comprise a disk drive, a keyboard, etc.

In operation, either of the CPU modules 110, 120 can initiate either a read or a write-back cycle wherein data is either read from or written back, respectively, to the main memory module 135. During a read cycle, the CPU module 110 or the CPU module 120 transmits a signal along the multiprocessor bus 130 indicating that data is to be read from a given address within the main memory module 135. Once a valid address has been placed on the multiprocessor bus 130 by one of the CPU modules 110, 120, then the main memory module 135 receives the issued address and retrieves the data located at the specified memory address. The main memory module 135 then outputs the data stored at the given address onto the multiprocessor bus 130 where the requesting CPU module 110, 120 retrieves the data.

Often, the requested data will be located at a cacheable memory address. As is well known in the art, a cacheable memory address is a memory address located within one of the cache memories 115, 125 of the CPUs 110, 120 which has a corresponding address within the main memory module 135. That is to say, each of the cache memories 115, 125 is defined by a range of memory addresses. This range of memory addresses corresponds to a range of memory addresses within the main memory module 135. Those memory addresses within the main memory module 135 which have corresponding memory address in the cache memories 115, 125 are called cacheable memory addresses. When data is accessed by one of the CPU modules 110, 120 and the accessed data is within a cacheable memory address, the requested data is stored within the cache memory of the requesting CPU module. Once the requested data is stored within one of the cache memories 115, 125 of the requesting CPU modules 110, 120, the central processing unit within the receiving CPU module 110, 120 is able to quickly access the data stored within the cache memory 115, 125.

Often, as the CPU within the CPU module 110, 120 accesses data stored within the cache memory 115, 125, the CPU will modify data stored within the local cache memory. Because the cache memories 115, 125 are write-back cache memories in the multiprocessor system 100, the cache memories 115, 125 will not immediately write modified data back into the corresponding memory address of the main memory module 125. Rather, the cache memories 115, 125 will hold the modified data until another device requests access to the data contained within the modified cacheable address or until the cache location is needed to store data from a different mapped portion of the main memory. The modified address locations within the cache memories 115, 125 will include an additional "dirty" bit to indicate that the data within this cache memory address is modified data which has not yet been written back to the corresponding address within the main memory module 135. Once another device, such as another CPU module, requests access to the modified data stored in the cache memory 115, 125, the cache memory 115, 125 having the specified data transfers this data to the main memory module 135.

The I/O device 150 is also able to access the memory within the main memory module 135 via the PCI bus 140. Typically, the I/O device 150 will read data from, or write data to, memory addresses within the main memory module 135. If the memory address to be read by the I/O device 150 or to be written over by the I/O device 150 is not a cacheable memory address (that is it is not a memory address corresponding to any memory address within any of the cache memory units 115, 125), then the I/O device 150 immediately reads or writes over the data in the specified memory address. However, if it is determined that the memory address which is to be read or written over by the I/O device 150 is a cacheable memory address, then there is always a possibility that the data within the specified memory address is not the most recently written data. That is, it is possible that one of the CPUs within the CPU modules 110, 120 has written over data in the corresponding memory address within one of the cache memories 115, 125. Thus, if the I/O device 150 were to read data from a cacheable memory address within the main memory module 135, and it were not the latest data then the I/O device 150 would not receive the most recent data. On the other hand, if the I/O device 150 were to overwrite data within one of the cacheable memory address within the main memory module 135, then data which was written by the I/O device 150 would later be overwritten by the data within one of the cache memories 115, 125 so that incorrect data would be stored within the main memory module 135.

In order to prevent errors caused by delays in writing back from the cache memory 115, 125 to the main memory module 135, the multiprocessor system 100 includes snoop circuitry (not shown in FIG. 1) which determines if data accessed by the I/O device 150 has been modified within one of the cache memories 115, 125 and has not yet been written back to the main memory module 135. The snoop circuitry first determines if the I/O device 150 is accessing a cacheable memory address. If the I/O device 150 is accessing a cacheable memory address, then the snoop circuitry examines the corresponding address within the cache memory 115, 125 that holds the accessed address. If the memory location within the cache memory 115, 125 includes a "dirty" bit, this indicates that data has been modified at that address and has not yet been written back to the main memory module 135. Thus, the snoop circuitry causes the data within the accessed memory location to be immediately written back to the corresponding address within the main memory module 135. Of course, if the accessed memory address was in one of the cache memories 115, 125 and does not have an active dirty bit designator, then the snoop circuitry indicates to the I/O device 150 that the data contained within the accessed memory address of the main memory module 135 is valid data and can be read directly from the main memory module 135. It should be noted that the snoop circuitry also keeps the cache memories 115, 125 current when new data is written at a corresponding data address in the main memory module 135.

Figure 2:
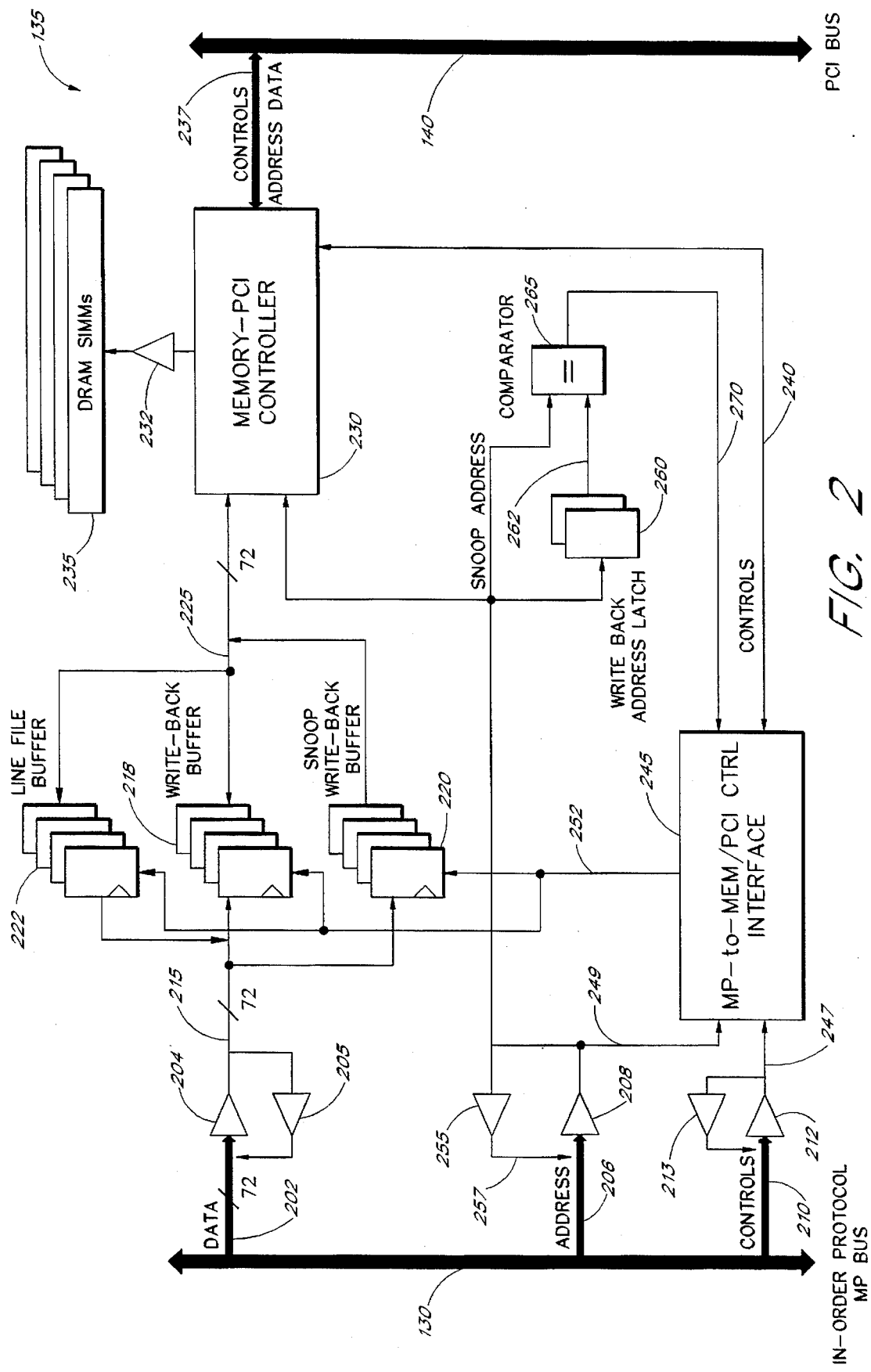
FIG. 2 is a schematic block diagram showing the main structural elements within the main memory module depicted within FIG. 1, and constructed in accordance with the teachings of the present invention.

FIG. 2 is a schematic block diagram representing the main structural elements within the main memory module 135 of FIG. 1. As shown in FIG. 2, the main memory module 135 includes a 72-line data bus 202 which serves as an input to a non-inverting buffer 204 and which also serves as an output for a non-inverting buffer 205. An address bus 206 serves as an input to a non-inverting buffer 208. A control bus 210 serves as an input to a non-inverting buffer 212 and as an output to a non-inverting buffer 213. In one embodiment, the non-inverting buffers 204, 205, 208, 212, and 213, may be implemented as non-inverting buffers commercially available from Texas Instruments as Model No. 74GTL16612. In one embodiment, the non-inverting buffers 204, 205, 208, 212, and 213, pass data from input to output in one clock cycle. The output of the non-inverting buffer 204, as well as the input of the non-inverting buffer 205, communicates with a write-back buffer 218, a snoop write-back buffer 220, and a line fill buffer 222 via a 72-line data bus 215. In one embodiment, the write-back buffer 218, the snoop write-back buffer 220, and the line fill buffer 222 may comprise buffers commercially available from Integrated Devices Technologies as Model No. 74FCT16270AT. The write-back buffer 218 and the snoop write-back buffer 220, as well as the line fill buffer 222 communicate with a memory PCI controller 230 via a data bus 225. In one embodiment, the memory PCI controller 230 may comprise an integrated circuit commercially available from IBM as Model No. IBM27-82P54 ALTA-MP. A specification describing one embodiment of the memory PCI controller 230, and entitled "IBM27-82P54 ALTA-MP Memory Controller/PCI Host Bridge Engineering Hardware Specification," dated May 27, 1994, and identified as Document Number IBM27-82P54, is herein incorporated by reference.

Figure 6A:
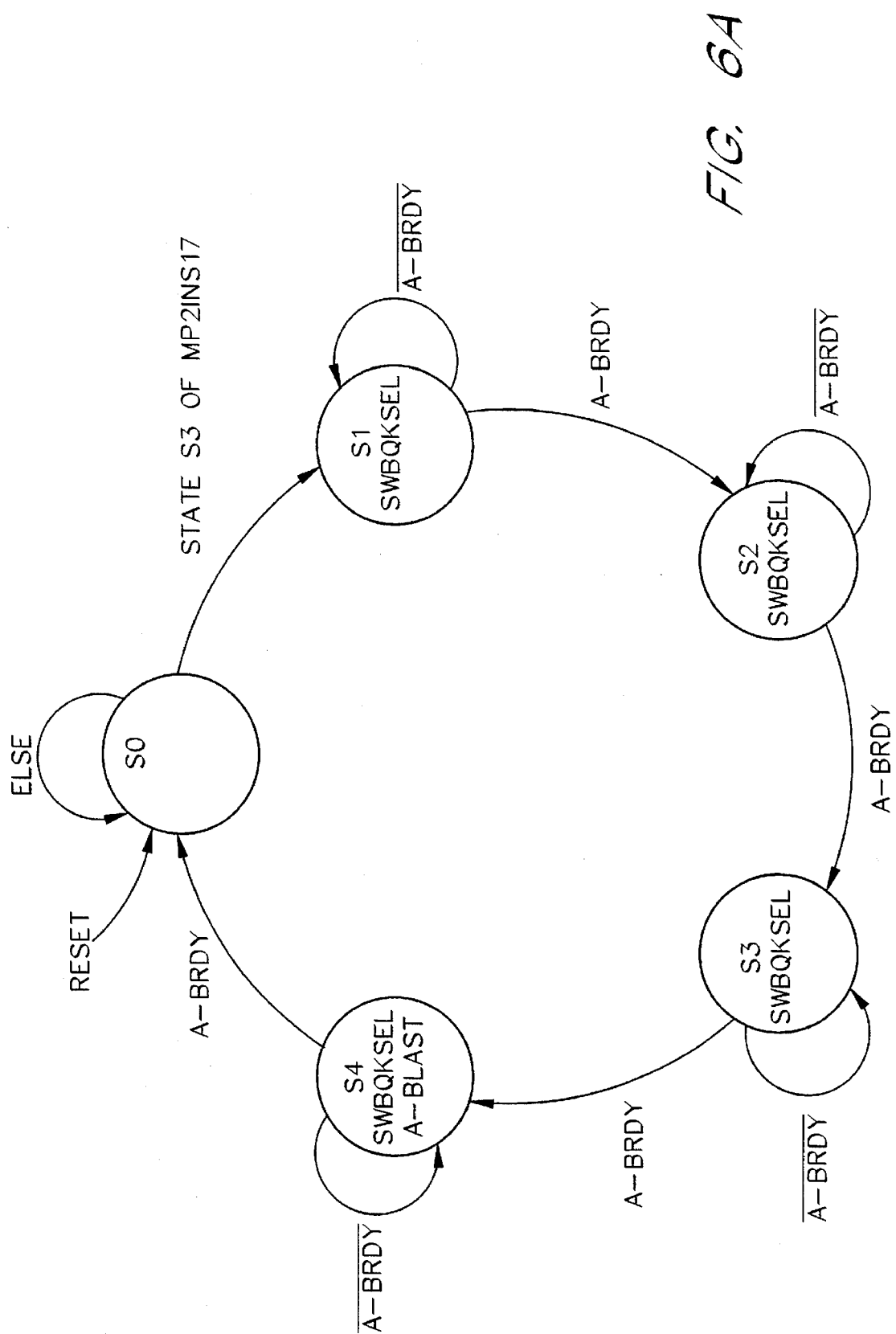
FIGS. 6A–6R are state diagrams of the operation of the control interface circuitry of FIG. 2.
Figure 6B:
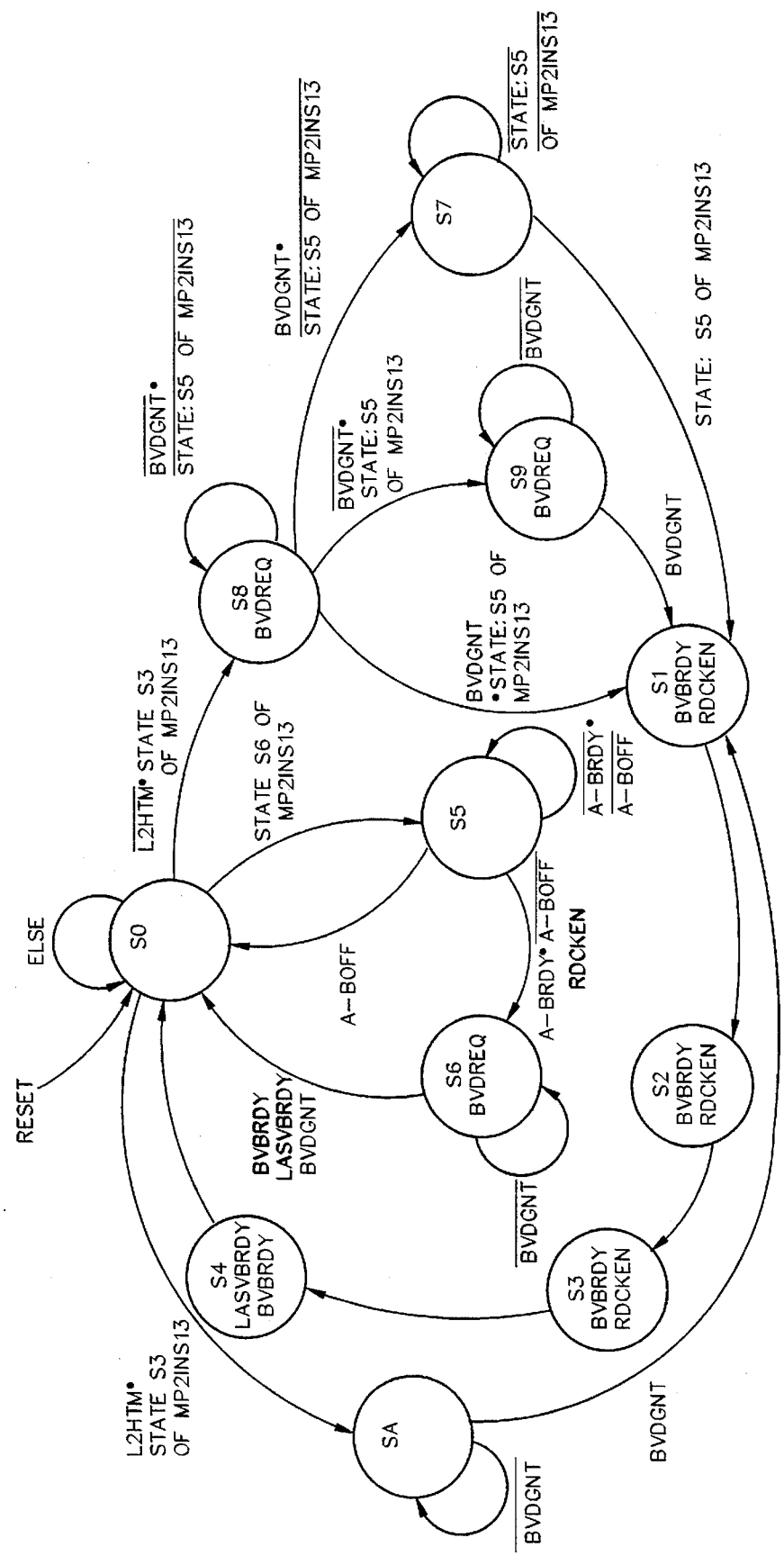
Figure 6C:
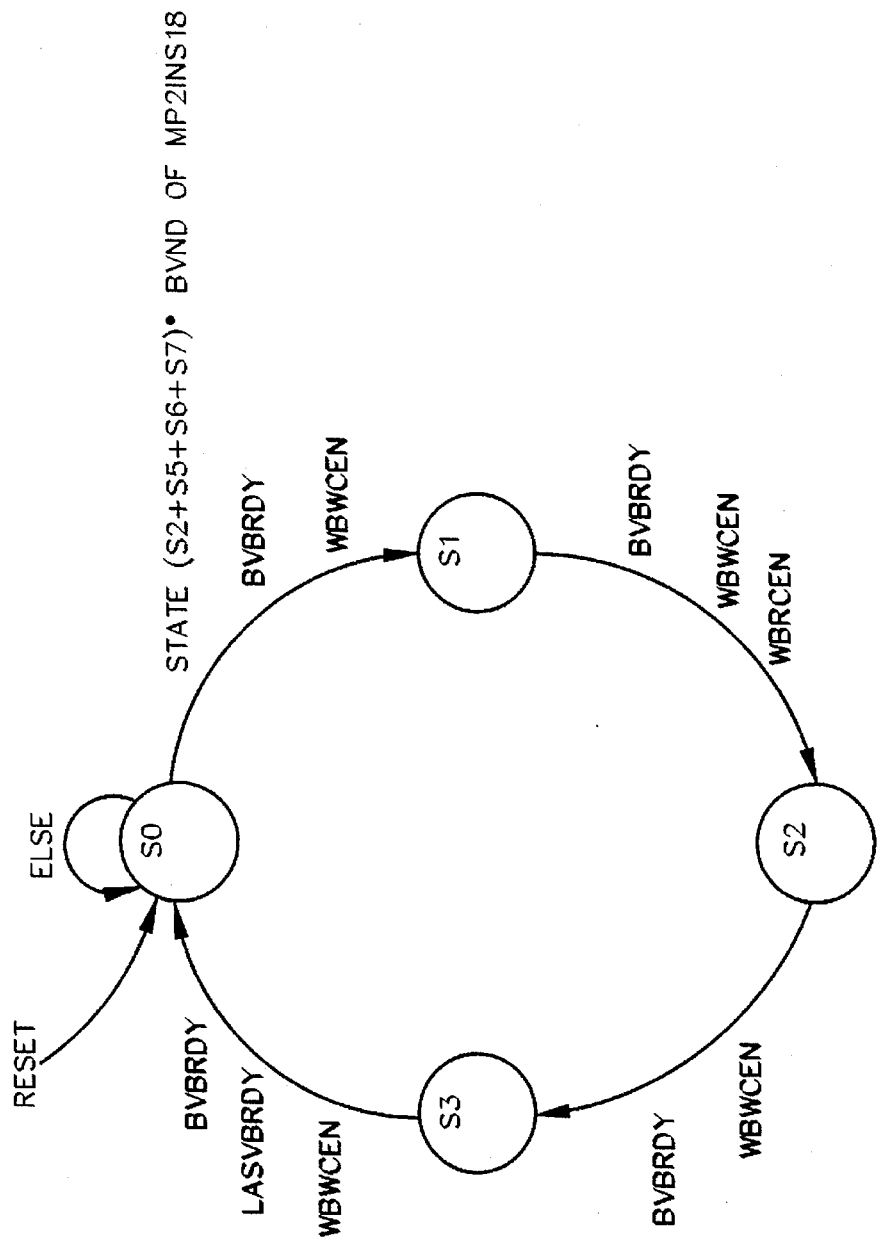
Figure 6D:
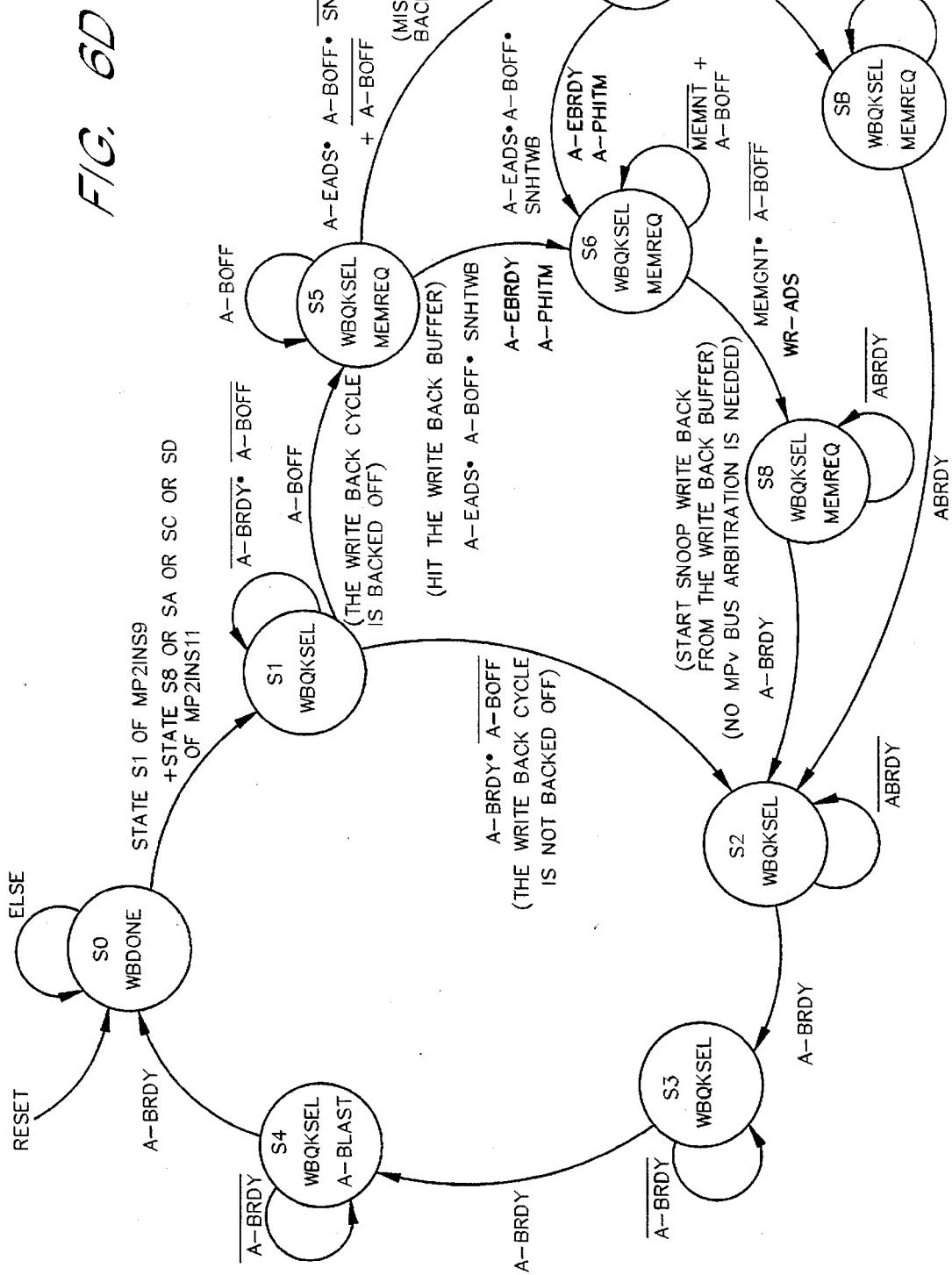
Figure 6G:
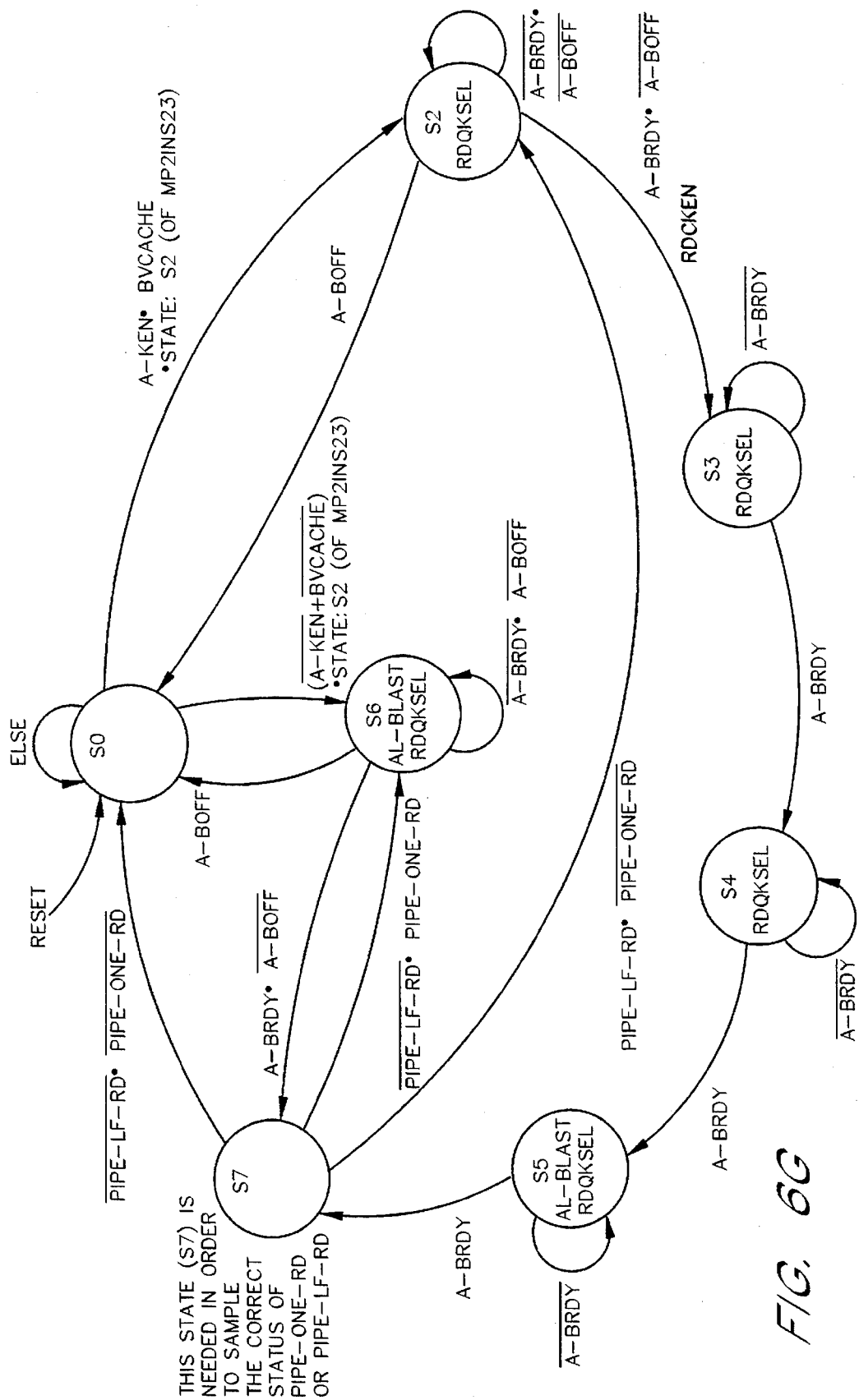
Figure 6H:
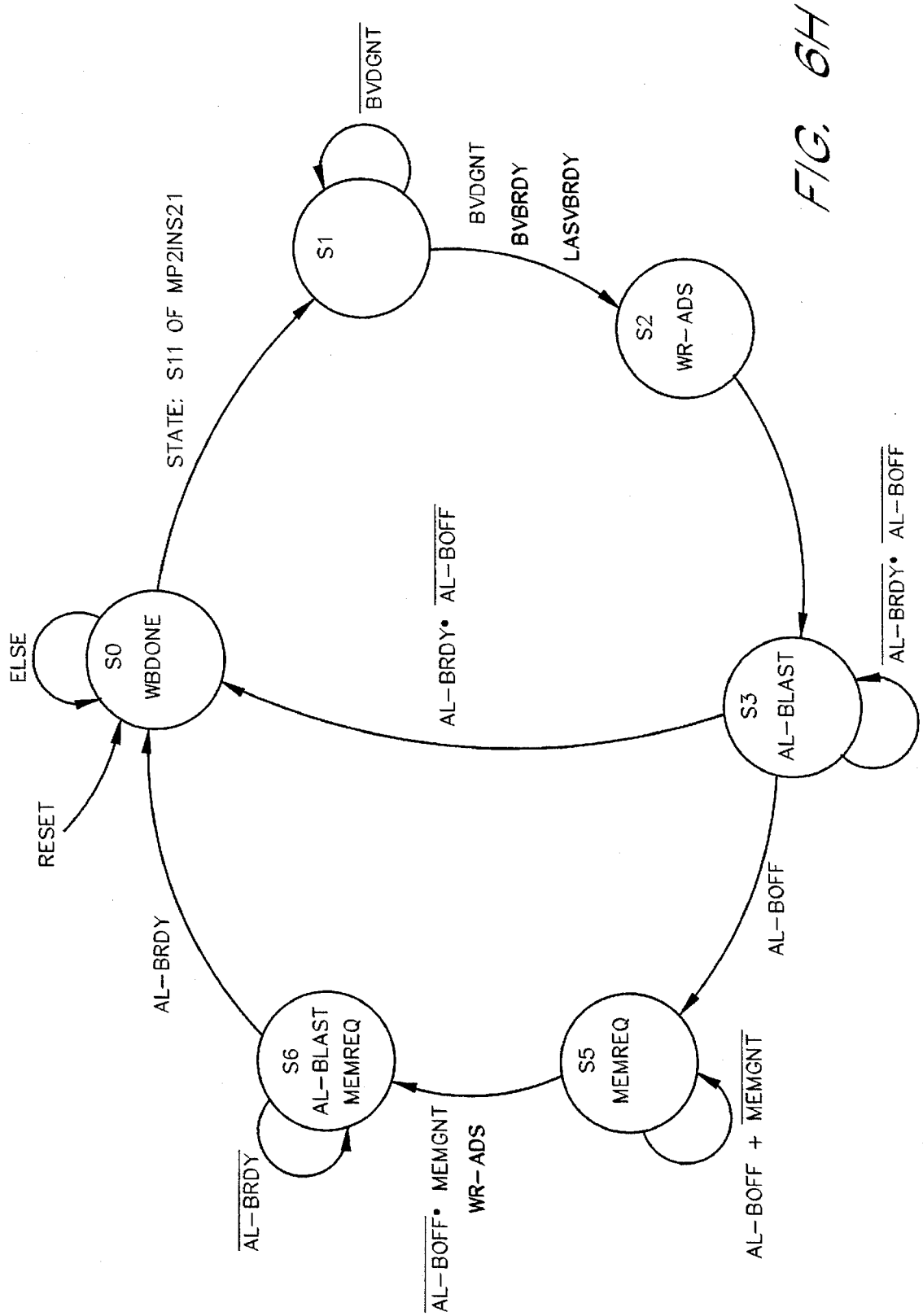
Figure 6J:
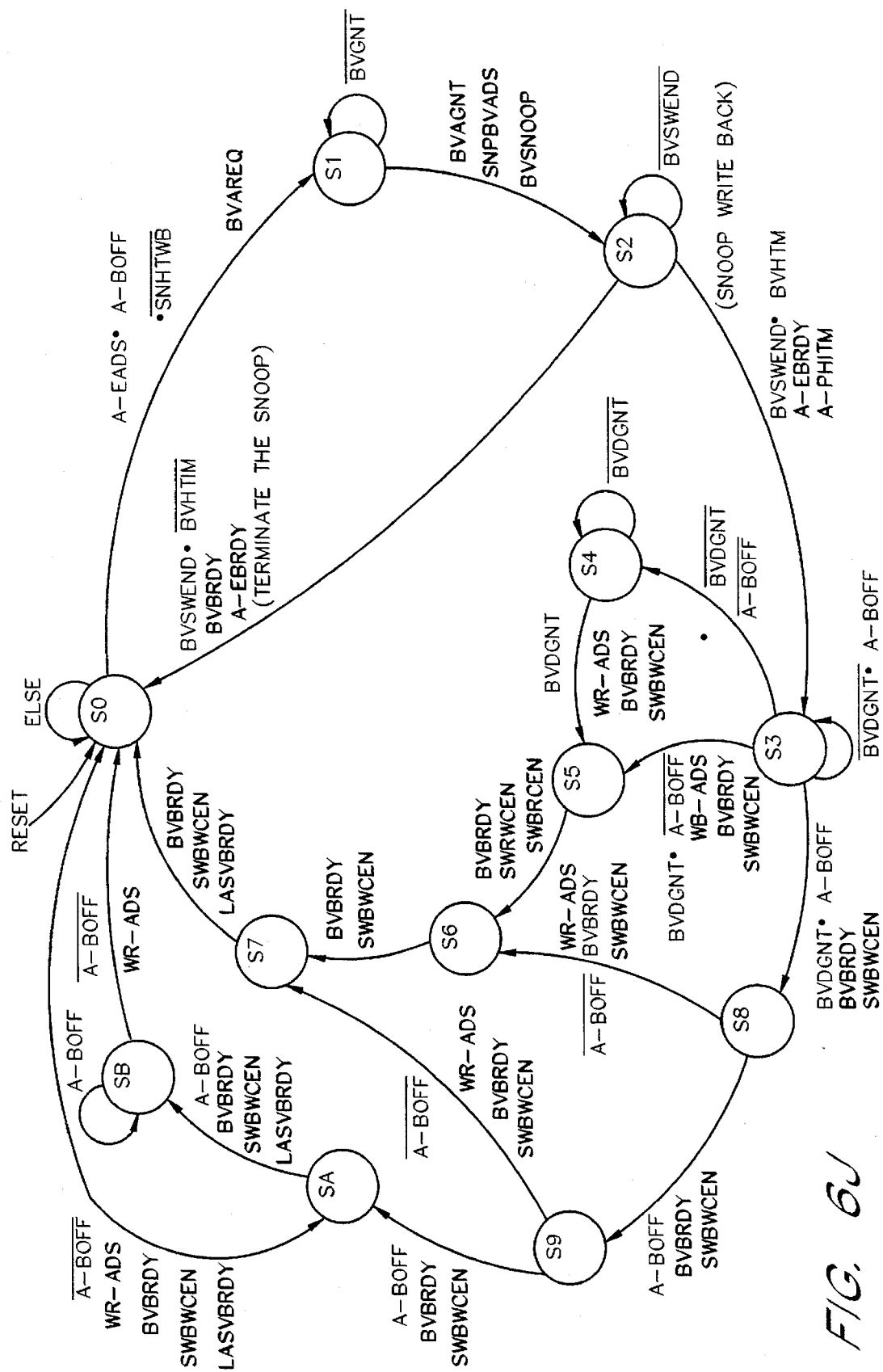
Figure 6L:
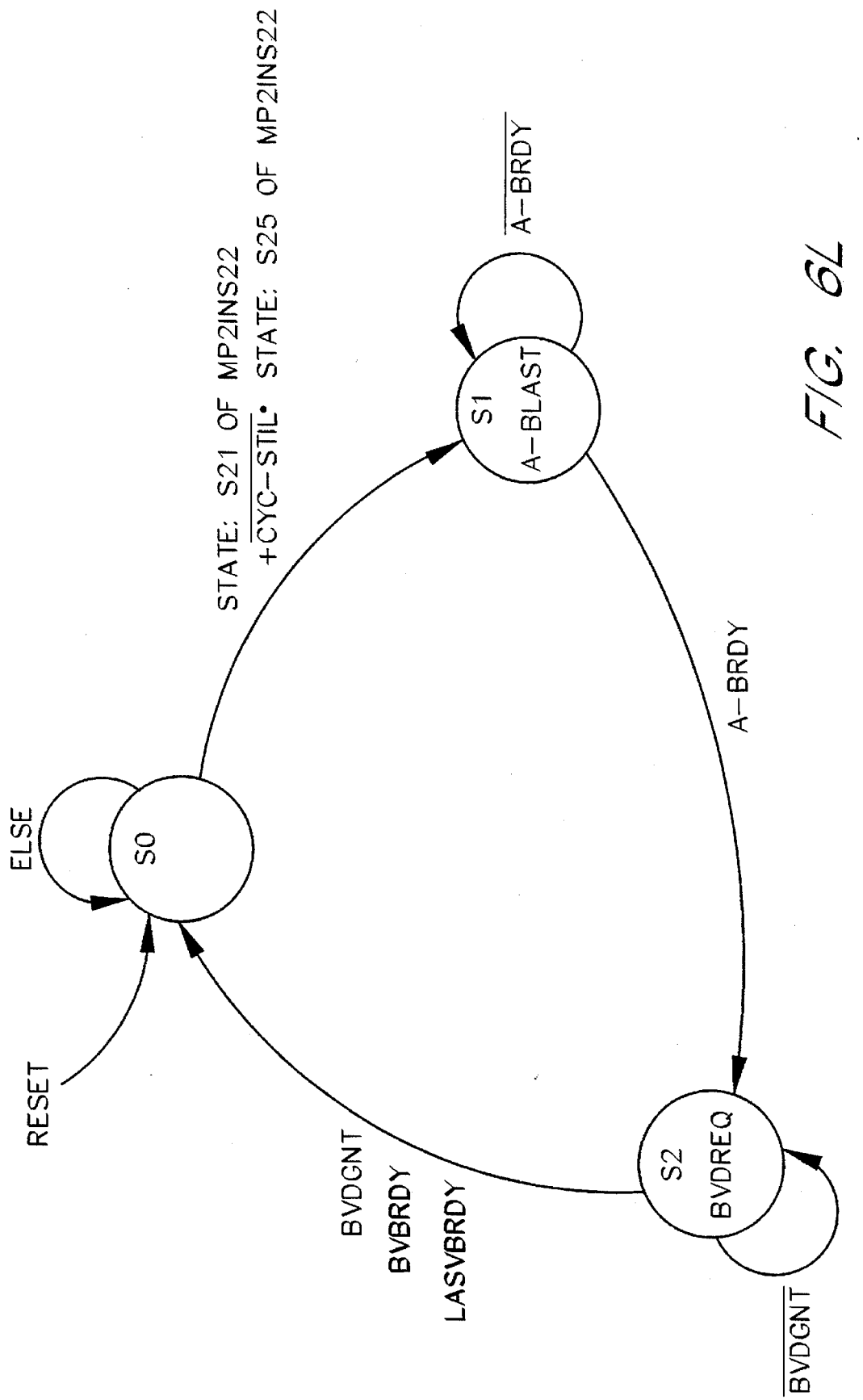
Figure 6N:
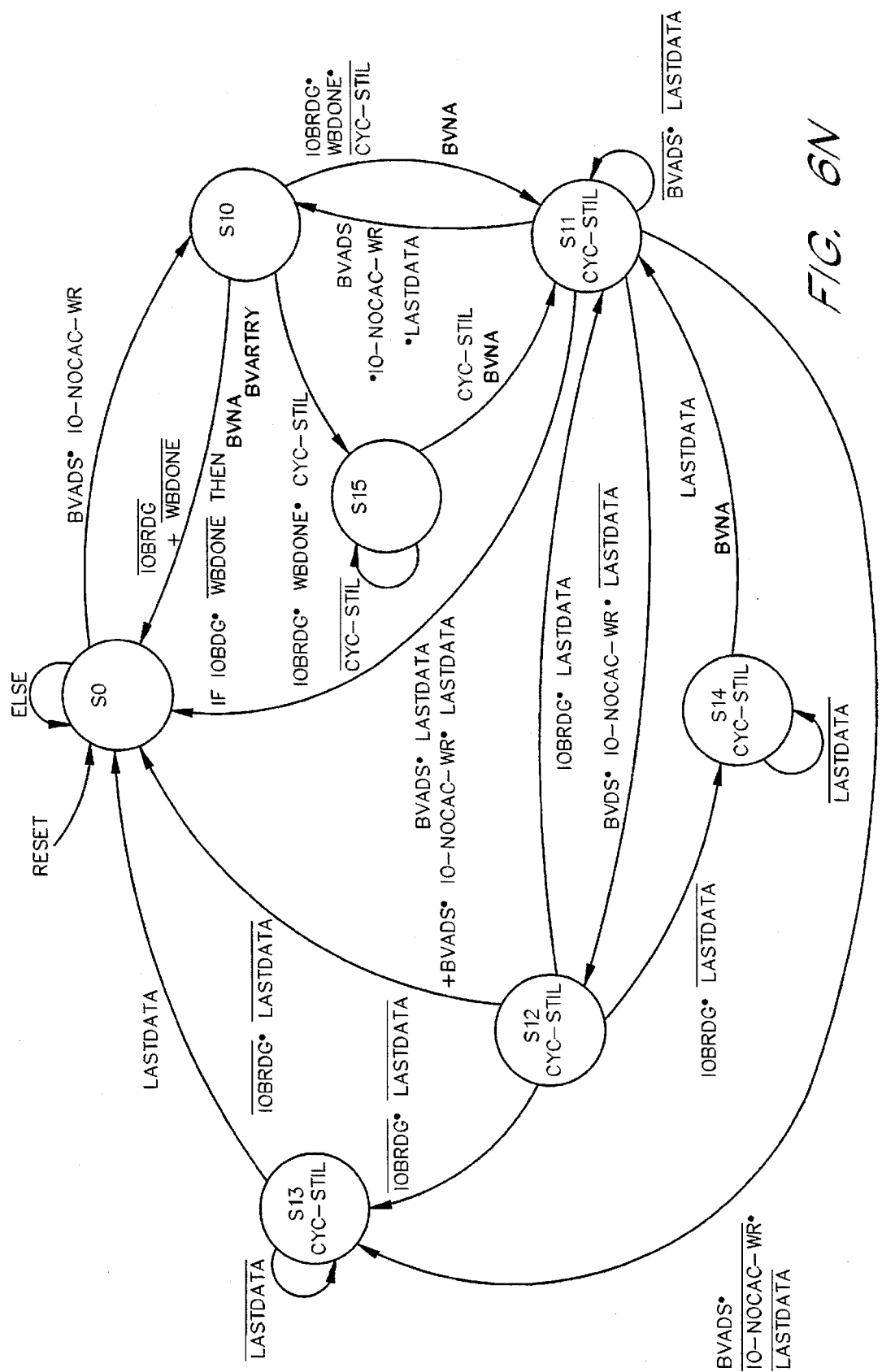
Figure 60:
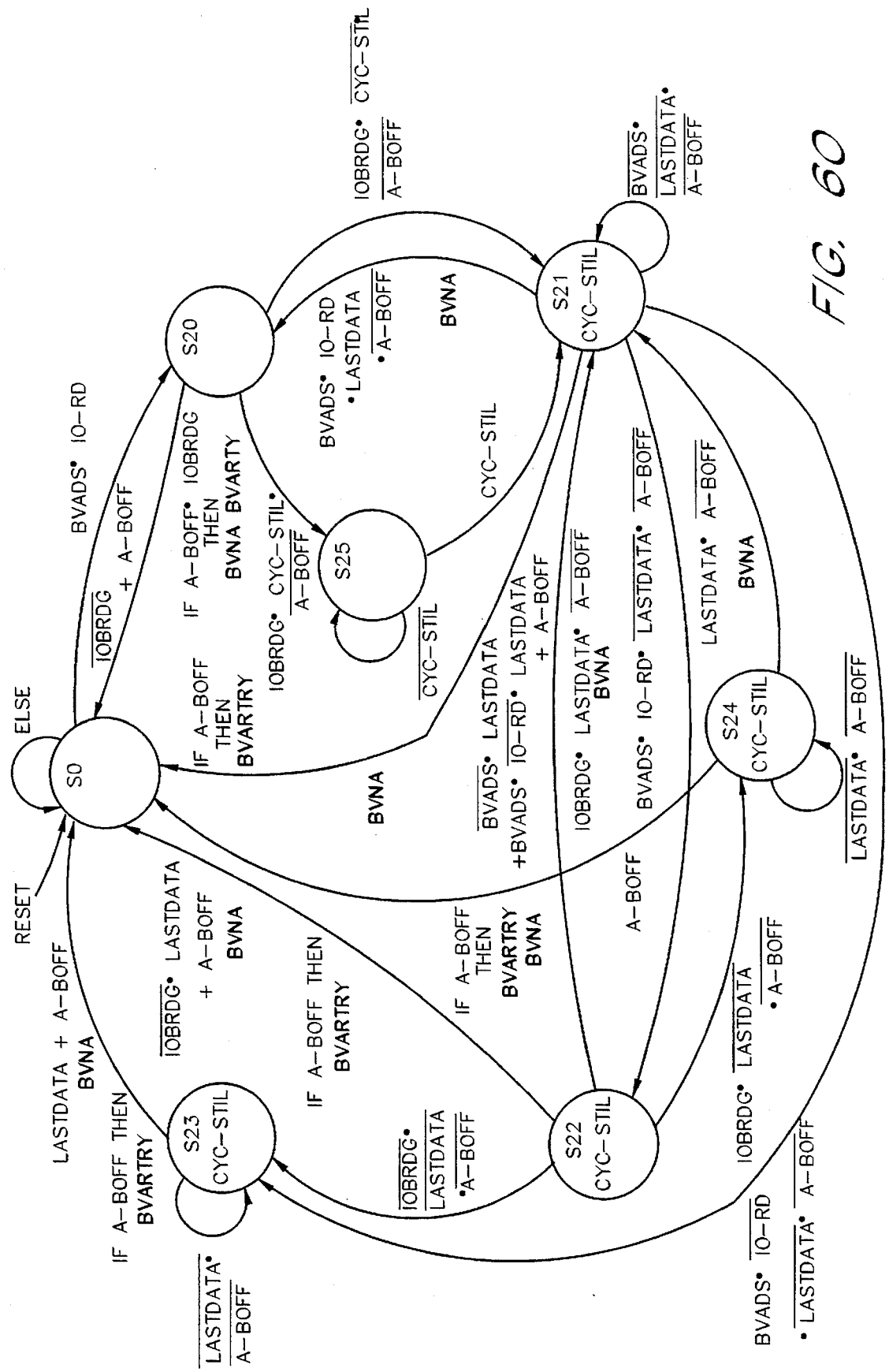
Figure 60:
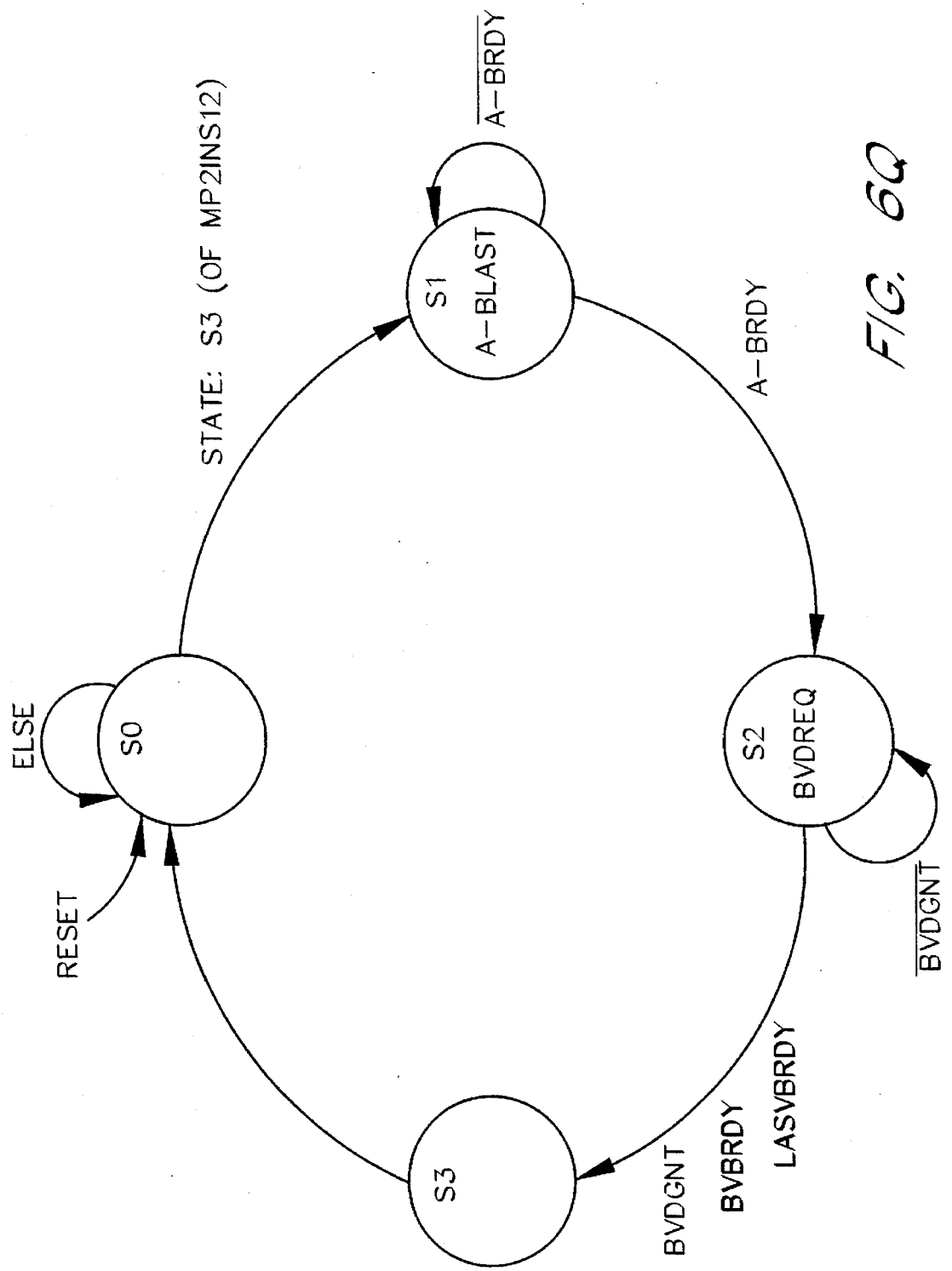
Figure 6R:
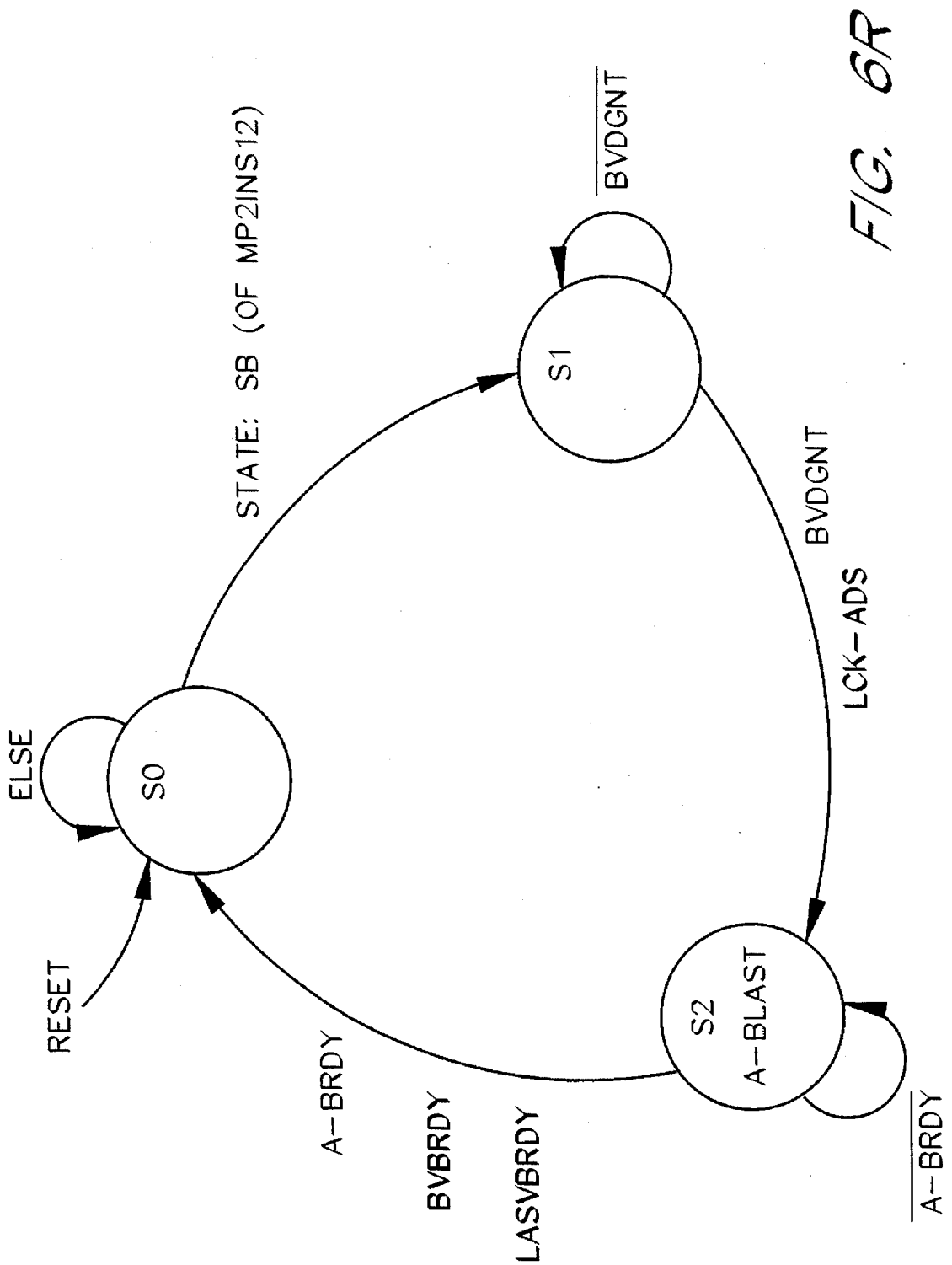

The memory PCI controller 230 communicates with a dynamic random access memory (DRAM) 235 via an non-inverting buffer 232. In one embodiment, the non-inverting buffer 232 is commercially available from Integrated Devices Technologies as Model No. 74FCT162244T. The memory PCI controller 230 also communicates with the PCI bus 140 via a control address and data bus 237. The memory PCI controller 230 further communicates with a multiprocessor-to-memory PCI control interface 245 via a control bus 240. The interface circuit 245 may, in one embodiment, comprise a field programmable gate array (FPGA) commercially available from Altera. FIGS. 6A–6R and Appendices A–S, discussed below, implement the logic of the interface circuit 245.

The control interface 245 receives inputs from the output of the non-inverting control buffer 212 via a line 247 as well as from the output of the non-inverting address buffer 248 via a line 249. The control interface 245 also outputs control to the multiprocessor bus 130 via the bidirectional control bus 247, the non-inverting buffer 213, and the control bus 210. The interface 245 communicates with the write-back buffer 218, the snoop write-back buffer 220 and the line fill buffer 222 via a line 252. The interface 245 further communicates with a non-inverting buffer 255 via the line 249. The non-inverting buffer 255 which may, in one embodiment, comprise an non-inverting buffer commercially available from Texas Instruments as Model No. 74GTL16612, outputs data to the multiprocessor bus 130 via a bus 257 and the address bus 206.

A write-back address latch 260 communicates with the memory PCI controller 230 and the interface 245 via the address bus 249. The output of the write-back address latch 260 serves as a first input to a comparator 265 via a bus 262. The address bus 249 provides a second input of the comparator 265. The comparator 265 outputs a signal to the interface circuit 245 via a line 270.

In operation, the CPU modules 110, 120 (FIG. 1) communicate with the main memory module 135 via the data address and control buses 202, 206, 210, respectively. For example, when data is to be read from the memory module 135, the requesting CPU module 110, 120 transmits an address strobe signal along the control bus 210 to indicate that a data address is valid on the address bus 206. The address on the address bus 206 is propagated to the memory PCI controller 230 via the non-inverting buffer 208 and the bus 249. The memory controller 230 accesses the requested data at the specified address within the DRAM 235 and outputs this data to the multiprocessor bus 130 via the line fill buffer 222, the non-inverting buffer 205, and the data bus 202.

In like fashion, data may be written from the CPU modules 110, 120 to the memory module 135. When one of the CPU modules 110, 120 writes data back to the memory module 135, the writing CPU module 110, 120 issues a control signal along the control bus 210 indicating that a valid address for the memory location at which data is to be written is present on the address bus 206. The interface circuit 245 receives the control signal indicating that a write-back is being performed and transmits control data to the memory PCI controller 230 via the bus 240. The control data from the interface circuit 245 indicates that the data stored at the specified address (i.e., the address available on the address bus 206 and subsequently propagated to the address bus 249) is to be overwritten by data received on the data bus 225 via the bus 202. Once the CPU module 110, 120 receives a ready signal from the interface circuit 245 via the control bus 210, the CPU module 110, 120 issues data onto the multiprocessor bus 130. As is well known in the art, such data is typically written as a burst. (Such a burst may be referred to as an INTEL burst because of its use by the INTEL® family of microprocessors.) Thus, because the memory PCI controller 230 is sometimes unable to receive a burst of four 64-bit data blocks in consecutive clock cycles, this data is first written to the write-back buffer 218. Subsequently, the write-back buffer 218 provides the data at a slower rate to the memory PCI controller 230. The memory PCI controller 230 in turn overwrites the data at the specified memory address within the DRAM 235. In this manner, data can be written to and read from the memory module 135 by the CPU modules 110, 120.

The memory module 135 also communicates with input/output devices such as the I/O device 150 (FIG. 1) via the PCI bus 140. When the I/O device 150 initiates a read cycle (that is, when the I/O device 150 indicates that data is to be accessed from the DRAM 235), then the I/O device 150 transmits an address strobe control signal via the bus 237 which indicates that a valid address is present on the bus 237. The memory PCI controller 230 then accesses the data at the indicated address within the DRAM 235 and outputs this data over the bus 140, via the bus 237, to the I/O device 150. In like manner, when data is to be written to the DRAM 235 by the I/O device 150, the I/O device 150 initiates an address strobe signal indicating that a valid address is present on the bus 237. The memory PCI controller 230 receives the address strobe in addition to a control signal indicating that data is to be overwritten at the indicated address and replies to the I/O device 150 with a ready signal. The I/O device 150 then initiates a data transfer to the memory PCI controller 230 via the PCI bus 140 and the bus 237. The memory PCI controller 230 then writes the data present on the bus 237 to the DRAM 235 at the address specified on the bus 237. In this manner, the I/O device 150 is able to write and read data from the memory module 135.

As detailed briefly above, certain difficulties are encountered when the I/O device 150 indicates that data within a cacheable memory address is to be read or written over. In such cases, the memory PCI controller 230 and the interface circuit 235 initiate a snoop cycle wherein data within the write-back buffer 218 as well as the cache memories 115, 125 are monitored to determine if the data accessed by the I/O device 150 is at an address which is contained within the write-back buffer 218 or which has been modified within one of the cache memories 115, 125.

Figure 5:
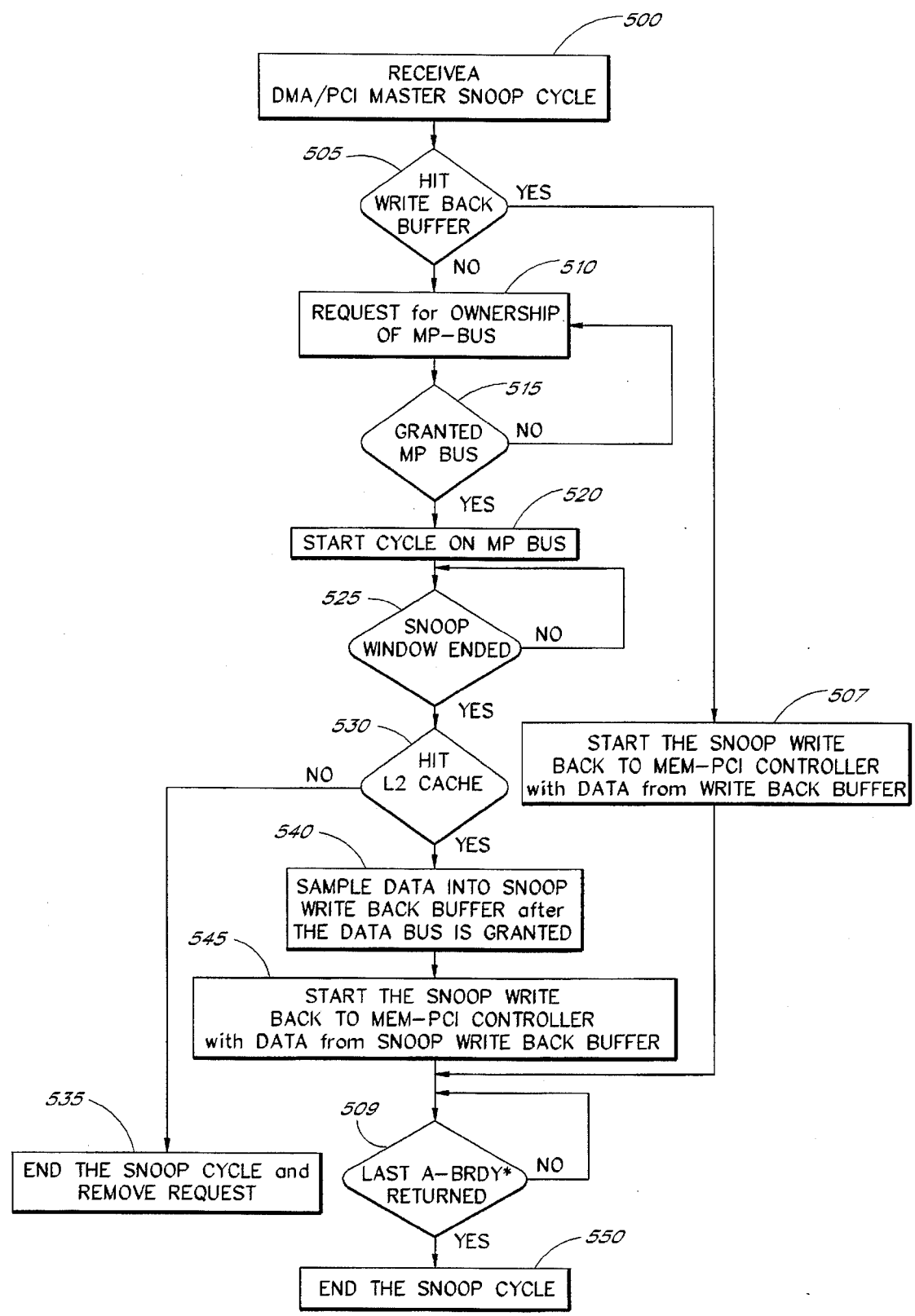
FIG. 5 is a flow chart which represents the general method employed in accordance with the present invention to handle data as determined by the multiprocessor to memory PCI control interface circuitry of FIG. 2.

FIG. 5 outlines a general method employed by the interface circuit 245 to handle a snoop cycle. Control begins within an activity block 500 which indicates that a snoop cycle command has been received from the memory PCI controller 230 via the line 240. That is, the memory PCI controller 230 indicates that the I/O device 150 has requested an access to a cacheable memory address on the DRAM 235. Control passes from the activity block 500 to a decision block 505 wherein the control interface 245 determines if the data at the specified cacheable address (i.e., the cacheable address requested by the I/O device 150) is present within the write-back buffer 218. If the data at the specified cacheable address is present within the write-back buffer 218, then control passes to an activity block 507. Within the activity block 507, data from the write-back buffer 218 is immediately transferred to the memory PCI controller 230 via the bus 225. The memory PCI controller 230 in turn overwrites this data into the designated cacheable address within the DRAM 235. The I/O device 150 then accesses the indicated cacheable memory address within the DRAM 335. Control passes from the activity block 507 to a decision block 509 (discussed below). If, however, it was determined within the decision block 505 that the write-back buffer 218 did not contain the data at the designated cacheable memory address, control then passes from the decision block 505 to an activity block 510.

Within the activity block 510, the control interface circuit 245 requests ownership of the multiprocessor bus 130. Control then passes to a decision block 515 wherein the control interface circuit 245 determines if the ownership of the multiprocessor bus 130 has been granted to the memory module 135. If ownership of the multiprocessor bus 130 has not been granted to the memory module 135, control returns to the activity block 510 wherein the control interface circuitry 245 again requests ownership of the multiprocessor bus 130. This cycle continues until ownership of the multiprocessor bus 130 is granted to the memory module 135.

Once ownership of the multiprocessor bus 130 is granted to the memory module 135, control passes from the decision block 515 to an activity block 520. As indicated in the activity block 520, the control interface circuit 235 begins a cycle on the multiprocessor bus 130. That is, the control interface circuit 245 accesses the specified address within one of the cache memories 115, 125. Control passes from the activity block 520 to a decision block 525 wherein the control interface circuit 225 determines if the snoop window has ended. The snoop window encompasses a predetermined number of clock cycles wherein the control interface circuit 245 can determine if one of the cache memories 115, 125 contains modified data at the designated address. If the snoop window has not ended, control returns to the decision block 525. However, if the control interface circuit 225 determines that the snoop window is over, control passes from the decision block 525 to a decision block 530.

Within the decision block 530, the control interface 245 determines if one of the cache memories 115, 125 indeed contains modified data at the designated cacheable memory address (i.e., the memory address requested by the I/O device 150). The control interface circuit 245 makes this determination based upon the presence of a "dirty" bit at the designated memory address. If the control interface circuit 245 determines that the designated cacheable memory address within one of the cache memories 115, 125 does not contain modified data, then control passes to an activity block 535 wherein the snoop cycle is ended and the control interface circuit 245 removes the request for ownership of the multiprocessor bus 130. However, if the control interface circuit 245 determines that one of the cache memories 115, 125 indeed contains modified data at the specified cacheable address, then control passes from the decision block 530 to an activity block 540.

In the activity block 540, the control interface circuit 245 causes data to be transferred to the snoop write-back buffer 220 after the multiprocessor bus 130 has been granted. That is, the control interface circuit 245 initiates a request for data transfer over the multiprocessor bus 130 and waits for that request to be granted. Once the request is granted for transfer of data over the multiprocessor bus 130, the control interface circuit 245 initiates a latch signal along the line 252 to the snoop write-back buffer 220 causing the snoop write-back buffer to latch the data provided on the bus 215 via the non-inverting buffer 204, the data bus 202, and the multiprocessor bus 130. Control then passes from the activity block 545 to the decision block 509.

In the decision block 509, the control interface circuit 245 determines if the last ready signal from the memory PCI controller 230 has been returned. That is, the interface circuit determines if the last data block in the burst has been read to indicate that the data transfer cycle is over. If the last ready signal has not yet been returned from the memory PCI controller 230, control returns to the decision block 509. Once the data cycle is over, control passes from the decision block 509 to an activity block 550 wherein the snoop cycle is ended.

Figure 3:
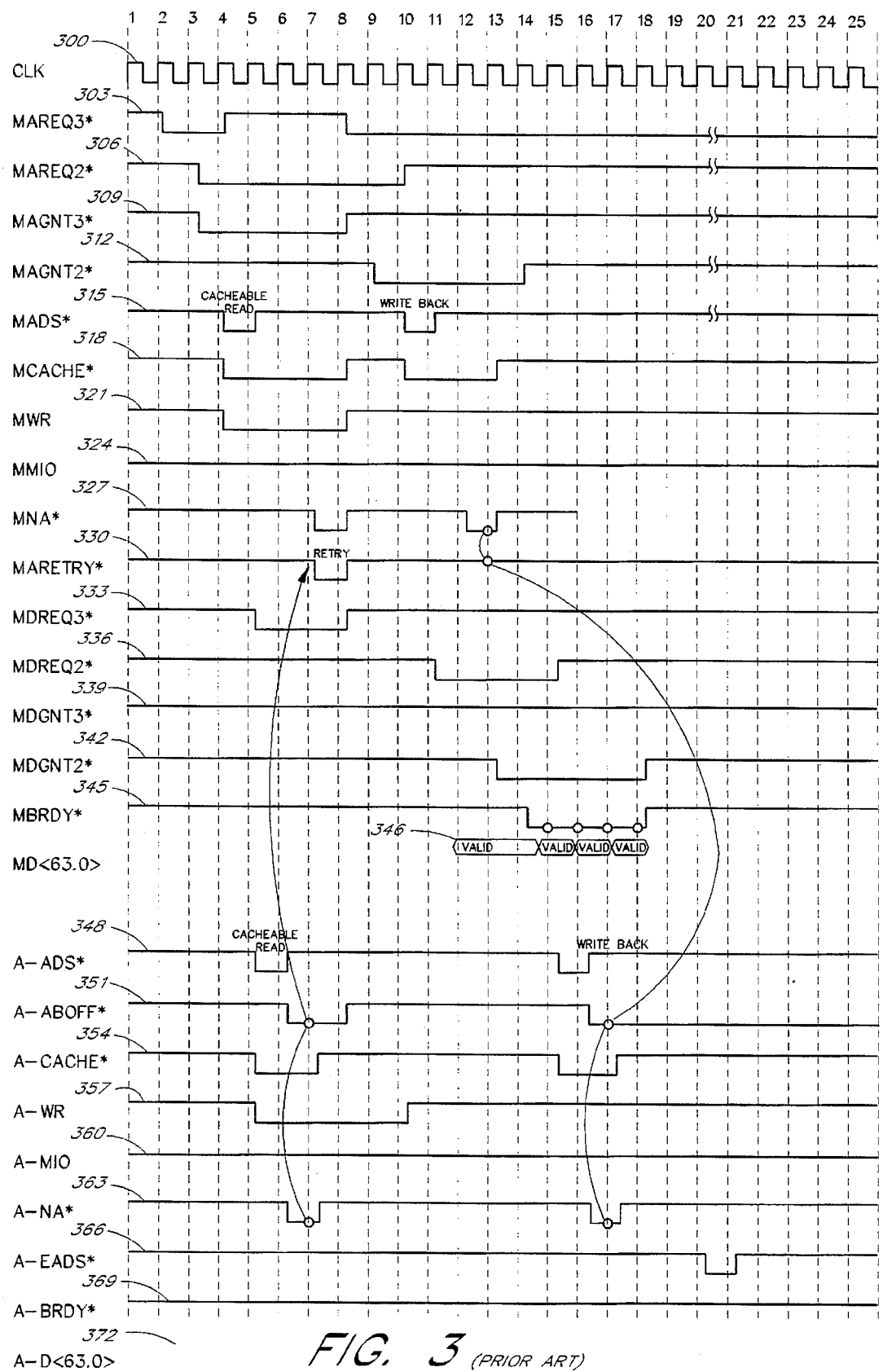
FIG. 3 is a timing diagram showing the significant signals asserted during a typical cacheable read and write-back data sequence.
Figure 4:
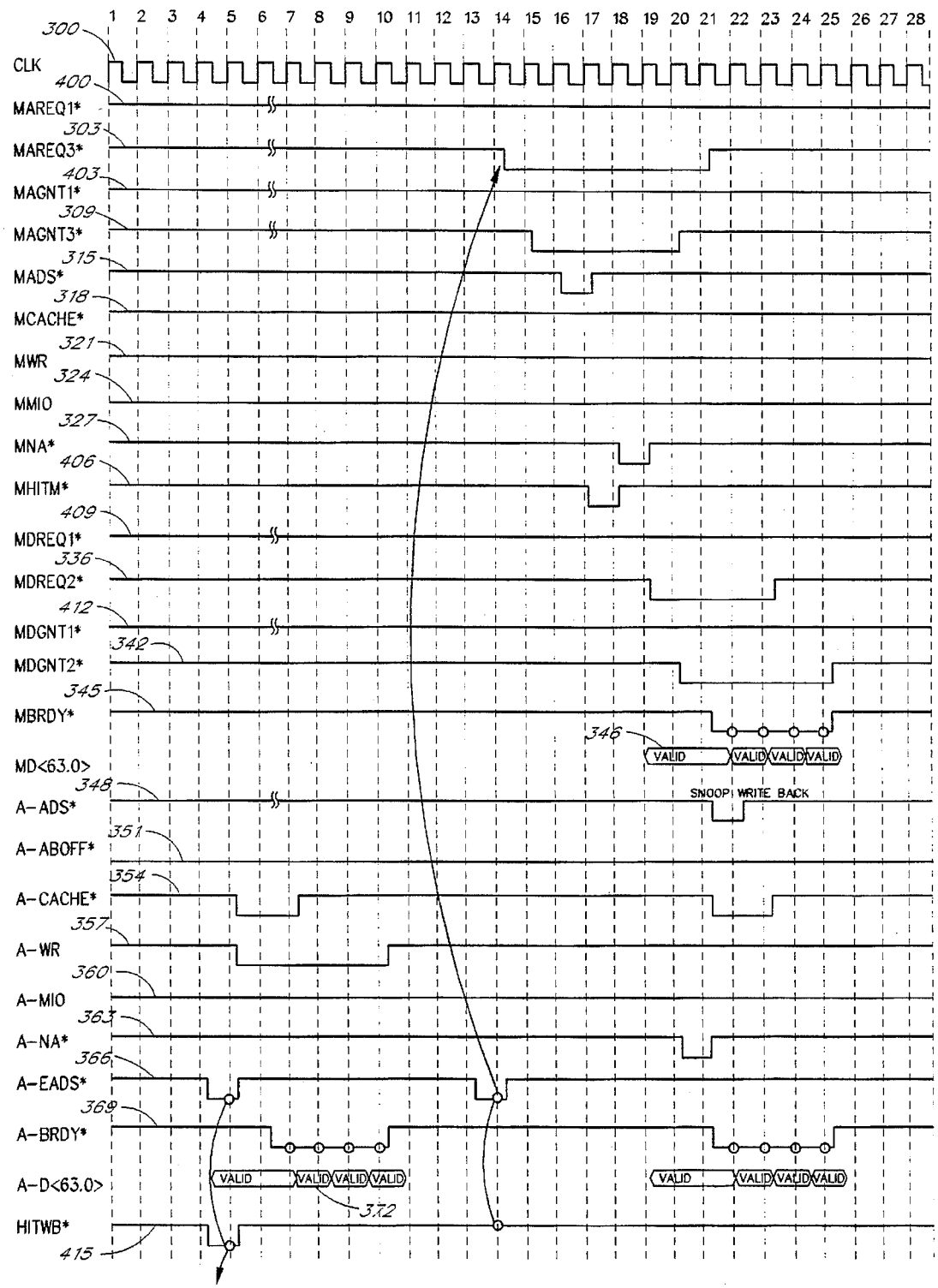
FIG. 4 is a timing diagram which illustrates the significant signals asserted during a snoop write-back in accordance with the teachings of the present invention.

FIGS. 3 and 4 are timing diagrams which illustrate in more detail the control and data signals employed in accordance with the present invention. FIG. 3 serves to illustrate the benefit of the write-back buffer 218 during write back cycles from the CPU modules 110, 120. Specifically, FIG. 3 illustrates a conventional case wherein a write-back cycle is rejected by the memory PCI controller 230. FIG. 4 serves to illustrate the advantages of the present invention over systems which include write-back buffers within the memory module 135, but do not incorporate the teachings of the present invention. Specifically, FIG. 4 illustrates a case wherein a snoop cycle determines that the write-back buffer 218 includes data at a cacheable memory address requested by the I/O device 150, as well as the case wherein a snoop determines that there is no data within the write-back buffer 218 corresponding to the designated address, but that there is modified data within one of the cache memories 115, 125 at the specified memory address.

As shown in FIG. 3, a clock signal 300 serves as a universal timing signal for the entire multiprocessor system 100. MAREQ1 and MAREQ2 signals 303, 306, respectively, indicate that the first and second CPU modules 110, 120, respectively, are requesting control of the address portion of the multiprocessor bus 130. The MARQ1 and MARQ2 signals 303, 306 are asserted along arbitration control lines within the multiprocessor bus 130. The central arbitrator on the multiprocessor bus 130 asserts MAGNT1 and MAGNT2 signals 309, 312 along control lines within the multiprocessor bus 130. The MAGNT1 and MAGNT2 signals 309, 312 indicate whether the address bus portion of the multiprocessor bus 130 has been granted to either the first CPU module 110 or the second CPU module 120, respectively.

A MADS signal 315 is asserted along memory-I/O control lines (i.e., control lines which serve as a communication link between the memory module 135 and the I/O device 150, and the CPU modules 110, 120) within the multiprocessor bus 130. The MADS signal 315 is an address strobe signal indicating whether a valid address is provided along the address bus portion of the multiprocessor bus 130. The MADS signal 315 is asserted by one of the CPU modules 110, 120 when one of the CPU modules 110, 120 indicates that data is to be written or read at the address on the multiprocessor bus 130.

Each CPU module 110, 120 also asserts a MCACHE signal 318, a MWR signal 321, and a MMIO signal 324 on memory-I/O control lines of the multiprocessor bus 130. The MCACHE signal indicates whether the address which is valid on the address bus portion of the multiprocessor 130 is a cacheable address. That is, the MCACHE signals indicate whether the address location has a corresponding address in either of the cache memories 115, 125. The MWR signal 321 indicates whether data at the address location which is valid on the multiprocessor bus 130 is to be written to the memory module 135 or read from the memory module 135. The MMIO signal 324 indicates whether the data is to be retrieved from the memory module 135 or the I/O device 150.

A MNA signal 327 is asserted by the controller interface 245 on the memory-I/O control lines of the bus 130 via the bus 247, the non-inverting buffer 213, and the bus 210. The MNA signal 327 indicates that the memory module 135 is ready to receive the next address. A MARETRY signal 330 is also asserted by the controller interface 245 on the memory-I/O control lines of the bus 130 via the control bus 210. The control interface 245 asserts the MARETRY signal 330 to indicate that the memory module 135 has rejected an attempt by one of the CPU modules 110, 120 to write data back to the DRAM 235. Thus, the MARETRY signal 330 indicates to the transmitting CPU module 110, 120 that CPU module 110, 120 should retry writing the same data to the memory module 135.

The MDREQ2 signal 336 may be asserted on the arbitration control lines of the multiprocessor bus 130 during a write cycle by the CPU module 120 to indicate that the CPU module 120 is requesting control of the data portion of the multiprocessor bus 130. The control interface circuit 245 may also request control of the data portion of the multiprocessor bus 130 by asserting a MDREQ3 signal 333 during a read cycle. The control interface circuitry 245 asserts the MDREQ3 signal 333 to indicate that the control interface circuitry 245 is to transmit data to either the first or second CPU modules 110, 120. MDGNT3 and MDGNT2 signals 339, 342 indicate that control of the data portion of the multiprocessor bus 130 has been granted to either the main memory module 135 or the CPU module 120, respectively.

The control interface circuit 245 asserts a MBRDY signal 345 over the memory-I/O control lines of the bus 130, as well as the control bus 210, to indicate that the write-back buffer 218 within the memory module 135 is ready to receive data over the data portion of the multiprocessor bus 130. A MD signal 346 represents the valid data placed on the data portion of the multiprocessor bus 130. As shown in FIG. 3, the valid data is placed on the data portion of the multiprocessor bus 130 in four consecutive clock cycles in accordance with the INTEL burst data transaction protocol.

The above-described signals relate to the control and transfer of data between the CPU modules 110, 120 and the memory module 135 via the multiprocessor bus 130. It should be noted that each of the signals described above is considered active low with the exception of the MWR, MMIO, and MD signals 321, 324, and 346, respectively. Furthermore, those skilled in the art will appreciate that other signals (not shown here) which are not important for describing the operation of the present invention are also used for control and transfer of data between the memory module 135 and the CPU modules 110, 120 via the multiprocessor bus 130.

The following signals, also depicted within FIG. 3, relate to the control and transfer of data within the memory module 135, specifically between the control interface circuit 245, the memory PCI circuit 230, and the I/O device 150 via the PCI bus 140.

An AADS signal 348 is asserted by the control interface circuit 245 on the bus 240. The AADS signal 348 indicates to the memory PCI controller 230 that a valid address is present on the address bus 249. An AABOFF signal 351 is asserted by the memory PCI controller 230 on the bus 240 to indicate whether the control interface circuit 245 is to initiate a retry signal over the control bus 210.

An ACACHE signal 354 is asserted by the control interface 245 on the bus 240 to indicate to the memory PCI controller 230 whether or not the address which is valid on the address bus 249 corresponds to a cacheable address within the DRAM 235. An AWR signal 357 indicates whether data within the address location indicated by the address bus 249 is to be written or read from that address location. The AWR signal 357 is asserted by the control interface circuit 245 over the bus 240. An AMIO signal 360 is initiated by the control interface circuit 245 on the bus 240 to indicate whether the data is to be written to or read from the DRAM 235 or the I/O device 150.

An ANA signal 363 is initiated by the memory PCI controller 230 to indicate that the memory PCI controller 230 is ready to receive the next address over the bus 249. The ANA signal is typically asserted over the control bus 240. An AEADS signal 366 is asserted by the memory PCI controller 230 over the bus 240 when a snoop cycle is to be asserted on the multiprocessor bus 130 by the interface circuit 245. An ABRDY signal indicates that the memory PCI controller 230 is ready to accept data over the bus 225. The ABRDY signal 369 is asserted over the control bus 240. An AD signal 372 represents the data output over the address bus 225 (as shown in FIG. 3, no valid data is placed on the bus 225).

Referring to the cycle of events depicted in the timing diagram of FIG. 3, the first CPU module 110 requests control of the address portion of the multiprocessor bus 130 by asserting the MAREQ1 signal 303 beginning in the second clock cycle. Subsequently, the second CPU module 120 requests control of the address portion of the multiprocessor bus 130 by asserting the MAREQ2 signal 306 in the third clock cycle. Since the first CPU module 110 initiates a request for the address portion of the multiprocessor bus 130 before the CPU module 120 requests control of the multiprocessor bus 130, control of the address portion of the multiprocessor bus 130 is granted to the first CPU module 110. This is indicated by the assertion of the MAGNT1 signal 309 in the third clock cycle. Once the first CPU module 110 receives the indication in the third clock cycle that control of the address portion of the bus 130 has been granted to the first CPU module 110, the first CPU module 110 asserts the MADS signal 315 in the fourth clock cycle, thereby indicating that a valid address has been placed onto the multiprocessor bus 130. The first CPU module 110 also asserts both the MCACHE and MWR signals 318, 321 to indicate that the valid address on the multiprocessor bus 130 is a cacheable memory address and that the data stored within the cacheable memory address location is to be read by the first CPU module 110. The MMIO signal 324 remains unasserted to indicate that the data at the designated cacheable address issued on the multiprocessor bus 130 is to be read from the memory module 135 and not from the I/O device 150.

Once the address strobe signal (MADS) 315 has been received by the control interface circuitry 245, the control interface circuitry 245 asserts the AADS signal 348 along the bus 240 within the fifth clock cycle. In addition to asserting the AADS signal 348, the interface circuitry 245 further asserts the ACACHE signal 354 and the AWR signal 357 along the bus 240. The ACACHE and AWR signals 354, 357 respectively indicate that the valid address on the address bus 249 within the memory module 135 is a cacheable memory address location and that the data stored at the cacheable address memory location is to be read out from the DRAM 235. The AMIO signal 360 remains unasserted to indicate that the address on the bus 249 is to be accessed within the DRAM 235 and not within the I/O device 150.

Within the sixth clock cycle, immediately after the memory PCI controller 230 has received the AADS signal 348, the memory PCI controller 230 asserts the AABOFF signal 351. This indicates that the memory PCI controller 230 is not able to accept a data read request at this time. For example, this may be because the line fill buffer 222 is full or the internal buffer of the memory PCI controller 230 is full, and thus the memory PCI controller 230 is unable to output data onto the multiprocessor bus 130. Simultaneously, the memory PCI controller 230 asserts the ANA signal 363, indicating that the next address may be accessed. The control interface circuit 245 receives the AABOFF signal 351 via the bus 240 and asserts the MARETRY signal 330 on the control bus 210 within the seventh clock cycle. Assertion of the MARETRY signal 330 causes the control interface circuit 245 to no longer assert the MDREQ3 signal 333 which was asserted within the fifth clock cycle. The MDREQ3 signal 333 is no longer asserted because the interface circuit 245 receives a rejection of the read cycle from the memory PCI controller 230. Thus, no data is to be transferred over the multiprocessor bus 130. In this manner, the memory PCI controller 230 refuses access to a read cycle by the first CPU module 110.

While the original read cycle was occurring, the second CPU module 120 has been asserting the MAREQ2 signal 306 from the third clock cycle to the ninth clock cycle. Within the ninth clock cycle, control of the address portion of the multiprocessor bus 130 is granted to the second CPU module 120. This occurs because the MNA signal 327, indicating that the next address may be received by the memory module 135, was asserted within the seventh clock cycle. Once the second CPU module 120 has gained control of the address portion of the multiprocessor bus 130, the second CPU 120 asserts the MADS signal 315 to indicate that a valid address has been placed on the address portion of the multiprocessor bus 130. The MCACHE signal 318 is also asserted within the tenth clock cycle, indicating that the address which is valid on the address portion of the multiprocessor bus 130 is a cacheable memory address location. Furthermore, the MWR signal 321 is left unasserted in the tenth clock cycle, thereby indicating that data is to be written to the address asserted on the multiprocessor bus 130. The MMIO signal 324 is also left unasserted, indicating that the data is to be written to the memory module 135.

Within the eleventh clock cycle, the second CPU module 120 asserts the MDREQ2 signal 336, indicating that the second CPU module 120 is requesting control of the data portion of the multiprocessor bus 130. Subsequently, the multiprocessor bus 130 grants control of the data portion of the bus 130 by asserting the MDGNT2 line 342 within the thirteenth clock cycle, whereupon valid data is placed on the multiprocessor bus 130, as indicated by the signal 346 in the thirteenth clock cycle.

As soon as the control interface circuitry 245 detects that the bus 130 has granted control of the data portion of the multiprocessor bus 130 to the second CPU module 120, the control interface circuitry 245 asserts the MBRDY signal 345 to indicate that data is to be read into the write-back buffer 218. Thus, data is read into the write-back buffer 218 over the four consecutive clock cycles from clock cycle 14 to clock cycle 17.

After data has been placed on the multiprocessor bus 130 and is being written to the write-back buffer 218, the control interface circuit 245 asserts the AADS signal 348 along the line 240. This indicates that a valid address is present on the bus 249. Once the memory PCI controller 230 detects the asserted AADS signal 348 on the bus 240 and reads the address present on the bus 249, the memory PCI controller 230 determines whether or not data can be written to that cacheable address location. For the case shown in FIG. 3, the memory PCI controller 230 determines that the memory PCI controller 230 is either busy or the internal buffer of the memory PCI controller 230 is full and cannot receive data. Thus, the memory PCI controller 230 asserts the AABOFF signal 351 over the line 240 to indicate that the data is to be rejected. However, it is too late for the control interface circuitry 245 to assert the MARETRY signal 330, indicating a retry, since the MNA signal 327 has already been asserted within the clock cycle 12 so that another address may be present on the multiprocessor bus 130. This data would be lost in systems which do not include a write-back buffer; however, due to the presence of the write-back buffer 218, the data from the data portion of the multiprocessor bus can be temporarily stored within the write-back buffer and transferred to the memory PCI controller at a later time.

FIG. 4 depicts a case wherein a snoop cycle initiated by the memory PCI controller 230 determines that the write-back buffer 218 contains data at a cacheable memory address which is to be accessed by the I/O device 150. FIG. 4 also depicts a case wherein the memory PCI controller 230 initiates a snoop cycle and determines that the write-back buffer 218 does not contain the data at the data address sought, but that one of the cache memories 115, 125 contains modified data at the cacheable memory address location requested by the I/O device 150. The signals 300, 303, 309, 315–327, 336, and 342–372 depicted in FIG. 4 are substantially identical in function to the corresponding signals 300, 303, 309, 315–327, 336, and 342–372 depicted in FIG. 3. A MAREQ1 signal 400 is asserted by the CPU module 110 over the arbitration control lines of the multiprocessor bus 130 to indicate that the first CPU module 110 is requesting control of the address portion of the bus 130. A MAGNT1 signal 403 is asserted by the central arbitrator and indicates that control of the address portion of the multiprocessor bus 130 has been granted to the first CPU module 110. A MHITM signal 406 is asserted by one of the CPU modules 110, 120 to indicate that data within a requested cacheable memory address within the cache memory 115, 125 is dirty. A MDREQ1 signal 409 is asserted by the first CPU module 110 to request control of the data portion of the multiprocessor bus 130. A MDGNT1 signal 412 is asserted by the central arbitrator to indicate that control of the data portion of the multiprocessor bus 130 has been granted to the first CPU module 110. A HITWB signal 400 is asserted by the comparator circuit 265 on the line 270 when the comparator circuit 265 determines that the write-back buffer 218 contains data at an address location which is to be accessed by the I/O device 150.

As depicted in FIG. 4, the AEADS signal 366 (i.e., the snoop cycle) is asserted within the fourth clock cycle by the memory PCI controller 230. Within the same clock cycle, a valid address is present on the address bus 249. The address on the bus 249 is the address which the memory PCI controller 230 designates as the cacheable memory address location to be accessed. The write-back address latch 260 also outputs the address associated with data contained within the write-back buffer 218. The address associated with the data stored in the write-back buffer 218 is output via the bus 262 to the comparator circuit 265. Thus, the comparator circuit 265 simultaneously receives a snoop address to be accessed as well as a write-back address via the buses 249, 262, respectively. Consequently, the comparator circuit 265 outputs the HITWB signal 415 on the line 270 in the same clock cycle (i.e., clock cycle 4) as the AEADS signal 366 is asserted. It should be noted, of course, that the comparator circuit 265 will not assert the HITWB signal 415 unless the address provided on the address bus 249 has an address corresponding to an address provided on the data bus 262.

Within the fifth clock cycle, the ACACHE signal 354 as well as the AWR signal 357 are both asserted to indicate that the address valid on the address bus 249 is a cacheable address location and that this address is to be read from the write-back buffer 218. The AMIO signal 360 remains unasserted to indicate that the data is to be found in the memory module 135 and not the I/O device 150. The control interface circuit 245 asserts the ABRDY signal 369 within the sixth clock cycle to indicate that the memory PCI controller 230 is available to read data which is present on the data bus 225, as indicated by the AD signal 372.

The valid data represented by the AD signal 372 is read by the memory PCI controller 230 within the four consecutive clock cycles from clock cycle 6 to clock cycle 9. Thus, this first sequence of timing signals represents a case wherein the memory PCI controller 230 initiates a snoop cycle, which results in data being detected within the write buffer 218 having an address corresponding to the address requested by the memory PCI controller 230 for the I/O device 150.

Within the clock cycle 13, a new snoop cycle is initiated, as indicated by the assertion of the AEADS signal 366. Since the AEADS signal 366 indicates that there is a valid address provided on the address bus 249, and the HITWB signal 415 on the line 270 has not been asserted, this indicates that the address on the line 249 does not correspond to the address output from the write-back address latch 260 on the line 262. Thus, the write-back buffer 218 does not contain data which is associated with the address provided on the snoop address line 249. In this case, the control interface circuit 245 asserts the MAREQ3 signal 303 to indicate that the memory module 135 is vying for control of the address portion of the multiprocessor bus 130. Possession of the address portion of the multiprocessor bus 130 is granted to the control interface circuit 245 within the clock cycle 15, as represented by the assertion of the MAGNT3 signal 309. Once the memory module 135 has control of the address portion of the multiprocessor bus 130, the address on the line 249 is output to the address portion of the multiprocessor bus 130 via the non-inverting buffer 255 and the address bus 206. The presence of a valid address on the address portion of the multiprocessor bus 130 is indicated by the assertion of the MADS signal 315 within the sixteenth clock cycle.

Once the snoop address (i.e., the address initially requested by the I/O device 150 and passed by the memory PCI controller 230 to the address bus 249) is valid on the address portion of the multiprocessor bus 130, the CPU modules 110, 120 determine whether their respective cache memories 115, 125 contain the address designated on the multiprocessor bus 130. The cache memory 115, 125 which holds the designated address on the multiprocessor bus 130 checks to see if the data contained within the designated memory address is "dirty." That is to say, the cache memories 115, 125 determine if the data in the specified memory address has been modified by the CPU within the CPU module 110, 120.

If the CPU module 110, 120 having the designated cache memory address determines that the data stored at the designated address location is dirty data, then that CPU module 110, 120 asserts the MHITM signal 406 to indicate that a modified cache line has been hit. As shown in FIG. 4, the MHITM signal 406 is asserted within the eighteenth clock cycle. Subsequently, the second CPU module 120 (which is represented as containing the modified snoop address) upon receiving the MHITM signal 406 indicating that the specified memory address is modified within a cache memory 115, 125, asserts the data request signal (i.e., the MDREQ2 signal 336), to obtain possession of the data bus portion of the multiprocessor bus 130. Within the same nineteenth clock cycle, the MNA signal 327 is asserted to indicate that a next address may be placed on the address portion of the multiprocessor bus 130. The MDREQ2 signal 336 is asserted until the multiprocessor bus 130 grants control of the data portion of the multiprocessor bus 130 to the second CPU module 120, as indicated by the assertion of the MDGNT2 signal 342 in the twentieth clock cycle.

In the same twentieth clock cycle, the second CPU module 120, having the modified cache data, places the modified data at the specified address location onto the data portion of the multiprocessor bus 130. This is indicated by the valid data signal 346. Within the next clock cycle (i.e., the twenty-first clock cycle), the control interface circuitry 245 asserts the MBRDY signal 345 to indicate that the memory module 135 is ready to accept data over the four consecutive clock cycles 21–24. Simultaneously, the control interface circuit 245 asserts the AADS signal 348 to indicate that the valid address of the snoop write-back buffer 220 is present on the address line 249. Within the same clock cycle (i.e., the twenty-first clock cycle), the ACACHE signal 354 is asserted to indicate that the address which is valid on the bus 249 is a cacheable address memory location. In this manner, data is transferred from one of the cache memories 115, 125 over the multiprocessor bus 130 to the snoop write-back buffer 220.

Once the data is input to the snoop write-back buffer 220, the memory PCI controller 230 asserts the ABRDY signal 369 to indicate that the memory PCI controller 230 is ready to accept four consecutive clock cycles of valid data from the snoop write-back buffer 220. These four valid cycles of data are represented by the AD signal 372 within the clock cycles 22–26. The memory PCI controller 230 then asserts the ANA signal 363 to indicate that another valid address may be placed on the snoop address line 249.

FIGS. 6A–6R illustrate state diagrams of the operation of the control interface circuitry 245 of FIG. 2. The control interface circuitry 245 is implemented in a field programmable gate array (FPGA), and the equations for the FPGA are set forth in Appendices A–S below, wherein Appendix A corresponds to the state diagram in FIG. 6A, Appendix B corresponds to the state diagram in FIG. 6B, and so on through Appendix R, which corresponds to the state diagram of FIG. 6R. Appendix S includes global definitions and other information used in Appendices A–R. FIG. 6A illustrates the snoop write-back buffer control operation. FIG. 6B illustrates the line fill and single memory read operation. FIG. 6C illustrates the normal write-back VBRDY control operation. (VBRDY corresponds to MBRDY discussed above.) FIG. 6D illustrates the write-back buffer control operation. FIG. 6E illustrates operation of "snarfing" into the write-back buffer to determine the contents thereof. FIG. 6F illustrates the lock read-modify-write with snarfing operation. FIG. 6G illustrates the cacheable memory read operation. FIG. 6H illustrates the I/O and noncacheable memory write operation. FIG. 6I illustrates the pipeline status during a memory read. FIG. 6J illustrates the snoop and snoop write-back operation. FIG. 6K illustrates the normal write-back operation. FIG. 6L illustrates the I/O VBRDY control operation. FIG. 6M illustrates the cache hit status during a memory read operation. FIG. 6N illustrates the I/O and noncacheable memory write operation. FIG. 6O illustrates the I/O cycle tracing operation. FIG. 6P illustrates the memory read cycle tracing operation. FIG. 6Q illustrates the lock read BVBRDY control operation. (BVBRDY corresponds to MBRDY discussed above.) FIG. 6R illustrates the lock write BVBRDY control operation.

Although the preferred embodiment of the present invention has been described and illustrated above, those skilled in the art will appreciate that various changes and modifications to the present invention do not depart from the spirit of the invention. Accordingly, the scope of the present invention is limited only by the scope of the following appended claims.

APPENDIX A

```
%------------------------------------------------------------------------%
%  FILE NAME   :   mpvins3.tdf                                           %
%                                                                        %
%   This state machine handles the snoop write back buffer control       %
%                                                                        %
%  Revision    Date        Description                                   %
%  --------    ----        -----------                                   %
%  00          6/20/94     Completed writting                            %
%------------------------------------------------------------------------%

SUBDESIGN mpvins3
(
    clk66           : input;    % 66mhz clock
    /sreset         : input;    % reset from the PCI bus                  %
    /a_brdy         : input;    % data is received or ready               %
    mpvins17        : MACHINE input;
    mp2ins3_o       : MACHINE output;
)
VARIABLE %------------------------------------------------------------------------%
% MP2INS3          Snoop write back buffer control state machine declaration %
%------------------------------------------------------------------------% mp2ins3         : MACHINE of BITS (ins3[1..0]) with STATES (3S0,3S1,3S2,3S3,3S4);

BEGIN
    mp2ins3.(clk,reset) = (clk66,!/sreset);    % clock with 66mhz clock          % mp2ins3_o = mp2ins3;

%------------------------------------------------------------------------%
% MP2INS3 : Begin    Snoop write back buffer control state machine implementation %
%------------------------------------------------------------------------%

CASE mp2ins3 IS

WHEN 3S0 =>
        IF      (mpvins17==17S3)                THEN    mp2ins3=3S1;
        ELSE                                            mp2ins3=3S0;
        END IF;

WHEN 3S1 =>
        IF      /a_brdy                         THEN    mp2ins3=3S1;
        ELSIF   !/a_brdy                        THEN    mp2ins3=3S2;
        END IF;

WHEN 3S2 =>
        IF      /a_brdy                         THEN    mp2ins3=3S2;
        ELSIF   !/a_brdy                        THEN    mp2ins3=3S3;
        END IF;

WHEN 3S3 =>
        IF      /a_brdy                         THEN    mp2ins3=3S3;
        ELSIF   !/a_brdy                        THEN    mp2ins3=3S4;
        END IF;

WHEN 3S4 =>
        IF      /a_brdy                         THEN    mp2ins3=3S4;
        ELSIF   !/a_brdy                        THEN    mp2ins3=3S0;
        END IF;

END CASE;

%------------------------------------------------------------------------%
% MP2INS3 : End    Snoop write back buffer control state machine implementation %
%------------------------------------------------------------------------%

END;
```

-35-

APPENDIX B

```
%----------------------------------------------------------------------%
%   FILE NAME  :   mpvins5.tdf                                         %
%                                                                      %
%   This state machine handles the assertion of BVBRDY during a memory read cycle. %
%   It also handles the bvdreq                                         %
%                                                                      %
%   Revision    Date        Description                                %
%   --------    ----        -----------                                %
%   00          6/10/94     Completed writting                         %
%----------------------------------------------------------------------%

SUBDESIGN mpvins5
(
    clk66           : input;    % 66mhz clock                                          %
    /bvdgnt         : input;    % data bus is granted                                  %
    /a_brdy         : input;    % data is received or ready                            %
    /a_boff         : input;    % cycle is backed off or snoop cycle is started        %
    l2hitm          : input;    % hit modified L2 cache during read snoop              %
    /sreset         : input;    % reset from the PCI bus                               %
    mpvins13        : MACHINE input;
    mp2ins5_o       : MACHINE output;
)
VARIABLE %----------------------------------------------------------------------%
% MP2INS5          BVRDY assertion during memory read state machine declaration    %
%----------------------------------------------------------------------% mp2ins5         : MACHINE of BITS (ins5[3..0]) with STATES (5S0,5S1,5S2,5S3,5S4,5S5,
                                                                5S6,5S7,5S8,5S9,5SA);

BEGIN
    mp2ins5.(clk,reset) = (clk66,!/sreset);     % clock with 66mhz clock              % mp2ins5_o = mp2ins5;

%----------------------------------------------------------------------%
% MP2INS5 : Begin    BVRDY assertion during memory read state machine implementation %
%----------------------------------------------------------------------%

CASE mp2ins5 IS

WHEN 5S0 =>
        IF      !l2hitm & (mpvins13==13S3)          THEN    mp2ins5=5S8;
        ELSIF   l2hitm & (mpvins13==13S3)           THEN    mp2ins5=5SA;
        ELSIF   (mpvins13==13S6)                    THEN    mp2ins5=5S5;
        ELSE                                                mp2ins5=5S0;
        END IF;

WHEN 5S8 =>
        IF      /bvdgnt & !(mpvins13==13S5)         THEN    mp2ins5=5S8;    % not yet   %
        ELSIF   /bvdgnt &  (mpvins13==13S5)         THEN    mp2ins5=5S9;    % granted   %
        ELSIF   !/bvdgnt & !(mpvins13==13S5)        THEN    mp2ins5=5S7;
        ELSIF   !/bvdgnt &  (mpvins13==13S5)        THEN    mp2ins5=5S1;
        ELSE                                                mp2ins5=5S0;
        END IF;

WHEN 5S7 =>
        IF      !(mpvins13==13S5)                   THEN    mp2ins5=5S7;
        ELSIF   (mpvins13==13S5)                    THEN    mp2ins5=5S1;
        END IF;

WHEN 5S9 =>
        IF      /bvdgnt                             THEN    mp2ins5=5S9;
        ELSIF   !/bvdgnt                            THEN    mp2ins5=5S1;
        END IF;

WHEN 5S1 =>                                             mp2ins5=5S2;
```

APPENDIX B (cont.)

```
    WHEN 5S2 =>                                              mp2ins5=5S3;

WHEN 5S3 =>                                              mp2ins5=5S4;

WHEN 5S4 =>                                              mp2ins5=5S0;

WHEN 5SA =>
      IF      /bvdgnt                        THEN    mp2ins5=5SA;
      ELSIF   !/bvdgnt                       THEN    mp2ins5=5S1;
      END IF;

WHEN 5S5 =>
      IF      /a_brdy & /a_boff              THEN    mp2ins5=5S5;
      ELSIF   !/a_brdy & /a_boff             THEN    mp2ins5=5S6;
      ELSE                                           mp2ins5=5S0;
      END IF;

WHEN 5S6 =>
      IF      /bvdgnt                        THEN    mp2ins5=5S6;
      ELSIF   !/bvdgnt                       THEN    mp2ins5=5S0;
      END IF;

END CASE;

%-----------------------------------------------------------------------------%
% MP2INS5 : End     BVRDY assertion during memory read state machine implementation    %
%-----------------------------------------------------------------------------%

END;
```

APPENDIX C

```
%------------------------------------------------------------------------%
%   FILE NAME  :  mpvins9.tdf                                            %
%                                                                        %
%   This state machine handles the assertion of BVBRDY during a write back cycle. %
%                                                                        %
%   Revision   Date     Description                                      %
%   --------   ----     -----------                                      %
%   00         6/14/94  Completed writting                               %
%------------------------------------------------------------------------%

SUBDESIGN mpvins9
(
    clk66              : input;    % 66mhz clock
    /bvdgnt            : input;    % data bus is granted
    /sreset            : input;    % reset from the PCI bus
    mpvins18           : MACHINE input;
    mp2ins9_o          : MACHINE output;
)
VARIABLE %------------------------------------------------------------------------%
% MP2INS9            BVRDY assertion during write back state machine declaration  %
%------------------------------------------------------------------------% mp2ins9    : MACHINE with STATES (9S0,9S1,9S2,9S3);

BEGIN
    mp2ins9.(clk,reset) = (clk66,!/sreset);    % clock with 66mhz clock mp2ins9_o = mp2ins9;

%------------------------------------------------------------------------%
  MP2INS9 : Begin    BVRDY assertion during write back state machine implementation  %
%------------------------------------------------------------------------%

CASE mp2ins9 IS

WHEN 9S0 =>
        IF      ((mpvins18==18S2) # (mpvins18==18S5) # (mpvins18==18S6) # (mpvins18==18S7)) &
                !/bvdgnt                         THEN    mp2ins9=9S1;
        ELSE                                             mp2ins9=9S0;
        END IF;

WHEN 9S1 =>                                          mp2ins9=9S2;

WHEN 9S2 =>                                          mp2ins9=9S3;

WHEN 9S3 =>                                          mp2ins9=9S0;

END CASE;

%------------------------------------------------------------------------%
% MP2INS9 :. End    BVRDY assertion during write back state machine implementation  %
%------------------------------------------------------------------------%

END;
```

APPENDIX D

```
%------------------------------------------------------------------------%
%   FILE NAME   :   mpvins10.tdf                                         %
%                                                                        %
%   This state machine handles the assertion of A-BLAST and Quick Switch selection for %
%   memory write back cycle                                              %
%                                                                        %
%                                                                        %
%   Revision    Date        Description                                  %
%   --------    ----        -----------                                  %
%   00          6/14/94     Completed writting                           %
%------------------------------------------------------------------------%
SUBDESIGN mpvins10
(
    clk66           : input;    % 66mhz clock                            %
    /a_eads         : input;    % start of snoop cycle                   %
    /a_brdy         : input;    % data is received or ready              %
    /a_boff         : input;    % cycle is backed off or snoop cycle is started %
    /snhitwb        : input;    % snoop hit the write back buffer        %
    /memgnt         : input;    % memory bus is free                     %
    /sreset         : input;    % reset from the PCI bus                 %
    mpvins9         : MACHINE input;
    mpvins11        : MACHINE input;
    mp2ins10_o      : MACHINE output;
)
VARIABLE %------------------------------------------------------------------------%
% MP2INS10          A-BLAST and RDQKSEL assertion state machine declaration %
%------------------------------------------------------------------------% mp2ins10        : MACHINE of BITS (ins10[3..0]) with STATES
                          (10S0,10S1,10S2,10S3,10S4,10S5,10S6,10S8,10SA,10SB);

BEGIN
    mp2ins10.(clk,reset)  = (clk66,!/sreset); % clock with 66mhz clock   % mp2ins10_o = mp2ins10;

%------------------------------------------------------------------------%
% MP2INS10 : Begin    A-BLAST and RDQKSEL assertion state machine implementation %
%------------------------------------------------------------------------%

CASE mp2ins10 IS

WHEN 10S0 =>
            IF      (mpvins9==9S1)                       THEN    mp2ins10=10S1;
            ELSIF   (mpvins11==11S8) # (mpvins11==11SA) #
                    (mpvins11==11SC) # (mpvins11==11SD)  THEN    mp2ins10=10S1;
            ELSE                                                 mp2ins10=10S0;
            END IF;

WHEN 10S1 =>
            IF      /a_brdy &   /a_boff                  THEN    mp2ins10=10S1;
            ELSIF   !/a_brdy &  /a_boff                  THEN    mp2ins10=10S2;
            ELSIF               !/a_boff                 THEN    mp2ins10=10S5;
            END IF;

WHEN 10S2 =>
            IF      /a_brdy                              THEN    mp2ins10=10S2;
            ELSIF   !/a_brdy                             THEN    mp2ins10=10S3;
            END IF;

WHEN 10S3 =>
            IF      /a_brdy                              THEN    mp2ins10=10S3;
            ELSIF   !/a_brdy                             THEN    mp2ins10=10S4;
            END IF;
```

APPENDIX D (cont.)

```
    WHEN 10S4 =>
     IF      /a_brdy                                    THEN    mp2ins10=10S4;
     ELSIF   !/a_brdy                                   THEN    mp2ins10=10S0;
     END IF;

WHEN 10S5 =>
     IF      !/a_boff &  /a_eads                        THEN    mp2ins10=10S5;
     ELSIF   !/a_boff & !/a_eads & !/snhitwb            THEN    mp2ins10=10S6;
     ELSIF   !/a_boff & !/a_eads &  /snhitwb            THEN    mp2ins10=10SA;
     ELSIF    /a_boff                                   THEN    mp2ins10=10SA;
     END IF;

WHEN 10S6 =>
     IF      !/a_boff #  /memgnt                        THEN    mp2ins10=10S6;
     ELSIF   /a_boff & !/memgnt                         THEN    mp2ins10=10S8;
     END IF;

WHEN 10S8 =>
     IF      /a_brdy                                    THEN    mp2ins10=10S8;
     ELSIF   !/a_brdy                                   THEN    mp2ins10=10S2;
     END IF;

WHEN 10SA =>
     IF       /a_boff & !/memgnt                        THEN    mp2ins10=10SB;
     ELSIF   !/a_boff & !/a_eads & !/snhitwb            THEN    mp2ins10=10S6;
     ELSE                                                       mp2ins10=10SA;
     END IF;

WHEN 10SB =>
     IF      /a_brdy                                    THEN    mp2ins10=10SB;
     ELSIF   !/a_brdy                                   THEN    mp2ins10=10S2;
     END IF;

ND CASE;
%------------------------------------------------------------------------------%
%------------------------------------------------------------------------------%
% MP2INS10 : End       A-BLAST and RDQKSEL assertion state machine implementation %
%------------------------------------------------------------------------------%

END;
```

APPENDIX E

```
%------------------------------------------------------------------------%
%  FILE NAME    :   mpvins11.tdf                                         %
%                                                                        %
%  This state machine handles the snarfing data into write back buffer   %
%                                                                        %
%  Revision     Date         Description                                 %
%  --------     ----         -----------                                 %
%  00           6/14/94      Completed writting                          %
%------------------------------------------------------------------------%
SUBDESIGN mpvins11
(
    clk66          : input;    % 66mhz clock                                    %
    /bvads         : input;    % MPv bus address strobe                         %
    bvmio          : input;    % mem or IO cycle status    1: mem   0 : I/O     %
    bvwr           : input;    % write or read cycle       1: write 0: read     %
    /bvcache       : input;    % cacheable in the L2 cache                      %
    /bvlock        : input;    % lock cycle status                              %
    /bvbrdy_i      : input;    % data is ready or data is received              %
    /bvswend       : input;    % snoop window end                               %
    /bvhitm        : input;    % hit a modified line in L2 cache                %
    bvsnpnca       : input;    % snooping master is noncacheable                %
    bvinv          : input;    % invalidate the cache line if hit               %
    /bvdgnt        : input;    % data bus is granted                            %
    /a_brdy        : input;    % data is received or ready                      %
    /a_boff        : input;    % cycle is backed off or snoop cycle is started  %
    /iobrdg        : input;    % the current cycle hits this board              %
    /wbdone        : input;    % write buffer is empty                          %
    /sreset        : input;    % reset from the PCI bus                         %
    cyc_stil       : input;    % cycle not done status                          %
    misalign       : input;    % misaligned lock read                           %
    mp2ins11_o     : MACHINE output;
)
VARIABLE lock_rd        : node;     % cacheable lock read cycle                      %

%------------------------------------------------------------------------%
% MP2INS11          Lock read snarfing data state machine declaration    %
%------------------------------------------------------------------------% mp2ins11       : MACHINE of BITS (ins11[3..0]) with STATES
                               (11S0,11S1,11S2,11S3,11S4,11S5,11S6,11S7,
                                11S8,11S9,11SA,11SB,11SC,11SD,11SE);

BEGIN
    lock_rd        = !/bvads & /bvcache & bvmio & !bvwr & !/bvlock;

mp2ins11.(clk,reset) = (clk66,!/sreset); % clock with 66mhz clock           % mp2ins11_o = mp2ins11;

%------------------------------------------------------------------------%
% MP2INS11 ; Begin    Lock read snarfing data state machine implementation %
%------------------------------------------------------------------------%

CASE mp2ins11 IS

WHEN 11S0 =>
       IF      lock_rd                      THEN   mp2ins11=11S1;     % lock read    %
       ELSE                                        mp2ins11=11S0;     % stay in 11S0 %
       END IF;

WHEN 11S1 =>
       IF     !/iobrdg & !cyc_stil & /a_boff & !/wbdone & !misalign THEN mp2ins11=11S2;
       ELSIF  !/iobrdg &  cyc_stil & /a_boff & !/wbdone & !misalign THEN mp2ins11=11S9;
       ELSE                                                              mp2ins11=11S0;
       END IF;

WHEN 11S2 =>
```

-41-

APPENDIX E (cont.)

```
        IF      /bvswend                                    THEN    mp2ins11=11S2;     % wait %
        ELSIF   !/bvswend & !/bvhitm & !bvsnpnca & bvinv    THEN    mp2ins11=11SE;     % next %
        ELSE
                                                                    mp2ins11=11S0;
        END IF;

WHEN 11S3 =>
        IF       /a_brdy &  /bvbrdy_i                       THEN    mp2ins11=11S3;
        ELSIF   !/a_brdy &  /bvbrdy_i                       THEN    mp2ins11=11SB;
        ELSIF    /a_brdy & !/bvbrdy_i                       THEN    mp2ins11=11S4;
        ELSIF   !/a_brdy & !/bvbrdy_i                       THEN    mp2ins11=11SA;
        END IF;

WHEN 11S4 =>
        IF       /a_brdy &  /bvbrdy_i                       THEN    mp2ins11=11S4;
        ELSIF   !/a_brdy &  /bvbrdy_i                       THEN    mp2ins11=11SA;
        ELSIF    /a_brdy & !/bvbrdy_i                       THEN    mp2ins11=11S5;
        ELSIF   !/a_brdy & !/bvbrdy_i                       THEN    mp2ins11=11SC;
        END IF;

WHEN 11S5 =>
        IF       /a_brdy &  /bvbrdy_i                       THEN    mp2ins11=11S5;
        ELSIF   !/a_brdy &  /bvbrdy_i                       THEN    mp2ins11=11SC;
        ELSIF    /a_brdy & !/bvbrdy_i                       THEN    mp2ins11=11S6;
        ELSIF   !/a_brdy & !/bvbrdy_i                       THEN    mp2ins11=11SD;
        END IF;

WHEN 11S6 =>
        IF       /a_brdy &  /bvbrdy_i                       THEN    mp2ins11=11S6;
        ELSIF   !/a_brdy &  /bvbrdy_i                       THEN    mp2ins11=11SD;
        ELSIF    /a_brdy & !/bvbrdy_i                       THEN    mp2ins11=11S7;
        ELSIF   !/a_brdy & !/bvbrdy_i                       THEN    mp2ins11=11S8;
        END IF;

WHEN 11S7 =>
        IF       /a_brdy                                    THEN    mp2ins11=11S7;
        ELSIF   !/a_brdy                                    THEN    mp2ins11=11S8;
        END IF;

WHEN 11S8 =>                                                     mp2ins11=11S0;

WHEN 11S9 =>
        IF       cyc_stil                                   THEN    mp2ins11=11S9;
        ELSIF   !cyc_stil                                   THEN    mp2ins11=11S2;
        END IF;

WHEN 11SA =>
        IF       /bvbrdy_i                                  THEN    mp2ins11=11SA;
        ELSIF   !/bvbrdy_i                                  THEN    mp2ins11=11SC;
        END IF;

WHEN 11SB =>
        IF       /bvbrdy_i                                  THEN    mp2ins11=11SB;
        ELSIF   !/bvbrdy_i                                  THEN    mp2ins11=11SA;
        END IF;

WHEN 11SC =>
        IF       /bvbrdy_i                                  THEN    mp2ins11=11SC;
        ELSIF   !/bvbrdy_i                                  THEN    mp2ins11=11SD;
        END IF;

WHEN 11SD =>
        IF       /bvbrdy_i                                  THEN    mp2ins11=11SD;
        ELSIF   !/bvbrdy_i                                  THEN    mp2ins11=11S0;
        END IF;

WHEN 11SE =>
        IF       /bvdgnt                                    THEN    mp2ins11=11SE;
        ELSIF   !/bvdgnt                                    THEN    mp2ins11=11S3;
        END IF;
```

-42-

APPENDIX E (cont.)

```
END CASE;
------------------------------------------------------------------------%
% MP2INS11 : End      Lock read snarfing data state machine implementation    %
%------------------------------------------------------------------------%

END;
```

APPENDIX F

```
%----------------------------------------------------------------%
% FILE NAME    :  mpvins12.tdf                                   %
%                                                                %
%   This state machine handles the lock read-modify-write cycle  %
%                                                                %
% Revision    Date        Description                            %
% --------    ----        -----------                            %
% 00          6/16/94     Completed writting                     %
%----------------------------------------------------------------%
SUBDESIGN mpvins12
(
    clk66          : input;    % 66mhz clock
    /bvads         : input;    % MPv bus address strobe
    bvmio          : input;    % mem or IO cycle status    1: mem      0 : I/O
    bvwr           : input;    % write or read cycle       1: write    0: read
    /bvcache       : input;    % cacheable in the L2 cache
    /bvlock        : input;    % lock cycle status
    /bvswend       : input;    % snoop window end
    /bvhitm        : input;    % hit a modified line in L2 cache
    /lastdata      : input;    % last data transfer
    /lasvbrdy      : input;    % last data on the V bus
    /iobrdg        : input;    % the current cycle hits this board
    /wbdone        : input;    % write buffer is empty
    /wb_ads        : input;    % ADS during write back cycle to ALTA-MP
    /sreset        : input;    % reset from the PCI bus
    cyc_stil       : input;    % cycle not done status
    mp2ins12_o     : MACHINE output;
)
VARIABLE %----------------------------------------------------------------%
% MP2INS12       Lock read-modify-write state machine declaration %
%----------------------------------------------------------------% mp2ins12       : MACHINE of BITS (ins12[3..0]) with STATES
                                (12S0,12S1,12S2,12S3,12S4,12S5,12S6,12S7,
                                 12S8,12S9,12SA,12SB,12SC,12SD,12SE,12SF);

BEGIN mp2ins12.(clk,reset)   = (clk66,!/sreset);  % clock with 66mhz clock       % mp2ins12_o = mp2ins12;

%----------------------------------------------------------------%
% MP2INS12 : Begin    Lock read-modify-write state machine implementation     %
%----------------------------------------------------------------%

CASE mp2ins12 IS

WHEN 12S0 =>
        IF     !/bvads & !/bvcache & !bvwr & !/bvlock     THEN   mp2ins12=12S1;
        ELSIF  !/bvads &  /bvcache & !bvwr & !/bvlock     THEN   mp2ins12=12S4;
        ELSE                                                     mp2ins12=12S0;
        END IF;

WHEN 12S1 =>
        IF     !/iobrdg & !cyc_stil & !/wbdone            THEN   mp2ins12=12S2;
        ELSIF  !/iobrdg &  cyc_stil & !/wbdone            THEN   mp2ins12=12SD;
        ELSE                                                     mp2ins12=12S0;
        END IF;

WHEN 12S2 =>
        IF     /bvswend                                   THEN   mp2ins12=12S2;   % wait %
        ELSIF  !/bvswend & !/bvhitm                       THEN   mp2ins12=12S0;   % next %
        ELSIF  !/bvswend &  /bvhitm                       THEN   mp2ins12=12S3;   % next %
        END IF;

WHEN 12S3 =>
```

-44-

APPENDIX F (cont.)

```
        IF      /lasvbrdy                           THEN    mp2ins12=12S3;
        ELSIF   !/lasvbrdy                          THEN    mp2ins12=12SA;
        END IF;

WHEN 12S4 =>
        IF      !/iobrdg & !cyc_stil & !/wbdone     THEN    mp2ins12=12S5;
        ELSIF   !/iobrdg &  cyc_stil & !/wbdone     THEN    mp2ins12=12SE;
        ELSE                                                mp2ins12=12S0;
        END IF;

WHEN 12S5 =>
        IF       /bvswend                           THEN    mp2ins12=12S5;  % wait %
        ELSIF   !/bvswend & !/bvhitm                THEN    mp2ins12=12S6;  % next %
        ELSIF   !/bvswend &  /bvhitm                THEN    mp2ins12=12S3;  % next %
        END IF;

WHEN 12S6 =>
        IF       /bvads &  /wb_ads                  THEN    mp2ins12=12S6;
        ELSIF    /bvads & !/wb_ads                  THEN    mp2ins12=12S7;
        ELSIF   !/bvads &  /wb_ads                  THEN    mp2ins12=12S8;
        ELSIF   !/bvads & !/wb_ads                  THEN    mp2ins12=12S9;
        END IF;

WHEN 12S7 =>
        IF       /bvads &  /wbdone                  THEN    mp2ins12=12S7;
        ELSIF    /bvads & !/wbdone                  THEN    mp2ins12=12SA;
        ELSIF   !/bvads &  /wbdone                  THEN    mp2ins12=12S9;
        ELSIF   !/bvads & !/wbdone                  THEN    mp2ins12=12SB;
        END IF;

WHEN 12S8 =>
        IF       /wb_ads                            THEN    mp2ins12=12S8;
        ELSIF   !/wb_ads                            THEN    mp2ins12=12S9;
        END IF;

WHEN 12S9 =>
        IF       /wbdone                            THEN    mp2ins12=12S9;
        ELSIF   !/wbdone                            THEN    mp2ins12=12SB;
        END IF;

WHEN 12SE =>
        IF       cyc_stil                           THEN    mp2ins12=12SE;
        ELSIF   !cyc_stil                           THEN    mp2ins12=12S5;
        END IF;

WHEN 12SA =>
        IF       /bvads                             THEN    mp2ins12=12SA;
        ELSIF   !/bvads &  bvwr & !/bvlock          THEN    mp2ins12=12SB;
        ELSIF   !/bvads & !bvwr & !/bvlock          THEN    mp2ins12=12S3;
        ELSE                                                mp2ins12=12S0;
        END IF;

WHEN 12SB =>
        IF       /lastdata & !/bvlock               THEN    mp2ins12=12SB;
        ELSIF    /lastdata &  /bvlock               THEN    mp2ins12=12SF;
        ELSIF   !/lastdata & !/bvlock               THEN    mp2ins12=12SC;
        ELSE                                                mp2ins12=12S0;
        END IF;

WHEN 12SC =>
        IF       /bvads & !/bvlock                  THEN    mp2ins12=12SC;
        ELSIF   !/bvads & !/bvlock & bvwr           THEN    mp2ins12=12SB;
        ELSE                                                mp2ins12=12S0;
        END IF;

WHEN 12SD =>
        IF       cyc_stil                           THEN    mp2ins12=12SD;
        ELSIF   !cyc_stil                           THEN    mp2ins12=12S2;
        END IF;
```

-45-

APPENDIX F (cont.)

```
    WHEN 12SF =>
        IF      /lastdata                           THEN    mp2ins12=12SF;
        ELSIF   !/lastdata                          THEN    mp2ins12=12S0;
        END IF;
END CASE;
%------------------------------------------------------------------------------%
% MP2INS12 : End      Lock read-modify-write state machine implementation      %
%------------------------------------------------------------------------------%

END;
```

APPENDIX G

```
%-----------------------------------------------------------------------%
%   FILE NAME  :   mpvins13.tdf                                         %
%                                                                       %
%   This state machine handles the assertion of A-BLAST and Quick Switch selection for %
%   memory read cycle                                                   %
%                                                                       %
%   Revision   Date       Description                                   %
%   --------   ----       -----------                                   %
%   00         6/07/94    Completed writting                            %
%-----------------------------------------------------------------------%

SUBDESIGN mpvins13
(
    clk66           : input;    % 66mhz clock                                      %
    /bvcache        : input;    % cacheable in the L2 cache                        %
    /a_brdy         : input;    % data is received or ready                        %
    /a_ken          : input;    % cacheable line in the ALTA                       %
    /a_boff         : input;    % cycle is backed off or snoop cycle is started    %
    /iobrdg         : input;    % the current cycle hits this board                %
    cyc_stil        : input;    % cycle not done status                            %
    pipe_lf_rd      : input;    % line fill pipelining                             %
    pipe_one_rd     : input;    % single read pipelining                           %
    /sreset         : input;    % reset from the PCI bus                           %
    mpvins23        : MACHINE input;
    mp2ins13_o      : MACHINE output;
)
VARIABLE %-----------------------------------------------------------------------%
% MP2INS13         A-BLAST and RDQKSEL assertion state machine declaration       %
%-----------------------------------------------------------------------% mp2ins13        : MACHINE of BITS (ins13[2..0]) with STATES
                                  (13S0,13S2,13S3,13S4,13S5,13S6,13S7);

BEGIN
    mp2ins13.(clk,reset)  = (clk66,!/sreset); % clock with 66mhz clock             % mp2ins13_o = mp2ins13;

%-----------------------------------------------------------------------%
% MP2INS13 : Begin    A-BLAST and RDQKSEL assertion state machine implementation  %
%-----------------------------------------------------------------------%

CASE mp2ins13 IS

WHEN 13S0 =>
        IF      !/a_ken & !/bvcache & (mpvins23==23S2)  THEN    mp2ins13=13S2;
        ELSIF   (/a_ken # /bvcache) & (mpvins23==23S2)  THEN    mp2ins13=13S6;
        ELSE                                                    mp2ins13=13S0;
        END IF;

WHEN 13S2 =>
        IF       /a_brdy & /a_boff                      THEN    mp2ins13=13S2;
        ELSIF  !/a_brdy & /a_boff                       THEN    mp2ins13=13S3;
        ELSE                                                    mp2ins13=13S0;
        END IF;

WHEN 13S3 =>
        IF       /a_brdy                                THEN    mp2ins13=13S3;
        ELSIF  !/a_brdy                                 THEN    mp2ins13=13S4;
        END IF;

WHEN 13S4 =>
        IF       /a_brdy                                THEN    mp2ins13=13S4;
        ELSIF  !/a_brdy                                 THEN    mp2ins13=13S5;
        END IF;

WHEN 13S5 =>
```

-47-

APPENDIX G (cont.)

```
    IF      /a_brdy                             THEN    mp2ins13=13S5;
    ELSIF   !/a_brdy                            THEN    mp2ins13=13S7;
    END IF;

WHEN 13S6 =>
    IF      /a_brdy & /a_boff                   THEN    mp2ins13=13S6;
    ELSIF   !/a_brdy & /a_boff                  THEN    mp2ins13=13S7;
    ELSE                                                mp2ins13=13S0;
    END IF;

WHEN 13S7 =>
    IF      pipe_lf_rd & !pipe_one_rd           THEN    mp2ins13=13S2;
    ELSIF   !pipe_lf_rd & pipe_one_rd           THEN    mp2ins13=13S6;
    ELSE                                                mp2ins13=13S0;
    END IF;

END CASE;

%----------------------------------------------------------------------------%
% MP2INS13 : End       A-BLAST and RDQKSEL assertion state machine implementation    %
%----------------------------------------------------------------------------%

END;
```

APPENDIX H

```
%----------------------------------------------------------------------%
%   FILE NAME   :  mpvins14.tdf                                        %
%                                                                      %
%   This state machine handles the assertion of A-BLAST and WR-ADS for IO write and %
%   noncacheable memory write cycle                                    %
%                                                                      %
%   Revision    Date        Description                                %
%   --------    ----        -----------                                %
%   00          6/07/94     Completed writting                         %
%----------------------------------------------------------------------%

SUBDESIGN mpvins14
(
    clk66           : input;    % 66mhz clock                                   %
    /bvdgnt         : input;    % data bus is granted                           %
    /memgnt         : input;    % memory bus is free                            %
    /a_brdy         : input;    % data is received or ready                     %
    /a_boff         : input;    % cycle is backed off or snoop cycle is started %
    /sreset         : input;    % reset from the PCI bus                        %
    mpvins21        : MACHINE input;
    mp2ins14_o      : MACHINE output;
)
VARIABLE %----------------------------------------------------------------------%
% MP2INS14          A-BLAST and WR-ADS assertion state machine declaration    %
%----------------------------------------------------------------------% mp2ins14        : MACHINE of BITS (ins14[2..0]) with STATES
                                      (14S0,14S1,14S2,14S3,14S5,14S6);

BEGIN
    mp2ins14.(clk,reset)  = (clk66,!/sreset);  % clock with 66mhz clock         % mp2ins14_o = mp2ins14;

%----------------------------------------------------------------------%
% MP2INS14 : Begin    A-BLAST and WR-ADS assertion state machine implementation %
%----------------------------------------------------------------------%

CASE mp2ins14 IS

WHEN 14S0 =>
        IF      (mpvins21==21S11)           THEN    mp2ins14=14S1;
        ELSE                                        mp2ins14=14S0;
        END IF;

WHEN 14S1 =>
        IF      /bvdgnt                     THEN    mp2ins14=14S1;
        ELSIF   !/bvdgnt                    THEN    mp2ins14=14S2;
        END IF;

WHEN 14S2 =>                                  mp2ins14=14S3;

WHEN 14S3 =>
        IF      /a_brdy & /a_boff           THEN    mp2ins14=14S3;
        ELSIF   !/a_brdy & /a_boff          THEN    mp2ins14=14S0;
        ELSIF   !/a_boff                    THEN    mp2ins14=14S5;
        END IF;

WHEN 14S5 =>
        IF      !/a_boff # /memgnt          THEN    mp2ins14=14S5;
        ELSIF   /a_boff & !/memgnt          THEN    mp2ins14=14S6;
        END IF;

WHEN 14S6 =>
        IF      /a_brdy                     THEN    mp2ins14=14S6;
        ELSIF   !/a_brdy                    THEN    mp2ins14=14S0;
        END IF;
```

APPENDIX H (cont.)

```
END CASE;
%---------------------------------------------------------------------%
% MP2INS14 : End    A-BLAST and WR-ADS assertion state machine implementation  %
%---------------------------------------------------------------------%
END;
```

APPENDIX I

```
%--------------------------------------------------------------------------------%
%  FILE NAME   :  mpvins16.tdf                                                   %
%                                                                                %
%     This state machine handles the pipelining cacheable and noncacheable memory read  %
%                                                                                %
%  Revision    Date        Description                                           %
%  --------    ----        -----------                                           %
%  00          6/08/94     Completed writting                                    %
%--------------------------------------------------------------------------------%

SUBDESIGN mpvins16
(
    clk66           : input;    % 66mhz clock
    /a_ken          : input;    % cacheable line in the ALTA                     %
    /lastdata       : input;    % last data transfer                             %
    /sreset         : input;    % reset from the PCI bus                         %
    mpvins23        : MACHINE input;
    mp2ins16_o      : MACHINE output;
)
VARIABLE mac23st2        : node;     % state 2 of memory read state machine           %
    mac23st6        : node;     % state 6 of memory read state machine           %

%--------------------------------------------------------------------------------%
% MP2INS16           Memory read pipelining state machine declaration            %
%--------------------------------------------------------------------------------% mp2ins16        : MACHINE with STATES (16S0,16S1,16S3,16S5,16S7,16S8,16S9,16SA,
                                           16SB,16SC,16SD);

BEGIN
    mac23st2    = (mpvins23==23S3);

mac23st6    = (mpvins23==23S6);

mp2ins16.(clk,reset)    = (clk66,!/sreset); % clock with 66mhz clock         % mp2ins16_o = mp2ins16;

%--------------------------------------------------------------------------------%
% MP2INS16 : Begin    Memory read pipelining state machine implementation        %
%--------------------------------------------------------------------------------%

CASE mp2ins16 IS

WHEN 16S0 =>
    IF      !/a_ken & mac23st2                      THEN    mp2ins16=16S1;
    ELSIF   /a_ken & mac23st2                       THEN    mp2ins16=16S9;
    ELSE                                                    mp2ins16=16S0;
    END IF;

WHEN 16S1 =>
    IF       /lastdata & !mac23st6                  THEN    mp2ins16=16S1;
    ELSIF    /lastdata & !/a_ken & mac23st6         THEN    mp2ins16=16S3;
    ELSIF   !/lastdata & !/a_ken & mac23st6         THEN    mp2ins16=16S5;
    ELSIF    /lastdata &  /a_ken & mac23st6         THEN    mp2ins16=16SD;
    ELSIF   !/lastdata &  /a_ken & mac23st6         THEN    mp2ins16=16SA;
    ELSE                                                    mp2ins16=16S0;
    END IF;

WHEN 16S3 =>
    IF       /lastdata                              THEN    mp2ins16=16S3;
    ELSIF   !/lastdata                              THEN    mp2ins16=16S5;
    ELSE                                                    mp2ins16=16S0;
    END IF;

WHEN 16S5 =>
    IF       /lastdata & !mac23st2                  THEN    mp2ins16=16S5;
```

APPENDIX I (cont.)

```
        ELSIF   /lastdata & !/a_ken & mac23st2      THEN    mp2ins16=16S7;
        ELSIF   !/lastdata & !/a_ken & mac23st2     THEN    mp2ins16=16S8;
        ELSIF   /lastdata &  /a_ken & mac23st2      THEN    mp2ins16=16SC;
        ELSIF   !/lastdata &  /a_ken & mac23st2     THEN    mp2ins16=16SB;
        ELSE                                                mp2ins16=16S0;
        END IF;

WHEN 16S7 =>
        IF      /lastdata                           THEN    mp2ins16=16S7;
        ELSIF   !/lastdata                          THEN    mp2ins16=16S8;
        ELSE                                                mp2ins16=16S0;
        END IF;

WHEN 16S8 =>
        IF      /lastdata & !mac23st6               THEN    mp2ins16=16S8;
        ELSIF   /lastdata & !/a_ken & mac23st6      THEN    mp2ins16=16S3;
        ELSIF   !/lastdata & !/a_ken & mac23st6     THEN    mp2ins16=16S5;
        ELSIF   /lastdata &  /a_ken & mac23st6      THEN    mp2ins16=16SD;
        ELSIF   !/lastdata &  /a_ken & mac23st6     THEN    mp2ins16=16SA;
        ELSE                                                mp2ins16=16S0;
        END IF;

WHEN 16S9 =>
        IF      /lastdata & !mac23st6               THEN    mp2ins16=16S9;
        ELSIF   /lastdata & !/a_ken & mac23st6      THEN    mp2ins16=16S3;
        ELSIF   !/lastdata & !/a_ken & mac23st6     THEN    mp2ins16=16S5;
        ELSIF   /lastdata &  /a_ken & mac23st6      THEN    mp2ins16=16SD;
        ELSIF   !/lastdata &  /a_ken & mac23st6     THEN    mp2ins16=16SA;
        ELSE                                                mp2ins16=16S0;
        END IF;

WHEN 16SD =>
        IF      /lastdata                           THEN    mp2ins16=16SD;
        ELSIF   !/lastdata                          THEN    mp2ins16=16SA;
        ELSE                                                mp2ins16=16S0;
        END IF;

WHEN 16SA =>
        IF      /lastdata & !mac23st2               THEN    mp2ins16=16SA;
        ELSIF   /lastdata & !/a_ken & mac23st2      THEN    mp2ins16=16S7;
        ELSIF   !/lastdata & !/a_ken & mac23st2     THEN    mp2ins16=16S8;
        ELSIF   /lastdata &  /a_ken & mac23st2      THEN    mp2ins16=16SC;
        ELSIF   !/lastdata &  /a_ken & mac23st2     THEN    mp2ins16=16SB;
        ELSE                                                mp2ins16=16S0;
        END IF;

WHEN 16SC =>
        IF      /lastdata                           THEN    mp2ins16=16SC;
        ELSIF   !/lastdata                          THEN    mp2ins16=16SB;
        ELSE                                                mp2ins16=16S0;
        END IF;

WHEN 16SB =>
        IF      /lastdata & !mac23st6               THEN    mp2ins16=16SB;
        ELSIF   /lastdata & !/a_ken & mac23st6      THEN    mp2ins16=16S3;
        ELSIF   !/lastdata & !/a_ken & mac23st6     THEN    mp2ins16=16S5;
        ELSIF   /lastdata &  /a_ken & mac23st6      THEN    mp2ins16=16SD;
        ELSIF   !/lastdata &  /a_ken & mac23st6     THEN    mp2ins16=16SA;
        ELSE                                                mp2ins16=16S0;
        END IF;

END CASE;

%----------------------------------------------------------------------------%
  MP2INS16 : End      Memory read pipelining state machine implementation    %
%----------------------------------------------------------------------------%

END;
```

APPENDIX J

```
%------------------------------------------------------------------------%
%   FILE NAME   :   mpvins17.tdf                                         %
%                                                                        %
%   This state machine handles the DMA/EISA MASTER snoop cycle           %
%                                                                        %
%   Revision    Date        Description                                  %
%   --------    ----        -----------                                  %
%   00          6/20/94     Completed writting                           %
%------------------------------------------------------------------------%

SUBDESIGN mpvins17
(
    clk66           : input;     % 66mhz clock                                    %
    /a_eads         : input;     % start of snoop cycle                           %
    /a_boff         : input;     % cycle is backed off or snoop cycle is started  %
    /bvagnt         : input;     % address bus is granted                         %
    /bvdgnt         : input;     % data bus is granted                            %
    /bvswend        : input;     % snoop window end                               %
    /bvhitm         : input;     % hit a modified line in L2 cache                %
    /snhitwb        : input;     % snoop hit the write back buffer                %
    /sreset         : input;     % reset from the PCI bus                         %
    mp2ins17_o      : MACHINE output;
)
VARIABLE %------------------------------------------------------------------------%
% MP2INS17         DMA/EISA master snoop state machine declaration       %
%------------------------------------------------------------------------% mp2ins17         : MACHINE of BITS (ins17[3..0]) with STATES
                                (17S0,17S1,17S2,17S3,17S4,17S5,17S6,17S7,17S8,
                                 17S9,17SA,17SB);

BEGIN
    mp2ins17.(clk,reset)  = (clk66,!/sreset);  % clock with 66mhz clock           % mp2ins17_o = mp2ins17;

%------------------------------------------------------------------------%
% MP2INS17 : Begin    DMA/EISA master snoop state machine implementation %
%------------------------------------------------------------------------%

CASE mp2ins17 IS

WHEN 17S0 =>
        IF     !/a_eads & !/a_boff & /snhitwb    THEN    mp2ins17=17S1;
        ELSE                                             mp2ins17=17S0;
        END IF;

WHEN 17S1 =>
        IF      /bvagnt                          THEN    mp2ins17=17S1;
        ELSIF  !/bvagnt                          THEN    mp2ins17=17S2;
        END IF;

WHEN 17S2 =>
        IF      /bvswend                         THEN    mp2ins17=17S2;
        ELSIF  !/bvswend &  /bvhitm              THEN    mp2ins17=17S0;
        ELSIF  !/bvswend & !/bvhitm              THEN    mp2ins17=17S3;
        END IF;

WHEN 17S3 =>
        IF      /bvdgnt & !/a_boff               THEN    mp2ins17=17S3;
        ELSIF  !/bvdgnt & !/a_boff               THEN    mp2ins17=17S8;
        ELSIF  !/bvdgnt &  /a_boff               THEN    mp2ins17=17S5;
        ELSIF   /bvdgnt &  /a_boff               THEN    mp2ins17=17S4;
        END IF;

WHEN 17S4 =>
        IF      /bvdgnt                          THEN    mp2ins17=17S4;
```

APPENDIX J (cont.)

```
        ELSIF    !/bvdgnt                        THEN    mp2ins17=17S5;
        END IF;

WHEN 17S5 =>                                         mp2ins17=17S6;

WHEN 17S6 =>                                         mp2ins17=17S7;

WHEN 17S7 =>                                         mp2ins17=17S0;

WHEN 17S8 =>
        IF       /a_boff                         THEN    mp2ins17=17S6;
        ELSIF    !/a_boff                        THEN    mp2ins17=17S9;
        END IF;

WHEN 17S9 =>
        IF       /a_boff                         THEN    mp2ins17=17S7;
        ELSIF    !/a_boff                        THEN    mp2ins17=17SA;
        END IF;

WHEN 17SA =>
        IF       /a_boff                         THEN    mp2ins17=17SB;
        ELSIF    !/a_boff                        THEN    mp2ins17=17S0;
        END IF;

WHEN 17SB =>
        IF       /a_boff                         THEN    mp2ins17=17SB;
        ELSIF    !/a_boff                        THEN    mp2ins17=17S0;
        END IF;

END CASE;
%----------------------------------------------------------------------%
% MP2INS17 : End      DMA/EISA master snoop state machine implementation    %
%----------------------------------------------------------------------%

END;
```

APPENDIX K

```
%-----------------------------------------------------------------------%
%   FILE NAME   :   mpvins18.tdf                                        %
%                                                                      %
%   This state machine handles the write back cycle                    %
%                                                                      %
%   Revision    Date         Description                                %
%   --------    ----         -----------                                %
%   00          6/13/94      Completed writting                         %
%-----------------------------------------------------------------------%
SUBDESIGN mpvins18
(
    clk66           : input;    % 66mhz clock
    /bvads          : input;    % MPv bus address strobe
    bvmio           : input;    % mem or IO cycle status    1: mem     0 : I/O    %
    bvwr            : input;    % write or read cycle       1: write   0: read    %
    /bvcache        : input;    % cacheable in the L2 cache
    /bvdgnt         : input;    % data bus is granted
    /a_boff         : input;    % cycle is backed off or snoop cycle is started   %
    /lastdata       : input;    % last data transfer
    /iobrdg         : input;    % the current cycle hits this board
    /wbdone         : input;    % write buffer is empty
    /sreset         : input;    % reset from the PCI bus
    cyc_stil        : input;    % cycle not done status
    mp2ins18_o      : MACHINE output;
)
VARIABLE wrback          : node;     % normal write back cycle                         %

%-----------------------------------------------------------------------%
% MP2INS18              Write back state machine declaration             %
%-----------------------------------------------------------------------% mp2ins18        : MACHINE of BITS (ins[3..0])
                          with STATES (18S0,18S1,18S2,18S3,18S4,18S5,18S6,18S7,
                                       18S8,18S9,18SA,18SB);

BEGIN
    wrback          = !/bvcache & bvmio & bvwr;

mp2ins18.(clk,reset)  = (clk66,!/sreset); % clock with 66mhz clock            % mp2ins18_o = mp2ins18;

%-----------------------------------------------------------------------%
% MP2INS18 : Begin      Write back state machine implementation          %
%-----------------------------------------------------------------------%

CASE mp2ins18 IS

WHEN 18S0 =>
    IF      !/bvads & wrback            THEN    mp2ins18=18S1;     % write back   %
    ELSE                                        mp2ins18=18S0;     % stay in 18S0 %
    END IF;

WHEN 18S1 =>
    IF      !/iobrdg & !cyc_stil & /a_boff & !/wbdone   THEN    mp2ins18=18S2;
    ELSIF   !/iobrdg &  cyc_stil & /a_boff & !/wbdone   THEN    mp2ins18=18SB;
    ELSE                                                        mp2ins18=18S0;
    END IF;

WHEN 18S2 =>
    IF       /bvdgnt & /bvads              THEN    mp2ins18=18S2;     % wait           %
    ELSIF   !/bvdgnt & !/bvads & wrback    THEN    mp2ins18=18S3;     % next           %
    ELSIF   !/bvdgnt & !/bvads             THEN    mp2ins18=18S4;     % data granted   %
    ELSIF   !/bvdgnt & !/bvads & !wrback   THEN    mp2ins18=18S4;     % data granted   %
    ELSIF    /bvdgnt & !/bvads & wrback    THEN    mp2ins18=18S6;     % another wback  %
    ELSE                                           mp2ins18=18S0;
    END IF;
```

-55-

APPENDIX K (cont.)

```
    WHEN 18S3 =>
      IF      /iobrdg                              THEN    mp2ins18=18SA;
      ELSIF   !/iobrdg                             THEN    mp2ins18=18S8;
      END IF;

WHEN 18S4 =>
      IF      /lastdata &  /bvads                  THEN    mp2ins18=18S4;
      ELSIF   !/lastdata &  /bvads                 THEN    mp2ins18=18S0;
      ELSIF   !/lastdata & !/bvads & !wrback       THEN    mp2ins18=18S0;
      ELSIF   !/lastdata & !/bvads &  wrback       THEN    mp2ins18=18S9;
      ELSIF   /lastdata  & !/bvads & !wrback       THEN    mp2ins18=18SA;
      ELSIF   !/lastdata & !/bvads &  wrback       THEN    mp2ins18=18S1;
      ELSE                                         THEN    mp2ins18=18S0;
      END IF;

WHEN 18S5 =>
      IF      /bvdgnt                              THEN    mp2ins18=18S5;
      ELSIF   !/bvdgnt                             THEN    mp2ins18=18SA;
      END IF;

WHEN 18S6 =>
      IF      /bvdgnt  & !/iobrdg                  THEN    mp2ins18=18S7;
      ELSIF   /bvdgnt  &  /iobrdg                  THEN    mp2ins18=18S5;
      ELSIF   !/bvdgnt & !/iobrdg                  THEN    mp2ins18=18S8;
      ELSIF   !/bvdgnt &  /iobrdg                  THEN    mp2ins18=18SA;
      END IF;

WHEN 18S7 =>
      IF      /bvdgnt                              THEN    mp2ins18=18S7;
      ELSIF   !/bvdgnt                             THEN    mp2ins18=18S8;
      END IF;

WHEN 18S8 =>
      IF      /lastdata                            THEN    mp2ins18=18S8;
      ELSIF   !/lastdata                           THEN    mp2ins18=18S2;
      END IF;

WHEN 18S9 =>
      IF      /lastdata  & !/iobrdg                THEN    mp2ins18=18S8;
      ELSIF   /lastdata  &  /iobrdg                THEN    mp2ins18=18SA;
      ELSIF   !/lastdata & !/iobrdg                THEN    mp2ins18=18S2;
      ELSIF   !/lastdata &  /iobrdg                THEN    mp2ins18=18S0;
      END IF;

WHEN 18SA =>
      IF      /lastdata                            THEN    mp2ins18=18SA;
      ELSIF   !/lastdata                           THEN    mp2ins18=18S0;
      END IF;

WHEN 18SB =>
      IF      cyc_stil                             THEN    mp2ins18=18SB;
      ELSIF   !cyc_stil                            THEN    mp2ins18=18S2;
      END IF;

END CASE;
%------------------------------------------------------------------------------%
% MP2INS18 : End       Write back state machine implementation                 %
%------------------------------------------------------------------------------%
END;
```

APPENDIX L

```
%----------------------------------------------------------------%
%   FILE NAME   :   mpvins19.tdf                                 %
%                                                                %
%   This state machine handles the assertion of BVBRDY during an I/O read cycle  %
%                                                                %
%   Revision    Date      Description                            %
%   --------    ----      -----------                            %
%   00          6/07/94   Completed writting                     %
%----------------------------------------------------------------%

SUBDESIGN mpvins19
(
    clk66           : input;    % 66mhz clock
    /bvdgnt         : input;    % data bus is granted              %
    /a_brdy         : input;    % data is received or ready        %
    cyc_stil        : input;    % cycle not done status            %
    /sreset         : input;    % reset from the PCI bus           %
    mpvins22        : MACHINE input;
    mp2ins19_o      : MACHINE output;
)
VARIABLE %----------------------------------------------------------------%
% MP2INS19         BVRDY assertion during I/O read state machine declaration    %
%----------------------------------------------------------------% mp2ins19        : MACHINE with STATES (19S0,19S1,19S2);

BEGIN
    mp2ins19.(clk,reset)  = (clk66,!/sreset);  % clock with 66mhz clock       % mp2ins19_o = mp2ins19;

%----------------------------------------------------------------%
% MP2INS19 : Begin    BVRDY assertion during I/O read state machine implementation   %
%----------------------------------------------------------------%

CASE mp2ins19 IS

WHEN 19S0 =>
    IF      (mpvins22==22S21)                   THEN    mp2ins19=19S1;
    ELSIF   (mpvins22==22S25) & !cyc_stil       THEN    mp2ins19=19S1;
    ELSE                                                mp2ins19=19S0;
    END IF;

WHEN 19S1 =>
    IF       /a_brdy                            THEN    mp2ins19=19S1;
    ELSIF    !/a_brdy                           THEN    mp2ins19=19S2;
    END IF;

WHEN 19S2 =>
    IF       /bvdgnt                            THEN    mp2ins19=19S2;
    ELSIF    !/bvdgnt                           THEN    mp2ins19=19S0;
    END IF;

END CASE;

%----------------------------------------------------------------%
% MP2INS19 : End     BVRDY assertion during I/O read state machine implementation    %
%----------------------------------------------------------------%

END;
```

-57-

APPENDIX M

```
%------------------------------------------------------------------------%
%  FILE NAME    :  mpvins20.tdf                                          %
%                                                                        %
%  This state machine traces the L2 cache hit status during a cacheable memory read %
%  cycle. This status will be dertermined by the state machine mpvins5 to whether %
%  drive the V bus VBRDY or not                                          %
%  or not.                                                               %
%                                                                        %
%  Revision     Date         Description                                 %
%  --------     ----         -----------                                 %
%  00           6/10/94      Completed writting                          %
%------------------------------------------------------------------------%
SUBDESIGN mpvins20
(
    clk66             : input;     % 66mhz clock
    /bvads            : input;     % MPv bus address strobe
    bvmio             : input;     % mem or IO cycle status      1: mem      0 : I/O
    bvwr              : input;     % write or read cycle         1: write    0: read
    /bvswend          : input;     % snoop status is available
    /bvhitm           : input;     % snoop hits a modified line in L2
    /bvcache          : input;     % cacheable in the L2 cache
    /bvlock           : input;     % lock cycle status
    /a_ken            : input;     % cacheable line in the ALTA
    /lasvbrdy         : input;     % last data on the V bus
    /iobrdg           : input;     % the current cycle hits this board
    /sreset           : input;     % reset from the PCI bus
    mp2ins20_o        : machine output;
)
VARIABLE mem_rd            : node;      % memory read cycle
    myboard           : node;      % the cycle is to this board %------------------------------------------------------------------------%
   MP2INS20              L2 snoop status during memory read state machine declaration
%------------------------------------------------------------------------% mp2ins20          : MACHINE with STATES (20S0,20S1,20S2,20S3,20S4,20S5,20S6,20S7,
                                             20S8,20S9,20SA,20SB,20SC);
BEGIN
    mem_rd            = bvmio & !bvwr & /bvlock;
    myboard           = !/iobrdg & !/a_ken & !/bvcache;

mp2ins20.(clk,reset) = (clk66,!/sreset);  % clock with 66mhz clock mp2ins20_o = mp2ins20;

%------------------------------------------------------------------------%
% MP2INS20 : Begin      L2 snoop status during memory read state machine implementation %
%------------------------------------------------------------------------%

CASE mp2ins20 IS

WHEN 20S0 =>
      IF      !/bvads & mem_rd              THEN    mp2ins20=20S1;       % memory read  %
      ELSE                                          mp2ins20=20S0;       % stay in 20S0 %
      END IF;

WHEN 20S1 =>
      IF      !myboard                      THEN    mp2ins20=20S0;
      ELSIF   myboard                       THEN    mp2ins20=20S2;
      END IF;

WHEN 20S2 =>
      IF      /bvswend                      THEN    mp2ins20=20S2;
      ELSIF   !/bvswend &  /bvhitm          THEN    mp2ins20=20S8;
      ELSIF   !/bvswend & !/bvhitm          THEN    mp2ins20=20S3;
      END IF;
```

-58-

APPENDIX M (cont.)

```
WHEN 20S3 =>
  IF     /bvads  & /lasvbrdy                          THEN    mp2ins20=20S3;
  ELSIF  !/bvads & !/lasvbrdy & !mem_rd               THEN    mp2ins20=20S0;
  ELSIF  /bvads  & !/lasvbrdy                         THEN    mp2ins20=20S0;
  ELSIF  !/bvads & !/lasvbrdy & mem_rd                THEN    mp2ins20=20S1;
  ELSIF  !/bvads & /lasvbrdy  & mem_rd                THEN    mp2ins20=20S5;
  ELSIF  !/bvads & /lasvbrdy  & !mem_rd               THEN    mp2ins20=20S4;
  ELSE                                                        mp2ins20=20S0;
  END IF;

WHEN 20S4 =>
  IF     /lasvbrdy                                    THEN    mp2ins20=20S4;
  ELSIF  !/lasvbrdy                                   THEN    mp2ins20=20S0;
  END IF;

WHEN 20S5 =>
  IF     !/lasvbrdy & myboard                         THEN    mp2ins20=20S2;
  ELSIF  !/lasvbrdy & !myboard                        THEN    mp2ins20=20S0;
  ELSIF  /lasvbrdy  & myboard                         THEN    mp2ins20=20S6;
  ELSIF  /lasvbrdy  & !myboard                        THEN    mp2ins20=20S4;
  END IF;

WHEN 20S6 =>
  IF     /lasvbrdy  & /bvswend                        THEN    mp2ins20=20S6;
  ELSIF  /lasvbrdy  & !/bvswend & !/bvhitm            THEN    mp2ins20=20S7;
  ELSIF  /lasvbrdy  & !/bvswend & /bvhitm             THEN    mp2ins20=20S4;
  ELSIF  !/lasvbrdy & !/bvswend & !/bvhitm            THEN    mp2ins20=20S3;
  ELSIF  !/lasvbrdy & !/bvswend & /bvhitm             THEN    mp2ins20=20S0;
  ELSIF  !/lasvbrdy & /bvswend                        THEN    mp2ins20=20S2;
  END IF;

WHEN 20S7 =>
  IF     /lasvbrdy                                    THEN    mp2ins20=20S7;
  ELSIF  !/lasvbrdy                                   THEN    mp2ins20=20S3;
  END IF;

WHEN 20S8 =>
  IF     /bvads  & /lasvbrdy                          THEN    mp2ins20=20S8;
  ELSIF  !/bvads & !/lasvbrdy & !mem_rd               THEN    mp2ins20=20S0;
  ELSIF  /bvads  & !/lasvbrdy                         THEN    mp2ins20=20S0;
  ELSIF  !/bvads & /lasvbrdy  & !mem_rd               THEN    mp2ins20=20SC;
  ELSIF  !/bvads & !/lasvbrdy & mem_rd                THEN    mp2ins20=20S1;
  ELSIF  !/bvads & /lasvbrdy  & mem_rd                THEN    mp2ins20=20S9;
  ELSE                                                        mp2ins20=20S0;
  END IF;

WHEN 20SC =>
  IF     /lasvbrdy                                    THEN    mp2ins20=20SC;
  ELSIF  !/lasvbrdy                                   THEN    mp2ins20=20S0;
  END IF;

WHEN 20S9 =>
  IF     !/lasvbrdy & myboard                         THEN    mp2ins20=20S2;
  ELSIF  !/lasvbrdy & !myboard                        THEN    mp2ins20=20S0;
  ELSIF  /lasvbrdy  & myboard                         THEN    mp2ins20=20SA;
  ELSIF  /lasvbrdy  & !myboard                        THEN    mp2ins20=20SC;
  END IF;

WHEN 20SA =>
  IF     /lasvbrdy  & /bvswend                        THEN    mp2ins20=20SA;
  ELSIF  /lasvbrdy  & !/bvswend & !/bvhitm            THEN    mp2ins20=20SB;
  ELSIF  /lasvbrdy  & !/bvswend & /bvhitm             THEN    mp2ins20=20SC;
  ELSIF  !/lasvbrdy & !/bvswend & !/bvhitm            THEN    mp2ins20=20S3;
  ELSIF  !/lasvbrdy & !/bvswend & /bvhitm             THEN    mp2ins20=20S0;
  ELSIF  !/lasvbrdy & /bvswend                        THEN    mp2ins20=20S2;
  END IF;

WHEN 20SB =>
```

APPENDIX M (cont.)

```
    IF      /lasvbrdy                          THEN    mp2ins20=20SB;
    ELSIF   !/lasvbrdy                         THEN    mp2ins20=20S3;
    END IF;
END CASE;

%------------------------------------------------------------------------%
% MP2INS20 : End        L2 snoop status during memory read state machine implementation %
%------------------------------------------------------------------------%

END;
```

APPENDIX N

```
%------------------------------------------------------------------------%
%   FILE NAME    :  mpvins21.tdf                                         %
%                                                                        %
%   This state machine handles IO write and noncacheable memory write cycle %
%   state tracing                                                        %
%                                                                        %
%   Revision     Date       Description                                  %
%   --------     ----       -----------                                  %
%   00           6/07/94    Completed writting                           %
%------------------------------------------------------------------------%

SUBDESIGN mpvins21
(
        clk66            : input;      % 66mhz clock                                            %
        /bvads           : input;      % MPv bus address strobe                                 %
        bvmio            : input;      % mem or IO cycle status    1: mem      0 : I/O          %
        bvwr             : input;      % write or read cycle       1: write    0: read          %
        bvdc             : input;      % data or code              1: data     0: code          %
        /bvlock          : input;      % lock cycle status                                      %
        /bvcache         : input;      % cacheable in the L2 cache                              %
        /lastdata        : input;      % last data transfer                                     %
        /iobrdg          : input;      % the current cycle hits this board                      %
        /sreset          : input;      % reset from the PCI bus                                 %
        cyc_stil         : input;      % cycle not done status                                  %
        /wbdone          : input;      % write buffer is empty                                  %
        mp2ins21_o       : machine output;
)
VARIABLE io_nocac_wr      : node;       % io write and noncacheable memory write status          %

%------------------------------------------------------------------------%
% MP2INS21         IO write and noncacheable write state machine declaration      %
%------------------------------------------------------------------------% mp2ins21    : MACHINE with STATES (21S0,21S10,21S11,21S12,21S13,21S14,21S15);

BEGIN
        io_nocac_wr =   bvmio &  bvwr & bvdc & /bvcache & /bvlock
                      # !bvmio &  bvwr & bvdc;

mp2ins21.(clk,reset)  = (clk66,!/sreset);  % clock with 66mhz clock                     % mp2ins21_o = mp2ins21;

%------------------------------------------------------------------------%
% MP2INS21 : Begin      IO write and noncacheable write state machine declaration    %
%------------------------------------------------------------------------%

CASE mp2ins21 IS

WHEN 21S0 =>
      IF      !/bvads & io_nocac_wr              THEN    mp2ins21=21S10;  % IO write           %
      ELSE                                               mp2ins21=21S0;   % stay in 21S0       %
      END IF;

WHEN 21S10 =>
      IF      !/iobrdg & !cyc_stil & !/wbdone    THEN    mp2ins21=21S11;
      ELSIF   !/iobrdg &  cyc_stil & !/wbdone    THEN    mp2ins21=21S15;
      ELSE                                               mp2ins21=21S0;
      END IF;

WHEN 21S11 =>
      IF       /bvads & /lastdata                THEN    mp2ins21=21S11;
      ELSIF   !/bvads & !/lastdata &  io_nocac_wr THEN   mp2ins21=21S10;
      ELSIF   !/bvads &  /lastdata &  io_nocac_wr THEN   mp2ins21=21S12;
      ELSIF   !/bvads &  /lastdata & !io_nocac_wr THEN   mp2ins21=21S13;
      ELSE                                               mp2ins21=21S0;
      END IF;
```

APPENDIX N (cont.)

```
    WHEN 21S12 =>
        IF      !/iobrdg & !/lastdata            THEN    mp2ins21=21S11;
        ELSIF   !/iobrdg &  /lastdata            THEN    mp2ins21=21S14;
        ELSIF    /iobrdg &  /lastdata            THEN    mp2ins21=21S13;
        ELSE                                             mp2ins21=21S0;
        END IF;

WHEN 21S13 =>
        IF       /lastdata                       THEN    mp2ins21=21S13;
        ELSE                                             mp2ins21=21S0;
        END IF;

WHEN 21S14 =>
        IF       /lastdata                       THEN    mp2ins21=21S14;
        ELSE                                             mp2ins21=21S11;
        END IF;

WHEN 21S15 =>
        IF       cyc_stil                        THEN    mp2ins21=21S15;
        ELSE                                             mp2ins21=21S11;
        END IF;

END CASE;

%------------------------------------------------------------------------%
% MP2INS21 : End      IO write and noncacheable write state machine declaration   %
%------------------------------------------------------------------------%

END;
```

APPENDIX O

```
%----------------------------------------------------------------%
%   FILE NAME   :   mpvins22.tdf                                 %
%                                                                %
(   This state machine handles IO read cycle state tracing       %
                                                                 %
%   Revision    Date        Description                          %
%   --------    ----        -----------                          %
%   00          6/07/94     Completed writting                   %
%----------------------------------------------------------------%

SUBDESIGN mpvins22
(
    clk66           : input;    % 66mhz clock                                                   %
    /bvads          : input;    % MPv bus address strobe                                        %
    bvmio           : input;    % mem or IO cycle status     1: mem      0 : I/O                %
    bvwr            : input;    % write or read cycle        1: write    0: read                %
    /a_boff         : input;    % cycle is backed off or snoop cycle is started                 %
    /lastdata       : input;    % last data transfer                                            %
    /iobrdg         : input;    % the current cycle hits this board                             %
    /sreset         : input;    % reset from the PCI bus                                        %
    cyc_stil        : input;    % cycle not done status                                         %
    mp2ins22_o      : machine output;
)
VARIABLE io_rd           : node;     % io read status                                                %

%----------------------------------------------------------------%
% MP2INS22         IO read state machine declaration             %
%----------------------------------------------------------------% mp2ins22    : MACHINE of BITS (ins22[2..0]) with STATES (22S0,22S20,22S21,22S22,
                                                         22S23,22S24,22S25);

EGIN
    io_rd           = !bvmio & !bvwr;

mp2ins22.(clk,reset)  = (clk66,!/sreset); % clock with 66mhz clock                          % mp2ins22_o = mp2ins22;

%----------------------------------------------------------------%
% MP2INS22 : Begin     IO Read state machine implementation      %
%----------------------------------------------------------------%

CASE mp2ins22 IS

WHEN 22S0 =>
    IF      !/bvads & io_rd                        THEN    mp2ins22=22S20; % memory read   %
    ELSE                                                   mp2ins22=22S0;  % stay in 22S0  %
    END IF;

WHEN 22S20 =>
    IF      !/iobrdg & !cyc_stil &./a_boff         THEN    mp2ins22=22S21;
    ELSIF   !/iobrdg &  cyc_stil & /a_boff         THEN    mp2ins22=22S25;
    ELSE                                                   mp2ins22=22S0;
    END IF;

WHEN 22S21 =>
    IF       /bvads & /lastdata  & /a_boff         THEN    mp2ins22=22S21;
    ELSIF   !/bvads & !/lastdata & io_rd  & /a_boff THEN   mp2ins22=22S20;
    ELSIF   !/bvads &  /lastdata & io_rd  & /a_boff THEN   mp2ins22=22S22;
    ELSIF   !/bvads &  /lastdata & !io_rd & /a_boff THEN   mp2ins22=22S23;
    ELSE                                                   mp2ins22=22S0;
    END IF;

WHEN 22S22 =>
    IF      !/iobrdg & !/lastdata & /a_boff        THEN    mp2ins22=22S21;
    ELSIF   !/iobrdg &  /lastdata & /a_boff        THEN    mp2ins22=22S24;
```

-63-

APPENDIX O (cont.)

```
        ELSIF   /iobrdg & /lastdata & /a_boff      THEN    mp2ins22=22S23;
        ELSE                                               mp2ins22=22S0;
        END IF;

WHEN 22S24 =>
        IF      /lastdata & /a_boff               THEN    mp2ins22=22S24;
        ELSIF   !/lastdata & /a_boff              THEN    mp2ins22=22S21;
        ELSE                                               mp2ins22=22S0;
        END IF;

WHEN 22S23 =>
        IF      /lastdata & /a_boff               THEN    mp2ins22=22S23;
        ELSE                                               mp2ins22=22S0;
        END IF;

WHEN 22S25 =>
        IF      cyc_stil                          THEN    mp2ins22=22S25;
        ELSE                                               mp2ins22=22S21;
        END IF;

END CASE;

%-----------------------------------------------------------------------%
% MP2INS22 : End      IO Read state machine implementation              %
%-----------------------------------------------------------------------%

END;
```

APPENDIX P

```
%------------------------------------------------------------------------------%
%   FILE NAME   :   mpvins23.tdf                                               %
%                                                                              %
%   This state machine handles both cacheable and noncacheable memory read cycle %
%   state tracing                                                              %
%                                                                              %
%   Revision    Date        Description                                        %
%   --------    ----        -----------                                        %
%   00          6/07/94     Completed writting                                 %
%------------------------------------------------------------------------------%
SUBDESIGN mpvins23
(
    clk66           : input;    % 66mhz clock                                      %
    /bvads          : input;    % MPv bus address strobe                           %
    bvmio           : input;    % mem or IO cycle status     1: mem    0 : I/O     %
    bvwr            : input;    % write or read cycle        1: write  0: read     %
    /bvlock         : input;    % lock cycle status                                %
    /a_na           : input;    % ready for the next address pipelining            %
    /a_boff         : input;    % cycle is backed off or snoop cycle is started    %
    /lastdata       : input;    % last data transfer                               %
    /iobrdg         : input;    % the current cycle hits this board                %
    /sreset         : input;    % reset from the PCI bus                           %
    cyc_stil        : input;    % cycle not done status                            %
    mp2ins23_o      : machine output;
)
VARIABLE mem_rd          : node;     % memory read cycle                                %

%------------------------------------------------------------------------------%
% MP2INS23          Read Cacheable and noncacheable state machine declaration   %
%------------------------------------------------------------------------------% mp2ins23        : MACHINE of BITS (ins[3..0]) with STATES (23S0,23S1,23S2,23S3,
                                                    23S4,23S5,23S6,23S9,23SA);

BEGIN
    mem_rd          = bvmio & !bvwr & /bvlock;

mp2ins23.(clk,reset)  = (clk66,!/sreset);  % clock with 66mhz clock           % mp2ins23_o = mp2ins23;

%------------------------------------------------------------------------------%
% MP2INS23 : Begin   Read Cacheable and Non-cacheable state machine implementation %
%------------------------------------------------------------------------------%

CASE mp2ins23 IS

WHEN 23S0 =>
            IF      !/bvads & mem_rd &  cyc_stil   THEN   mp2ins23=23S1;    % memory read   %
            ELSIF   !/bvads & mem_rd & !cyc_stil   THEN   mp2ins23=23SA;    % memory read   %
            ELSE                                          mp2ins23=23S0;    % stay in 23S0  %
            END IF;

WHEN 23SA =>
            IF      !/iobrdg & /a_boff             THEN   mp2ins23=23S2;
            ELSE                                          mp2ins23=23S0;    % back to 23S0  %
            END IF;

WHEN 23S1 =>
            IF      !/iobrdg & !cyc_stil & /a_boff THEN   mp2ins23=23S2;
            ELSIF   !/iobrdg &  cyc_stil & /a_boff THEN   mp2ins23=23S9;
            ELSE                                          mp2ins23=23S0;    % back to 23S0  %
            END IF;

WHEN 23S2 =>
            IF       /a_na & /lastdata & /a_boff   THEN   mp2ins23=23S2;    % wait          %
            ELSIF   !/a_na & /lastdata & /a_boff   THEN   mp2ins23=23S3;    % next cycle    %
```

APPENDIX P (cont.)

```
        ELSE                                                    mp2ins23=23S0;
        END IF;

WHEN 23S3 =>
        IF      /bvads & /lastdata                    THEN      mp2ins23=23S3;
        ELSIF   !/bvads & mem_rd & !/lastdata         THEN      mp2ins23=23SA;
        ELSIF   !/bvads & mem_rd &  /lastdata         THEN      mp2ins23=23S4;
        ELSIF   /bvads & !/lastdata                   THEN      mp2ins23=23S0;
        ELSIF   !/bvads & !mem_rd & !/lastdata        THEN      mp2ins23=23S0;
        ELSIF   !/bvads & !mem_rd &  /lastdata        THEN      mp2ins23=23S5;
        ELSE                                                    mp2ins23=23S0;
        END IF;

WHEN 23S4 =>
        IF      !/iobrdg & !/lastdata                 THEN      mp2ins23=23S2;
        ELSIF   !/iobrdg &  /lastdata                 THEN      mp2ins23=23S6;
        ELSIF   /iobrdg &  /lastdata                  THEN      mp2ins23=23S5;
        ELSIF   /iobrdg & !/lastdata                  THEN      mp2ins23=23S0;
        ELSE                                                    mp2ins23=23S0;
        END IF;

WHEN 23S5 =>
        IF      /lastdata                             THEN      mp2ins23=23S5;
        ELSIF   !/lastdata                            THEN      mp2ins23=23S0;
        END IF;

WHEN 23S6 =>
        IF      !/lastdata                            THEN      mp2ins23=23S2;
        ELSIF   /lastdata                             THEN      mp2ins23=23S6;
        END IF;

WHEN 23S9 =>
        IF      cyc_stil & /a_boff                    THEN      mp2ins23=23S9;
        ELSIF   !cyc_stil & /a_boff                   THEN      mp2ins23=23S2;
        ELSIF   !/a_boff                              THEN      mp2ins23=23S0;
        END IF;

END CASE;

%------------------------------------------------------------------------------%
% MP2INS23 : End      Cacheable and Non-cacheable Read state machine implementation  %
%------------------------------------------------------------------------------%

END;
```

APPENDIX Q

```
%------------------------------------------------------------------%
% FILE NAME   :   mpvins24.tdf                                     %
%                                                                  %
% This state machine handles the assertion of BVBRDY during a lock read cycle. %
%                                                                  %
% Revision    Date        Description                              %
% --------    ----        -----------                              %
% 00          6/17/94     Completed writting                       %
%------------------------------------------------------------------%

SUBDESIGN mpvins24
(
    clk66           : input;    % 66mhz clock
    /bvdgnt         : input;    % data bus is granted
    /a_brdy         : input;    % data is received or ready
    /sreset         : input;    % reset from the PCI bus
    mpvins12        : MACHINE input;
    mp2ins24_o      : MACHINE output;
)
VARIABLE %------------------------------------------------------------------%
% MP2INS24          BVRDY assertion during lock read state machine declaration   %
%------------------------------------------------------------------% mp2ins24        : MACHINE of BITS (ins24[1..0]) with STATES (24S0,24S1,24S2,
                                                                  24S3);

BEGIN
    mp2ins24.(clk,reset)  = (clk66,!/sreset);    % clock with 66mhz clock     % mp2ins24_o = mp2ins24;

%------------------------------------------------------------------%
% MP2INS24 : Begin   BVRDY assertion during lock read state machine implementation  %
%------------------------------------------------------------------%

CASE mp2ins24 IS

WHEN 24S0 =>
            IF      (mpvins12==12S3)                THEN    mp2ins24=24S1;
            ELSE                                            mp2ins24=24S0;
            END IF;

WHEN 24S1 =>
            IF      /a_brdy                         THEN    mp2ins24=24S1;
            ELSIF   !/a_brdy                        THEN    mp2ins24=24S2;
            END IF;

WHEN 24S2 =>
            IF      /bvdgnt                         THEN    mp2ins24=24S2;
            ELSIF   !/bvdgnt                        THEN    mp2ins24=24S3;
            END IF;

WHEN 24S3 =>                                        mp2ins24=24S0;

END CASE;

%------------------------------------------------------------------%
% MP2INS24 : End     BVRDY assertion during lock read state machine implementation  %
%------------------------------------------------------------------%

END;
```

APPENDIX R

```
%------------------------------------------------------------------%
%   FILE NAME    :  mpvins25.tdf                                   %
%                                                                  %
%   This state machine handles the assertion of BVBRDY during a lock write cycle. %
%                                                                  %
%   Revision    Date      Description                              %
%   --------    ----      -----------                              %
%   00          6/17/94   Completed writting                       %
%------------------------------------------------------------------%

SUBDESIGN mpvins25
(
    clk66           : input;    % 66mhz clock
    /bvdgnt         : input;    % data bus is granted
    /a_brdy         : input;    % data is received or ready
    /sreset         : input;    % reset from the PCI bus
    mpvins12        : MACHINE input;
    mp2ins25_o      : MACHINE output;
)
VARIABLE %------------------------------------------------------------------%
% MP2INS25         BVRDY assertion during lock write state machine declaration  %
%------------------------------------------------------------------% mp2ins25        : MACHINE of BITS (ins25[1..0]) with STATES (25S0,25S1,25S2);

BEGIN
    mp2ins25.(clk,reset) = (clk66,!/sreset);   % clock with 66mhz clock   % mp2ins25_o = mp2ins25;

%------------------------------------------------------------------%
%  MP2INS25 : Begin    BVRDY assertion during lock write state machine implementation %
%------------------------------------------------------------------%

CASE mp2ins25 IS

WHEN 25S0 =>
            IF      (mpvins12==12SB)            THEN    mp2ins25=25S1;
            ELSE                                        mp2ins25=25S0;
            END IF;

WHEN 25S1 =>
            IF       /bvdgnt                    THEN    mp2ins25=25S1;
            ELSIF   !/bvdgnt                    THEN    mp2ins25=25S2;
            END IF;

WHEN 25S2 =>
            IF       /a_brdy                    THEN    mp2ins25=25S2;
            ELSIF   !/a_brdy                    THEN    mp2ins25=25S0;
            END IF;

END CASE;

%------------------------------------------------------------------%
% MP2INS25 : End      BVRDY assertion during lock write state machine implementation %
%------------------------------------------------------------------%

END;
```

APPENDIX S

```
%-----------------------------------------------------------------------%
%                    SKYLINE MPv MEMORY BOARD CONTROLLER                %
%                                                                       %
%   This controller is used to control the interfacing between a 66MHZ MPv-BUS and a  %
%   66MHZ ALTA-MP                                                       %
%                                                                       %
%   Revision   Date     Description                                     %
%   --------   ----     -----------                                     %
%   00         6/XX/94  Completed writting                              %
%-----------------------------------------------------------------------%
%                                                                       %
%   NOTE :                                                              %
%                                                                       %
% 1. /lba_start must be asserted one clock after /alta_ads to get the maximum  %
%    memory performance.                                                %
% 2. /iobrdg must be asserted and satisfy the setup time of the FPGA's internal flipflop%
%                                                                       %
%-----------------------------------------------------------------------%

Constant PDCON    = h"D0100022";    % PCI decode control negative/subtractive  %
Constant zero     = b"0";           % binary number 0                   %
Constant one      = b"1";           % binary number 1                   %
Constant two      = h"2";           % number 2                          %
Constant three    = h"3";           % number 3                          %
Constant four     = h"4";           % number 4                          %
Constant five     = h"5";           % number 5                          %
Constant six      = h"6";           % number 6                          %
Constant seven    = h"7";           % number 7                          %
%-----------------------------------------------------------------------%
%                          FUNCTION DECLARATION                         %
%-----------------------------------------------------------------------%
%-----------------------------------------------------------------------%
% Function  :   MP2INS3    Snoop write back buffer control              %
%-----------------------------------------------------------------------%

FUNCTION mpvins3 (clk66,/sreset,/a_brdy,MACHINE mpvins17)
              RETURNS (MACHINE mp2ins3_o);

%-----------------------------------------------------------------------%
% Function  :   MP2INS5    Memory read VBRDY control                    %
%-----------------------------------------------------------------------%

FUNCTION mpvins5 (clk66,/sreset,/a_boff,/a_brdy,/bvdgnt,l2hitm,MACHINE mpvins13)
              RETURNS (MACHINE mp2ins5_o);

%-----------------------------------------------------------------------%
% Function  :   MP2INS9    Write back VBRDY control                     %
%-----------------------------------------------------------------------%

FUNCTION mpvins9 (clk66,/sreset,/bvdgnt,MACHINE mpvins18)
              RETURNS (MACHINE mp2ins9_o);

%-----------------------------------------------------------------------%
% Function  :   MP2INS10   Write back A-BLAST control                   %
%-----------------------------------------------------------------------%

FUNCTION mpvins10 (clk66,/sreset,/a_eads,/a_brdy,/a_boff,/snhitwb,/memgnt,
              MACHINE mpvins9,MACHINE mpvins11) RETURNS (MACHINE mp2ins10_o);

%-----------------------------------------------------------------------%
% Function  :   MP2INS11   Snarfing data into write back buffer control %
%-----------------------------------------------------------------------%

FUNCTION mpvins11 (clk66,/sreset,/bvads,bvmio,bvwr,/bvcache,/bvlock,/bvbrdy_i,/bvswend,
              /bvhitm,bvsnpnca,bvinv,/bvdgnt,/a_brdy,/a_boff,/iobrdg,/wbdone,
              cyc_stil,misalign) RETURNS (MACHINE mp2ins11_o);

%-----------------------------------------------------------------------%
% Function  :   MP2INS12   Lock read-modify-write cycle control         %
```

-69-

APPENDIX S (cont.)

```
%----------------------------------------------------------------------%
FUNCTION mpvins12 (clk66,/sreset,/bvads,bvmio,bvwr,/bvcache,/bvlock,/bvswend,
                   /bvhitm,/lastdata,/lasvbrdy,/iobrdg,/wb_ads,/wbdone,cyc_stil)
                   RETURNS (MACHINE mp2ins12_o);

%----------------------------------------------------------------------%
% Function  :  MP2INS13    Memory read A-BLAST and QUICK SWITCH control    %
%----------------------------------------------------------------------%
FUNCTION mpvins13 (clk66,/sreset,/bvcache,/a_boff,/a_ken,/a_brdy,pipe_one_rd,pipe_1f_rd,
                   cyc_stil,/iobrdg,MACHINE mpvins23) RETURNS (MACHINE mp2ins13_o);

%----------------------------------------------------------------------%
% Function  :  MP2INS14    A-BLAST and WR-ADS assertion                    %
%----------------------------------------------------------------------%
FUNCTION mpvins14 (clk66,/sreset,/memgnt,/bvdgnt,/a_brdy,/a_boff,MACHINE mpvins21)
                   RETURNS (MACHINE mp2ins14_o);

%----------------------------------------------------------------------%
% Function  :  MP2INS16    Memory read piplining tracing                   %
%----------------------------------------------------------------------%
FUNCTION mpvins16 (clk66,/sreset,/a_ken,/lastdata,MACHINE mpvins23)
                   RETURNS (MACHINE mp2ins16_o);

%----------------------------------------------------------------------%
% Function  :  MP2INS17    DMA/EISA master snoop control                   %
%----------------------------------------------------------------------%
FUNCTION mpvins17 (clk66,/sreset,/a_eads,/a_boff,/bvagnt,/bvdgnt,/bvswend,/bvhitm,
                   /snhitwb) RETURNS (MACHINE mp2ins17_o);

%----------------------------------------------------------------------%
% Function  :  MP2INS18    Write back cycle control                        %
%----------------------------------------------------------------------%
FUNCTION mpvins18 (clk66,/sreset,/bvads,bvmio,bvwr,/bvcache,/bvdgnt,/a_boff,
                   /lastdata,/iobrdg,/wbdone,cyc_stil)
                   RETURNS (MACHINE mp2ins18_o);

%----------------------------------------------------------------------%
% Function  :  MP2INS19    BVRDY assertion during I/O read control         %
%----------------------------------------------------------------------%
FUNCTION mpvins19 (clk66,/sreset,/bvdgnt,/a_brdy,cyc_stil,MACHINE mpvins22)
                   RETURNS (MACHINE mp2ins19_o);

%----------------------------------------------------------------------%
% Function  :  MP2INS20    L2 snoop hit status during memory read control  %
%----------------------------------------------------------------------%
FUNCTION mpvins20 (clk66,/sreset,/bvads,bvmio,bvwr,/bvswend,/bvhitm,/bvcache,/bvlock,
                   /a_ken,/lasvbrdy,/iobrdg) RETURNS (MACHINE mp2ins20_o);

%----------------------------------------------------------------------%
% Function  :  MP2INS21    IO write and noncacheable memory write cycle tracing  %
%----------------------------------------------------------------------%
FUNCTION mpvins21 (clk66,/sreset,/bvads,bvmio,bvwr,bvdc,/bvlock,/bvcache,/wbdone,/iobrdg,
                   /lastdata,cyc_stil) RETURNS (MACHINE mp2ins21_o);

%----------------------------------------------------------------------%
  Function  :  MP2INS22    IO read cycle tracing                           %
%----------------------------------------------------------------------%
FUNCTION mpvins22 (clk66,/sreset,/bvads,bvmio,bvwr,/iobrdg,/a_boff,/lastdata,
                   cyc_stil) RETURNS (MACHINE mp2ins22_o);
```

APPENDIX S (cont.)

```
%----------------------------------------------------------------------------%
% Function  :   MP2INS23    Read Cacheable and noncacheable cycle tracing    %
%----------------------------------------------------------------------------%

FUNCTION mpvins23 (clk66,/sreset,/bvads,bvmio,bvwr,/bvlock,/iobrdg,/a_na,/a_boff,
                   /lastdata,cyc_stil) RETURNS (MACHINE mp2ins23_o);

%----------------------------------------------------------------------------%
% Function  :   MP2INS24    Lock read BVBRDY assertion control               %
%----------------------------------------------------------------------------%

FUNCTION mpvins24 (clk66,/sreset,/bvdgnt,/a_brdy,MACHINE mpvins12)
                  RETURNS (MACHINE mp2ins24_o);

%----------------------------------------------------------------------------%
% Function  :   MP2INS25    Lock write BVBRDY assertion control              %
%----------------------------------------------------------------------------%

FUNCTION mpvins25 (clk66,/sreset,/bvdgnt,/a_brdy,MACHINE mpvins12)
                  RETURNS (MACHINE mp2ins25_o);

Subdesign mpvmem1
(
%----------------------------------------------------------------------------%
%                            INPUT clock                                     %
%----------------------------------------------------------------------------%
    clk66            : input;     % 66mhz clock                              %

%----------------------------------------------------------------------------%
%                            INPUT from MPV-BUS                              %
%----------------------------------------------------------------------------%
    bva[31..3]       : input;     % MPv bus address                          %
    /bvbe[7..0]      : input;     % MPv bus byte enable                      %
    /bvads           : input;     % MPv bus address strobe                   %
    bvmio            : input;     % mem or IO cycle status  1: mem   0 : I/O %
    bvwr             : input;     % write or read cycle     1: write 0: read %
    bvdc             : input;     % data or code            1: data  0: code %
    /sreset          : input;     % reset from the PCI bus                   %
    /bvlock          : input;     % lock cycle status                        %
    /bvcache         : input;     % cacheable in the L2 cache                %
    /bvswend         : input;     % snoop window end                         %
    /bvhitm          : input;     % hit a modified line in L2 cache          %
    /bvdgnt_i        : input;     % data bus is granted                      %
    /bvagnt          : input;     % address bus is granted                   %
    /bvdtm           : input;     % the cache line is turned to modified     %
    bvinv            : input;     % invalidate the cache line if hit         %
    bvsnpnca         : input;     % snooping master is noncacheable          %
    /bvbrdy_i        : input;     % data is ready or data is received        %

%----------------------------------------------------------------------------%
%                            INPUT from ALTA-MP                              %
%----------------------------------------------------------------------------%
    /a_eads          : input;     % start of snoop cycle                     %
    /a_boff          : input;     % cycle is backed off or snoop cycle is started %
    /a_brdy          : input;     % data is received or ready                %
    /a_inv           : input;     % invalidate cache line if snoop write to memory %
    /a_ken           : input;     % cacheable line in the ALTA               %
    /a_na            : input;     % ready for the next address pipelining    %

%----------------------------------------------------------------------------%
%                            INPUT from Other Logics                         %
%----------------------------------------------------------------------------%
    /iobrdg          : input;     % the current cycle hits this board        %
    /snhitwb         : input;     % snoop hit the write back buffer          %
    /memgnt          : input;     % memory bus is free                       %

%----------------------------------------------------------------------------%
```

-71-

APPENDIX S (cont.)

```
%----------------------------------------------------------------------%
%                         OUTPUT to MPv BUS                            %
%----------------------------------------------------------------------%
    /snpbvads      : output;   % BVADS from MPv mem during snoop       %
    /bvsnoop       : output;   % snoop the V-bus                       %
    /bvbrdy        : output;   % data is ready or data is received     %
    /bvartry       : output;   % address phase is retried              %
    /bvna          : output;   % end address phase                     %
    bvdreq         : output;   % request for the data bus              %
    bvareq         : output;   % request for the address bus           %
%   obvinv         : output;     invalidate the cache line if hit      %
%   obvspnca       : output;     snooping master is noncacheable       %

%----------------------------------------------------------------------%
%                         OUTPUT to QUICK SWITCH                       %
%----------------------------------------------------------------------%
    /wr_ads        : output;   % ADS during write cycle to ALTA-MP     %
    /rd_ads        : output;   % ADS during write-pipeline-read cycle to ALTA-MP %
    /wb_ads        : output;   % ADS during write back cycle to ALTA-MP %
    /lck_ads       : output;   % ADS during lock cycle to ALTA-MP      %
%   rdqksel        : output;     mux selection of quick switch         %
%   /rdcken        : output;     clock enable control                  %
%   swbqksel       : output;     snoop write back mux selection of quick switch %

%----------------------------------------------------------------------%
%                         OUTPUT to ALTA-MP                            %
%----------------------------------------------------------------------%
    /a_start       : output;   % stop the cycle                        %
    /a_lock        : output;   % lock cycle status                     %
    /a_ebrdy       : output;   % snoop status is available             %
    /a_phitm       : output;   % snoop hits a modified cache line      %
    /memreq        : output;   % request the memory bus                %

%----------------------------------------------------------------------%
%                    OUTPUT to Address Transceiver Control             %
%----------------------------------------------------------------------%
%   v21_ale        : output;   v-bus to internal bus address latch enable    %
%   /v21_aoe       : output;   v-bus to internal bus address output enable   %
%   l2v_ale        : output;   internal bus to v-bus address latch enable    %
%   /l2v_aoe       : output;   internal bus to v-bus address output enable   %

%----------------------------------------------------------------------%
%                    OUTPUT to Data Transceiver Control                %
%----------------------------------------------------------------------%
%   /v21_cen       : output;   v-bus to internal bus data clock enable       %
%   /v21_doe       : output;   v-bus to internal bus data output enable      %
%   /l2v_cen       : output;   internal bus to v-bus data clock enable       %
%   /l2v_doe       : output;   internal bus to v-bus data output enable      %

%----------------------------------------------------------------------%
%                    OUTPUT to Write Back address Control              %
%----------------------------------------------------------------------%
%   wb_ale         : output;   write back address latch enable         %
%   /wb_aoe        : output;   write back address output enable        %

%----------------------------------------------------------------------%
%                    OUTPUT to Local Resource Transceiver Control      %
%----------------------------------------------------------------------%
%   loc_ale        : output;   local resource address latch enable            %
%   loc_t          : output;   local resource data transceiver direction control %
%   /loc_doe       : output;   local resource data transceiver output enable  %

%----------------------------------------------------------------------%
%                    OUTPUT to 4-deep Write Back Buffer Control        %
%----------------------------------------------------------------------%
    /wb_wce        : output;   write back write data in clock enable   %
    /wb_rce        : output;   write back read data out clock enable   %
%   /wb_doe        : output;   write back data output enable enable    %
%----------------------------------------------------------------------%
```

-72-

APPENDIX S (cont.)

```
%                       OUTPUT to 4-deep Snoop Write Back Buffer Control            %
%-----------------------------------------------------------------------------------%
%   /swb_wce            : output;   snoop write back write data in clock enable     %
    /swb_rce            : output;   snoop write back read data out clock enable     %
.   /swb_doe            : output;   snoop write back data output enable enable      %

%-----------------------------------------------------------------------------------%
%                       OUTPUT to 4-deep Line Fill Buffer Control                   %
%-----------------------------------------------------------------------------------%
%   /lf_wce             : output;   line fill write data in clock enable            %
%   /lf_rce             : output;   line fill read data out clock enable            %
%   /lf_doe             : output;   line fill data output enable enable             %

%-----------------------------------------------------------------------------------%
%                       OUTPUT to Other Controls                                    %
%-----------------------------------------------------------------------------------%
    cyc_stil            : output;   % cycle not done status                         %
    /lbvdgnt_o          : output;   % latched bvdgnt                                %
%***********************************************************************************%
    pipe_lf_rd          : output;   % only for simulation purpose                   %
    pipe_one_rd         : output;
    /a_blast_o          : output;   % last transfer                                 %
    /lasvbrdy_o         : output;   % last data on the V bus                        %
    l2hitm_o            : output;   % L2 snoop status during memory read            %
    /wbdone_o           : output;   % write buffer is empty                         %
%***********************************************************************************%
)
Variable
    /bvartry_o          : DFF;
    /snpbvads_o         : DFF;
    /bvsnoop_o          : DFF;
    /a_ebrdy_o          : DFF;
    /a_phitm_o          : DFF;
    cyc_stil_o          : DFF;
    misalign            : DFF;
    bvareq_o            : DFF;
    bvdreq_o            : DFF;
    /lbvdgnt            : DFF;
    /memreq_o           : DFF;
    /lck_ads_o          : DFF;
    /a_lock_o           : DFF;
    /a_start_o          : DFF;
    /a_blast            : DFF;
    /bvbrdy_o           : DFF;
    /lasvbrdy           : DFF;
    l2hitm              : DFF;
    /wbdone             : DFF;
    bvna_o              : DFF;
    wr_ads_o            : DFF;
    wb_ads_o            : DFF;
    rd_ads_o            : DFF;
    bbva[31..0]         : node;     % group between bva<31..3> and zero's           %
    io_rd               : node;     % io read cycle                                 %
    /lastdata           : node;     % last data transfer                            %
    /bvdgnt             : node;     % data bus is granted                           %
    misalign_o          : node;     % misaligned lock read                          %

%-----------------------------------------------------------------------------------%
%                       State machine names                                         %
%-----------------------------------------------------------------------------------%
    mpvst3              : MACHINE;  % state machine input                           %
    mpvst5              : MACHINE;  % state machine input                           %
    mpvst9              : MACHINE;  % state machine input                           %
    mpvst10             : MACHINE;  % state machine input                           %
    mpvst11             : MACHINE;  % state machine input                           %
    mpvst12             : MACHINE;  % state machine input                           %
    mpvst13             : MACHINE;  % state machine input                           %
    mpvst14             : MACHINE;  % state machine input                           %
```

-73-

APPENDIX S (cont.)

```
    mpvst16       : MACHINE;      % state machine input            %
    mpvst17       : MACHINE;      % state machine input            %
    mpvst18       : MACHINE;      % state machine input            %
    mpvst19       : MACHINE;      % state machine input            %
    mpvst20       : MACHINE;      % state machine input            %
    mpvst21       : MACHINE;      % state machine input            %
    mpvst22       : MACHINE;      % state machine input            %
    mpvst23       : MACHINE;      % state machine input            %
    mpvst24       : MACHINE;      % state machine input            %
    mpvst25       : MACHINE;      % state machine input            %
Begin !/bvdgnt     = !/lbvdgnt & /sreset
                 # !/bvdgnt_i & /sreset;

io_rd        = !bvmio & !bvwr;

!/lastdata   = !/a_brdy & !/a_blast;

mpvst3       = mpvins3 (clk66,/sreset,/a_brdy,mpvst17);

mpvst5       = mpvins5 (clk66,/sreset,/a_boff,/a_brdy,/bvdgnt,l2hitm,mpvst13);

mpvst9       = mpvins9 (clk66,/sreset,/bvdgnt,mpvst18);

mpvst10      = mpvins10 (clk66,/sreset,/a_eads,/a_brdy,/a_boff,/snhitwb,
                            /memgnt,mpvst9,mpvst11);

mpvst11      = mpvins11 (clk66,/sreset,/bvads,bvmio,bvwr,/bvcache,/bvlock,/bvbrdy_i,
                            /bvswend,/bvhitm,bvsnpnca,bvinv,/bvdgnt,/a_brdy,/a_boff,
                            /iobrdg,/wbdone,cyc_stil,misalign);

mpvst12      = mpvins12 (clk66,/sreset,/bvads,bvmio,bvwr,/bvcache,/bvlock,/bvswend,
                            /bvhitm,/lastdata,/lasvbrdy,/iobrdg,/wb_ads,/wbdone,cyc_stil);

mpvst13      = mpvins13 (clk66,/sreset,/bvcache,/a_boff,/a_ken,/a_brdy,pipe_one_rd,
                            pipe_lf_rd,cyc_stil,/iobrdg,mpvst23);

mpvst14      = mpvins14 (clk66,/sreset,/memgnt,/bvdgnt,/a_brdy,/a_boff,mpvst21);

mpvst16      = mpvins16 (clk66,/sreset,/a_ken,/lastdata,mpvst23);

mpvst17      = mpvins17 (clk66,/sreset,/a_eads,/a_boff,/bvagnt,/bvdgnt,/bvswend,
                            /bvhitm,/snhitwb);

mpvst18      = mpvins18 (clk66,/sreset,/bvads,bvmio,bvwr,/bvcache,/bvdgnt,
                            /a_boff,/lastdata,/iobrdg,/wbdone,cyc_stil);

mpvst19      = mpvins19 (clk66,/sreset,/bvdgnt,/a_brdy,cyc_stil,mpvst22);

mpvst20      = mpvins20 (clk66,/sreset,/bvads,bvmio,bvwr,/bvswend,/bvhitm,/bvcache,
                            /bvlock,/a_ken,/lasvbrdy,/iobrdg);

mpvst21      = mpvins21 (clk66,/sreset,/bvads,bvmio,bvwr,bvdc,/bvlock,/bvcache,
                            /wbdone,/iobrdg,/lastdata,cyc_stil);

mpvst22      = mpvins22 (clk66,/sreset,/bvads,bvmio,bvwr,/iobrdg,/a_boff,
                            /lastdata,cyc_stil);

mpvst23      = mpvins23 (clk66,/sreset,/bvads,bvmio,bvwr,/bvlock,/iobrdg,/a_na,
                            /a_boff,/lastdata,cyc_stil);

mpvst24      = mpvins24 (clk66,/sreset,/bvdgnt,/a_brdy,mpvst12);

mpvst25      = mpvins25 (clk66,/sreset,/bvdgnt,/a_brdy,mpvst12);
%------------------------------------------------------------------------------%
%                        Address Decoding                                      %
```

APPENDIX S (cont.)

```
%-----------------------------------------------------------------------%
   bbva[] = (bva[],zero,zero,zero);           % group address together to 32-bit %
%-----------------------------------------------------------------------%
                            OUTPUT to MPv BUS                           %
%-----------------------------------------------------------------------%
    pipe_1f_rd      = (mpvst16==16S3) & /sreset
                    # (mpvst16==16S5) & /sreset
                    # (mpvst16==16S7) & /sreset
                    # (mpvst16==16S8) & /sreset;

pipe_one_rd     = (mpvst16==16SA) & /sreset
                    # (mpvst16==16SB) & /sreset
                    # (mpvst16==16SC) & /sreset
                    # (mpvst16==16SD) & /sreset;

/bvbrdy_o.clk    = global(clk66);

!/bvbrdy_o.d     = (mpvst5==5S8) & !/bvdgnt & (mpvst13==13S5) & /sreset
                    # (mpvst5==5S7) & (mpvst13==13S5) & /sreset
                    # (mpvst5==5S9) & !/bvdgnt & /sreset
                    # (mpvst5==5SA) & !/bvdgnt & /sreset
                    # (mpvst5==5S1) & /sreset
                    # (mpvst5==5S2) & /sreset
                    # (mpvst5==5S3) & /sreset
                    # (mpvst5==5S6) & !/bvdgnt & /sreset
                    # (mpvst19==19S2) & !/bvdgnt & /sreset
                    # (mpvst14==14S1) & !/bvdgnt & /sreset
                    # (mpvst9==9S0) & (mpvst18==18S2) & !/bvdgnt & /sreset
                    # (mpvst9==9S0) & (mpvst18==18S5) & !/bvdgnt & /sreset
                    # (mpvst9==9S0) & (mpvst18==18S6) & !/bvdgnt & /sreset
                    # (mpvst9==9S0) & (mpvst18==18S7) & !/bvdgnt & /sreset
                    # (mpvst9==9S1) & /sreset
                    # (mpvst9==9S2) & /sreset
                    # (mpvst9==9S3) & /sreset
                    # (mpvst24==24S2) & !/bvdgnt & /sreset
                    # (mpvst25==25S2) & !/a_brdy & /sreset
                    # (mpvst17==17S3) & !/bvdgnt & /sreset
                    # (mpvst17==17S4) & !/bvdgnt & /sreset
                    # (mpvst17==17S5) & /sreset
                    # (mpvst17==17S6) & /sreset
                    # (mpvst17==17S7) & /sreset
                    # (mpvst17==17S8) & /sreset
                    # (mpvst17==17S9) & /sreset
                    # (mpvst17==17SA) & /sreset;
   !/bvbrdy         = !/bvbrdy_o;

/lbvdgnt.clk     = global(clk66);
   !/lbvdgnt.d      = /lbvdgnt & !/bvdgnt_i & /sreset
                    # !/lbvdgnt & /lasvbrdy & /sreset;
   !/lbvdgnt_o      = !/lbvdgnt;

/snpbvads_o.clk  = global(clk66);
   !/snpbvads_o.d   = (mpvst17==17S1) & !/bvagnt & /sreset;
   !/snpbvads       = !/snpbvads_o;

/bvsnoop_o.clk   = global(clk66);
   !/bvsnoop_o.d    = (mpvst17==17S0) & !/a_eads & !/a_boff & /snhitwb & /sreset
                    # (mpvst17==17S1) & /sreset
                    # (mpvst17==17S2) & /bvswend & /sreset;
   !/bvsnoop        = !/bvsnoop_o;

bvareq_o.clk    = global(clk66);
    bvareq_o.d      = (mpvst17==17S0) & !/a_eads & !/a_boff & /snhitwb & /sreset
                    # (mpvst17==17S1) & /bvagnt & /sreset;
    bvareq          = bvareq_o;

/a_ebrdy_o.clk   = global(clk66);
   !/a_ebrdy_o.d    = (mpvst17==17S2) & !/bvswend & /sreset;
   !/a_ebrdy        = !/a_ebrdy_o;
```

-75-

APPENDIX S (cont.)

```
/a_phitm_o.clk = global(clk66);
!/a_phitm_o.d  = (mpvst17==17S2) & !/bvswend & !/bvhitm & /sreset;
!/a_phitm      = !/a_phitm_o;

/bvartry_o.clk = global(clk66);
!/bvartry_o.d  = (mpvst23==23S1) & !/iobrdg & !/a_boff & /sreset
              # (mpvst23==23SA) & !/iobrdg & !/a_boff & /sreset
              # (mpvst23==23S2) & !/a_boff & /sreset
              # (mpvst22==22S20) & !/iobrdg & !/a_boff & /sreset
              # (mpvst22==22S21) & !/a_boff & /sreset
              # (mpvst22==22S22) & !/a_boff & /sreset
              # (mpvst22==22S23) & !/a_boff & /sreset
              # (mpvst22==22S24) & !/a_boff & /sreset
              # (mpvst21==21S10) & !cyc_stil & /wbdone & /sreset;
!/bvartry      = !/bvartry_o;

misalign.clk  = global(clk66);
 misalign.d    = (mpvst12==12SA) & !/bvads & !bvwr & !/bvlock & /sreset;
 misalign_o    = misalign;

/lck_ads_o.clk = global(clk66);
!/lck_ads_o.d  = (mpvst12==12S4) & !/iobrdg & !/wbdone & !cyc_stil & /sreset
              # (mpvst12==12SE) & !cyc_stil & /sreset
              # (mpvst12==12S2) & !/bvswend & /bvhitm & /sreset
              # (mpvst12==12SA) & !/bvads & !bvwr & !/bvlock & /sreset
              # (mpvst25==25S1) & !/bvdgnt & /sreset;
!/lck_ads      = !/lck_ads_o;

/a_start_o.clk = global(clk66);
!/a_start_o.d  = (mpvst12==12S3) & /sreset
              # (mpvst12==12S5) & /sreset
              # (mpvst12==12S6) & /sreset
              # (mpvst12==12S7) & /sreset
              # (mpvst12==12S8) & /sreset
              # (mpvst12==12S9) & /sreset
              # (mpvst12==12SA) & /sreset
              # (mpvst12==12SB) & /sreset
              # (mpvst12==12SC) & /sreset
              # (mpvst12==12SF) & /sreset;
!/a_start      = !/a_start_o;

/a_lock_o.clk  = global(clk66);
!/a_lock_o.d   = (mpvst12==12S2) & /sreset
              # (mpvst12==12S3) & /sreset
              # (mpvst12==12S4) & /sreset
              # (mpvst12==12S5) & /sreset
              # (mpvst12==12S6) & /sreset
              # (mpvst12==12S7) & /sreset
              # (mpvst12==12S8) & /sreset
              # (mpvst12==12S9) & /sreset
              # (mpvst12==12SA) & /sreset
              # (mpvst12==12SB) & /sreset
              # (mpvst12==12SC) & /sreset
              # (mpvst12==12SE) & /sreset
              # (mpvst12==12SF) & /sreset;
!/a_lock       = !/a_lock_o;

/lasvbrdy.clk  = global(clk66);
!/lasvbrdy.d   = (mpvst5==5S3) & /sreset
              # (mpvst5==5S6) & !/bvdgnt & /sreset
              # (mpvst19==19S2) & !/bvdgnt & /sreset
              # (mpvst14==14S1) & !/bvdgnt & /sreset
              # (mpvst9==9S3) & /sreset
              # (mpvst25==25S2) & !/a_brdy & /sreset
              # (mpvst24==24S2) & !/bvdgnt & /sreset
              # (mpvst11==11SD) & !/bvbrdy_i & /sreset
              # (mpvst11==11S6) & !/bvbrdy_i & /sreset
              # (mpvst17==17S7) & /sreset
```

-76-

APPENDIX S (cont.)

```
                    # (mpvst17==17SA) & /sreset;
!/lasvbrdy_o        = !/lasvbrdy;

/wbdone.clk        = global(clk66);
!/wbdone.d          = (mpvst10==10S0) & (mpvst14==14S0) & /sreset;
!/wbdone_o          = !/wbdone;

/memreq_o.clk      = global(clk66);
!/memreq_o.d        = (mpvst10==10S1) & !/a_boff & /sreset
                    # (mpvst10==10S5) & /sreset
                    # (mpvst10==10S6) & /sreset
                    # (mpvst10==10S8) & /sreset
                    # (mpvst10==10SA) & /sreset
                    # (mpvst10==10SB) & /sreset
                    # (mpvst14==14S3) & !/a_boff & /sreset
                    # (mpvst14==14S5) & /sreset
                    # (mpvst14==14S6) & /a_brdy & /sreset;
!/memreq            = !/memreq_o;

bvdreq_o.clk        = global(clk66);
bvdreq_o.d          = (mpvst5==5S0) & !l2hitm & (mpvst13==13S3) & /sreset
                    # (mpvst5==5S8) & /bvdgnt & /sreset
                    # (mpvst5==5S9) & /bvdgnt & /sreset
                    # (mpvst5==5S5) & !/a_brdy & /sreset
                    # (mpvst5==5S6) & /bvdgnt & /sreset
                    # (mpvst19==19S1) & !/a_brdy & /sreset
                    # (mpvst19==19S2) & /bvdgnt & /sreset
                    # (mpvst24==24S1) & !/a_brdy & /sreset
                    # (mpvst24==24S2) & /bvdgnt & /sreset;
bvdreq              = bvdreq_o;

l2hitm.clk          = global(clk66);
l2hitm.d            = (mpvst20==20S2) & !/bvswend & !/bvhitm & /sreset
                    # (mpvst20==20S3) & /lasvbrdy & /sreset
                    # (mpvst20==20S4) & /lasvbrdy & /sreset
                    # (mpvst20==20S5) & /lasvbrdy & /sreset
                    # (mpvst20==20S6) & /lasvbrdy & /sreset
                    # (mpvst20==20S7) & /sreset
                    # (mpvst20==20SB) & !/lasvbrdy & /sreset
                    # (mpvst20==20S6) & !/lasvbrdy & !/bvswend & !/bvhitm & /sreset
                    # (mpvst20==20SA) & !/lasvbrdy & !/bvswend & !/bvhitm & /sreset;
l2hitm_o            = l2hitm;

/a_blast.clk       = global(clk66);
!/a_blast.d         = (mpvst13==13S0) & (/a_ken # /bvcache) & (mpvst23==23S2) & /sreset
                    # (mpvst13==13S7) & !pipe_lf_rd & pipe_one_rd & /sreset
                    # (mpvst13==13S6) & /a_brdy & /sreset
                    # (mpvst13==13S4) & !/a_brdy & /sreset
                    # (mpvst13==13S5) & /a_brdy & /sreset
                    # (mpvst14==14S2) & /sreset
                    # (mpvst14==14S3) & /a_brdy & /sreset
                    # (mpvst14==14S5) & /a_boff & !/memgnt & /sreset
                    # (mpvst14==14S6) & /a_brdy & /sreset
                    # (mpvst19==19S0) & (mpvst22==22S21) & /sreset
                    # (mpvst19==19S0) & (mpvst22==22S25) & !cyc_stil & /sreset
                    # (mpvst19==19S1) & /a_brdy & /sreset
                    # (mpvst10==10S3) & !/a_brdy & /sreset
                    # (mpvst10==10S4) & /a_brdy & /sreset
                    # (mpvst24==24S1) & /a_brdy & /sreset
                    # (mpvst25==25S1) & !/bvdgnt & /sreset
                    # (mpvst25==25S2) & /a_brdy & /sreset;
!/a_blast_o         = !/a_blast;

wr_ads_o.clk        = global(clk66);
wr_ads_o.d          = (mpvst14==14S1) & !/bvdgnt & /sreset
                    # (mpvst14==14S5) & /a_boff & !/memgnt & /sreset
                    # (mpvst17==17S3) & !/bvdgnt & /a_boff & /sreset
                    # (mpvst17==17S4) & !/bvdgnt & /sreset
                    # (mpvst17==17S8) &  /a_boff & /sreset
```

-77-

APPENDIX S (cont.)

```
                        # (mpvst17==17S9) &   /a_boff & /sreset
                        # (mpvst17==17SA) &   /a_boff & /sreset
                        # (mpvst17==17SB) &   /a_boff & /sreset;
/wr_ads                 = !wr_ads_o;

wb_ads_o.clk            = global(clk66);
wb_ads_o.d              = (mpvst18==18S2) & !/bvdgnt & /sreset
                        # (mpvst18==18S5) & !/bvdgnt & /sreset
                        # (mpvst18==18S6) & !/bvdgnt & /sreset
                        # (mpvst18==18S7) & !/bvdgnt & /sreset
                        # (mpvst11==11S4) & !/a_brdy & /sreset
                        # (mpvst11==11S5) & !/a_brdy & /sreset
                        # (mpvst11==11S6) & !/a_brdy & /sreset
                        # (mpvst11==11S7) & !/a_brdy & /sreset
                        # (mpvst11==11SB) & !/bvbrdy & /sreset
                        # (mpvst11==11S3) & !/a_brdy & !/bvbrdy & /sreset;

/wb_ads                 = !wb_ads_o;

rd_ads_o.clk            = global(clk66);
rd_ads_o.d              = (mpvst23==23S1) & !/iobrdg & !cyc_stil & /a_boff & /sreset
                        # (mpvst23==23S9) & !cyc_stil & /sreset;
/rd_ads                 = !rd_ads_o;

bvna_o.clk              = global(clk66);
bvna_o.d                = (mpvst23==23S2) &  !/a_na & /sreset
                        # (mpvst23==23S2) &  !/a_boff & /sreset
                        # (mpvst23==23S1) &  !/a_boff & !/iobrdg & /sreset
                        # (mpvst23==23SA) &  !/a_boff & !/iobrdg & /sreset
                        # (mpvst22==22S20) & !/iobrdg & !/a_boff &  /sreset
                        # (mpvst22==22S21) & !/lastdata &  /sreset
                        # (mpvst22==22S21) & !/a_boff & /sreset
                        # (mpvst22==22S24) & !/lastdata &  /a_boff & /sreset
                        # (mpvst22==22S24) & !/a_boff & /sreset
                        # (mpvst22==22S22) & !/lastdata & /sreset
                        # (mpvst22==22S22) & !/a_boff & /sreset
                        # (mpvst22==22S23) & !/lastdata & /sreset
                        # (mpvst22==22S23) & !/a_boff & /sreset
                        # (mpvst21==21S10) & !cyc_stil & /sreset
                        # (mpvst21==21S15) & !cyc_stil & /sreset
                        # (mpvst21==21S14) & !/lastdata & /sreset
                        # (mpvst18==18S1) & !/iobrdg & !cyc_stil & /sreset
                        # (mpvst18==18SB) & !cyc_stil & /sreset
                        # (mpvst18==18S8) & !/lastdata & /sreset
                        # (mpvst18==18S9) & !/lastdata & !/iobrdg & /sreset
                        # (mpvst12==12SC) & !/bvads & !/bvlock &  bvwr & /sreset
                        # (mpvst12==12SA) & !/bvads & !/bvlock & /sreset
                        # (mpvst12==12S2) & !/bvswend & /sreset
                        # (mpvst12==12S7) & !/bvads & !/bvlock & bvwr & !/wbdone & /sreset
                        # (mpvst12==12S9) & !/wbdone & /sreset
                        # (mpvst11==11S2) & !/bvswend & /sreset;
!/bvna                  = bvna_o;

cyc_stil_o.clk          = global(clk66);
cyc_stil_o.d            = (mpvst23==23S2) & /lastdata & /sreset
                        # (mpvst23==23S3) & /lastdata  & /sreset
                        # (mpvst23==23S4) & /lastdata  & /sreset
                        # (mpvst23==23S5) & /lastdata  & /sreset
                        # (mpvst23==23S6) & /sreset
                        # (mpvst22==22S20) & !/iobrdg & !cyc_stil & /sreset
                        # (mpvst22==22S25) & !cyc_stil & /sreset
                        # (mpvst22==22S21) & /lastdata  & /sreset
                        # (mpvst22==22S22) & /lastdata  & /sreset
                        # (mpvst22==22S23) & /lastdata  & /sreset
                        # (mpvst22==22S24) & /sreset
                        # (mpvst21==21S11) & /lastdata  & /sreset
                        # (mpvst21==21S12) & /lastdata  & /sreset
                        # (mpvst21==21S13) & /lastdata  & /sreset
                        # (mpvst21==21S14) & /sreset
```

-78-

APPENDIX S (cont.)

```
            # (mpvst18==18S2) & /sreset
            # (mpvst18==18S3) & /sreset
            # (mpvst18==18S4) & /lastdata & /sreset
            # (mpvst18==18S5) & /sreset
            # (mpvst18==18S6) & /sreset
            # (mpvst18==18S7) & /sreset
            # (mpvst18==18S8) & /sreset
            # (mpvst18==18S9) & /lastdata & /sreset
            # (mpvst18==18SA) & /lastdata & /sreset
            # (mpvst12==12S5) & /sreset
            # (mpvst12==12S3) & /sreset
            # (mpvst12==12S6) & /sreset
            # (mpvst12==12S2) & /sreset
            # (mpvst12==12SF) & /sreset
            # (mpvst12==12S7) & /sreset
            # (mpvst12==12S8) & /sreset
            # (mpvst12==12S9) & /sreset
            # (mpvst12==12SA) & /sreset
            # (mpvst12==12SB) & /sreset
            # (mpvst12==12SC) & /sreset;
    cyc_stil   = cyc_stil_o;
END;
```

What is claimed is:

1. A computer system comprising:

a memory subsystem which receives addresses and which stores data in storage locations indexed by said addresses;

a first access device which provides addresses to said memory subsystem and which transfers data to and from said memory subsystem, said first access device including a first cache memory subsystem which temporarily stores data to be transferred from said first access device to said memory subsystem, said first cache memory subsystem providing indicators when said first cache memory subsystem has data stored therein which has not been transferred to said memory subsystem;

a second access device which provides addresses to said memory subsystem and which transfers data to and from said memory subsystem, said second access device obtaining access to said memory subsystem on a time-shared basis with said first access device;

a third access device which provides addresses to said memory subsystem and which transfers data to and from said memory subsystem, said third access device including a second cache memory subsystem which temporarily stores data to be transferred from said third access device to said memory subsystem, said second cache memory subsystem providing indicators when said second cache memory subsystem has data stored therein which has not been transferred to said memory subsystem, said third access device obtaining access to said memory subsystem on a time-shared basis with said first access device and said second access device;

a first write buffer within said memory subsystem which receives data from said first access device and which receives data from said third access device and which stores data from said first access device and data from said third access device until said data can be transferred to said memory subsystem;

a second write buffer within said memory subsystem;

a memory controller responsive to addresses from said second access device to control access of said second access device to said memory subsystem, said memory controller comparing an address received from said second access device and determining whether said address received from said second access device corresponds to an address for which data is stored in one of said first and second cache memory subsystems awaiting transfer to said memory subsystem, said memory controller causing said data stored in said one of said first and second cache memory subsystems to be transferred to said memory subsystem via said second write buffer to thereby make said data stored in said one of said first and second cache memory subsystems accessible to said second access device.

2. A method of controlling access to a memory subsystem by first, second, and third independent devices having access to same memory locations, wherein said first independent device includes a first cache that temporarily stores modified data to be transferred to a storage location in said memory subsystem corresponding to a first address, and said third independent device includes a second cache configured to temporarily store modified data to be transferred to said storage location in said memory subsystem corresponding to a second address, said memory subsystem including a first write buffer that temporarily stores data transferred to said memory subsystem from said first and second independent devices while said memory subsystem is unable to store said data in said storage location, said method comprising the steps of:

providing a third address from said second independent device;

comparing said third address with said first and second addresses;

when said third address is identical to one of said first and second addresses, transferring said modified data from one of said first and second caches to said memory subsystem via a second write buffer before providing data from said memory subsystem to said second device, said second write buffer bypassing said first write buffer such that any data in said first write buffer is unchanged by said transferring step.

3. A memory subsystem accessible by a computer system having at least first, second, and third access devices wherein said first access device includes a first cache system which temporarily stores data to be transferred from said first access device to a first range of addresses in said memory subsystem and wherein said third access device includes a second cache system which temporarily stores data to be transferred from said third access device to a second range of addresses in said memory subsystem, said memory subsystem comprising:

a memory array comprising a plurality of data storage locations, each data storage location addressable by a respective address;

a first write buffer in communication with said memory array and external to said first, second, and third access devices, and which receives a first set of address and data information from said first access device and which receives a second set of address and data information from said third access device, and which stores said first and second sets of address and data information until data information from one of said first and second sets of address and data information can be stored in one of said storage locations of said memory array; and a memory controller responsive to an address from said second access device, said memory controller comparing said address from said second access device with said first and second ranges of addresses to determine whether said address is within said first or third range of addresses, said memory controller further determining whether one of said first and second cache systems has modified data stored therein to be stored at a location in said memory array corresponding to said address from said second access device, said memory controller transferring said modified data to said memory array via logic that bypasses said first write buffer.

4. A method for preventing deadlock in a computer system having multiple devices which access a memory subsystem including at least a first device having a first cache memory which stores modified data to be transferred to a predetermined location in said memory subsystem, a second device having a second cache memory which stores modified data to be transferred to at least said predetermined location in said memory subsystem, wherein said memory subsystem can receive information to be stored from said first device and temporarily delay storing said information using a write buffer within said memory subsystem, and wherein a third device can access said predetermined location in said memory subsystem before said modified data is transferred to said predetermined location from one of said first and second cache memories, said method comprising the steps of:

detecting that said third device is accessing said predetermined location in said memory subsystem;

detecting that one of said first and second cache memories has modified data that has not been transferred to said predetermined location in said memory subsystem; and transferring said modified data from said one of said first and second cache memories to said predetermined location in said memory subsystem prior to transferring said temporarily delayed information.

5. A memory controller which controls access to a memory subsystem from first, second, and third data transfer devices, said memory subsystem having a plurality of memory locations, said first data transfer device including a first cache memory for storing data therein, said third data transfer device including a second cache memory for storing data therein, said memory controller comprising:

a first write buffer within said memory subsystem which receives a first set of data and a first address from one of said first and third data transfer devices and which holds said first set of data and said first address until said first set of data can be stored in said memory subsystem at a storage location selected by said first address;

an interface circuit that receives a second address from said second data transfer device, said interface circuit including a comparator that compares said second address to said first address, said interface circuit transferring said first set of data from said first write buffer to said second data transfer device when said first address and said second address are identical, said interface circuit further including a cache snoop circuit activated when said first address and said second address are different, said cache snoop circuit comparing said second address to addresses of data cached within said first and second caches to determine whether said second address corresponds to a snooped address of modified data stored within one of said first and second caches, said cache snoop circuit initiating a snoop write-back cycle when said second address corresponds to a snooped address of modified data; and a snoop write-back bypass circuit within said memory subsystem, said snoop write-back bypass circuit providing a selectably enabled address and data path from said first and second caches to said plurality of memory locations, said snoop write-back bypass circuit activated when said cache snoop circuit initiates said snoop write-back cycle to transfer said modified data to a memory location in said memory subsystem selected by said second address, said modified data transferred to said memory subsystem prior to said first set of data.

6. A memory subsystem which provides access to a plurality of addressable memory locations by first, second, and third access devices, wherein said first access device includes a first cache, and wherein said third access device includes a second cache, said first cache storing modified data to be transferred to a first addressable location in said memory subsystem, said second cache storing modified data to be transferred to a second addressable location in said memory subsystem, said memory subsystem comprising:

a write buffer within said memory subsystem connected to receive a first set of data from one of said first and third access devices, said write buffer holding said first set of data until said data can be stored in a selected addressable location in said memory subsystem;

a write buffer bypass circuit connected within said memory subsystem to transfer a second set of data directly from said one of said first and second caches in said first access device to said memory subsystem independently of said write buffer; and a memory interface circuit that receives an access request from said second access device, said memory interface circuit determining whether said access request is directed to one of said first and second addressable locations, said memory interface circuit activating said buffer bypass circuit to transfer said modified data directly from said one of said first and second caches to said one of said first and second addressable locations before said first set of data is transferred from said write buffer to said selected addressable location.

* * * * *